(12) United States Patent
Nagayama et al.

(10) Patent No.: US 7,833,105 B2
(45) Date of Patent: Nov. 16, 2010

(54) BEARING DEVICE FOR DRIVE WHEEL

(75) Inventors: Yasuhisa Nagayama, Utsuomiya (JP); Aya Suzuki, Mooka (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 529 days.

(21) Appl. No.: 11/794,863

(22) PCT Filed: Jan. 5, 2006

(86) PCT No.: PCT/JP2006/300042

§ 371 (c)(1),
(2), (4) Date: Jul. 6, 2007

(87) PCT Pub. No.: WO2006/073159

PCT Pub. Date: Jul. 13, 2006

(65) Prior Publication Data

US 2008/0285902 A1    Nov. 20, 2008

(30) Foreign Application Priority Data

Jan. 7, 2005    (JP) .............................. 2005-002581
Dec. 12, 2005   (JP) .............................. 2005-357879

(51) Int. Cl.
*F16D 3/223*   (2006.01)
(52) U.S. Cl. ...................... 464/178; 464/906
(58) Field of Classification Search ................ 464/178, 464/906; 384/544, 589
See application file for complete search history.

(56) References Cited

U.S. PATENT DOCUMENTS

| | | | |
|---|---|---|---|
| 4,440,256 A * | 4/1984 | Palmer .................... | 384/544 X |
| 4,881,842 A | 11/1989 | Farrell et al. | |
| 5,451,869 A | 9/1995 | Alff | |
| 5,885,162 A | 3/1999 | Sakamoto et al. | |
| 6,550,975 B2 * | 4/2003 | Inoue et al. ............. | 384/544 X |
| 6,715,926 B2 | 4/2004 | Tajima et al. | |
| 2004/0022468 A1 * | 2/2004 | Nomura et al. ............. | 384/544 |
| 2004/0095015 A1 | 5/2004 | Kai et al. | |
| 2008/0131045 A1 * | 6/2008 | Nagayama et al. .......... | 384/544 |

FOREIGN PATENT DOCUMENTS

| | | |
|---|---|---|
| JP | 59-16208 | 1/1984 |
| JP | 63-76504 | 5/1988 |
| JP | 63-133641 | 9/1988 |
| JP | 2-2527 | 1/1990 |
| JP | 2-11701 | 1/1990 |
| JP | 2-16864 | 2/1990 |
| JP | 03-279061 | 12/1991 |
| JP | 6-71969 | 10/1994 |

(Continued)

*Primary Examiner*—Greg Binda
(74) *Attorney, Agent, or Firm*—Squire, Sanders & Dempsey, LLP

(57) ABSTRACT

A bearing device for a drive wheel, wherein an annular first seal member is disposed in a clearance between a knuckle member and the outer peripheral surface of an outer ring member. A third clearance small in the radial direction and continued by the length of a first annular side part is formed between the second inner diameter surface of the knuckle member and the first annular side part. Thus, water and slurry are prevented from entering into the clearance formed around a hub bearing.

9 Claims, 56 Drawing Sheets

FOREIGN PATENT DOCUMENTS

| | | |
|---|---|---|
| JP | 2000-221203 | 8/2000 |
| JP | 2001-083166 | 3/2001 |
| JP | 2001-349334 | 12/2001 |
| JP | 2002-172912 | 6/2002 |
| JP | 2003-148501 | 5/2003 |
| JP | 2003-175701 | 6/2003 |
| JP | 2004-132524 | 4/2004 |
| JP | 2004-132782 | 4/2004 |

* cited by examiner

BEARING DEVICE FOR DRIVE WHEEL

TECHNICAL FIELD

The present invention relates to a drive wheel bearing device for supporting a wheel on a vehicle body of an automobile or the like, for example. More particularly, the present invention relates to a drive wheel bearing device, which is capable of preventing water, muddy water, dirt, etc., from entering into a region around a hub bearing.

BACKGROUND ART

Heretofore, wheel bearing devices for automobiles have been combined with a rotational speed detecting mechanism for detecting the rotational speed of a wheel, for use in controlling an antilock brake system (ABS), a traction control system (TCS), or the like. The rotational speed detecting mechanism comprises a magnetic ring or the like mounted on a rotary member, which is rotatable in unison with the wheel and having magnetic characteristics that vary periodically in the circumferential direction, and a rotational speed sensor mounted on a fixed member that is fixed to the vehicle body. The magnetic ring or the like is attached to an inner member (inner ring) of the wheel bearing device, and the rotational speed sensor is attached to an outer member (outer ring) thereof.

Patent Documents 1 through 5 disclose technical concepts, wherein the magnetic ring is integrally combined with a hub bearing, taking into account replacement efficiency and the installation space.

Heretofore, a seal member has been provided for preventing water or the like from entering into the hub bearing. Patent Documents 1 through 5 take into account not only the positional relationship between the magnetic ring and the rotational speed sensor, but also the sealability of the hub bearing.

Patent Documents 6 through 8 disclose technical concepts related to using various seal members for increasing the sealability of the hub bearing.

Patent Document 9 reveals a constant velocity universal joint that is rotatably supported by a hub bearing on a knuckle member mounted on a vehicle body, and a seal structure disposed between the knuckle member and the hub bearing. It is mentioned that the seal structure prevents rainwater, for example, from entering into the hub bearing when the constant velocity universal joint and the hub rotate.

Patent Document 1: Japanese Laid-Open Patent Publication No. 3-279061
Patent Document 2: Japanese Laid-Open Patent Publication No. 6-308145
Patent Document 3: Japanese Laid-Open Patent Publication No. 2001-83166
Patent Document 4: Japanese Laid-Open Patent Publication No. 2000-221203
Patent Document 5: Japanese Laid-Open Patent Publication No. 2004-132782
Patent Document 6: Japanese Laid-Open Patent Publication No. 2001-294011
Patent Document 7: Japanese Laid-Open Patent Publication No. 2002-172912
Patent Document 8: Japanese Laid-Open Patent Publication No. 2003-175701
Patent Document 9: Japanese Laid-Open Utility Model Publication No. 63-133641

DISCLOSURE OF THE INVENTION

However, since the seal member disclosed in the above conventional art is disposed near the balls of the hub bearing, water, muddy water, etc., that have entered the region around the seal member is likely to adversely affect the rotational speed sensor, which is disposed near to the hub bearing.

If the seal structure disclosed in the above conventional art is applied to wheel bearing devices disposed on an independent 4WD vehicle, then it is difficult to prevent large amounts of muddy water or the like splashed by the front wheels from entering inside of passages that communicate with the hub bearings of the rear wheels. Thus, the rotational speed sensors mounted in the passages communicating with the hub bearings cannot be protected appropriately.

It is a general object of the present invention to provide a drive wheel bearing device which is capable of preventing water, muddy water, etc., from entering into a clearance defined around a hub bearing.

A major object of the present invention is to provide a drive wheel bearing device which, when applied to the rear wheels of a 4WD vehicle, is capable of increasing water resistance of the hub bearing in order to prevent, insofar as possible, rainwater or the like which has been splashed by the front wheels rotating at a high speed, from entering inside the hub bearing.

BEST MODE FOR CARRYING OUT THE INVENTION

Figure 1:
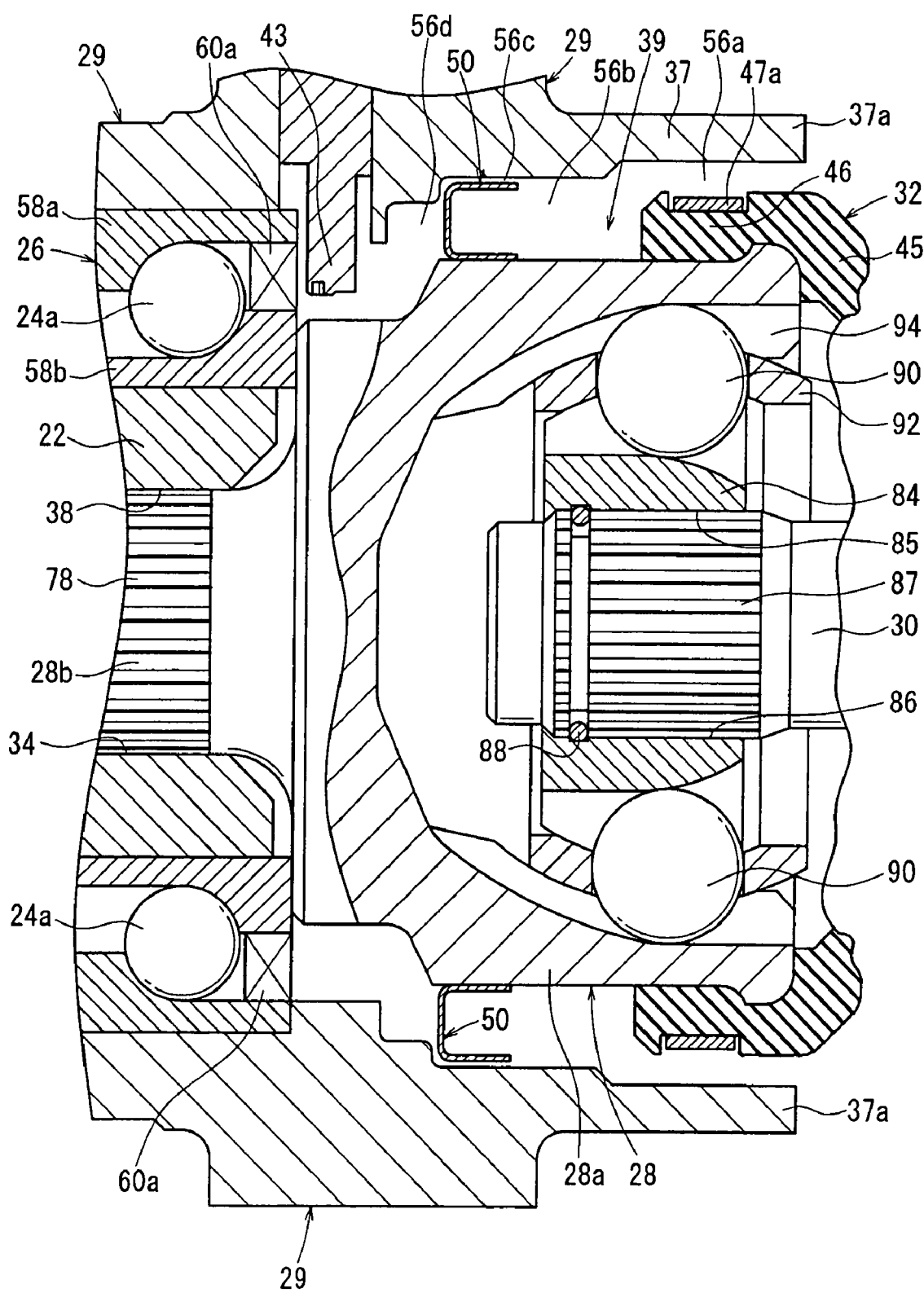
FIG. 1 is a fragmentary vertical cross-sectional view of a drive wheel bearing device according to a first embodiment of the present invention.

In FIG. 1, reference numeral 20 denotes a drive wheel bearing device according to a first embodiment of the present invention.

The drive wheel bearing device 20 comprises a hub 22 for mounting thereon a wheel of an automobile or the like, a hub bearing 26 fitted over an outer circumferential surface of the hub 22 and further having rolling bodies 24a, 24b (the rolling body 24b is omitted from illustration) comprising a plurality of steel balls rollingly held by a retainer, not shown, an outer race member 28 fitted in the hub 22, and a knuckle member (surrounding member) 29 disposed on an outer circumferential surface of the hub 22 and the hub bearing 26.

The outer race member 28 forms part of a first constant velocity universal joint 32 of the Birfield type, which is coupled to an end of a drive shaft 30 to which drive power from an engine or the like is transmitted. A second tripod type constant velocity universal joint 33 (see FIG. 5), which is attached to a differential, not shown, is coupled to the other end of the drive shaft 30.

The hub 22 has a through hole 34 defined axially substantially centrally therein. Serration grooves 38 (or spline grooves) are defined in an inner circumferential surface of the through hole 34, substantially parallel to the axis of the through hole 34.

The hub 22 has a wheel mounting flange, not shown, projecting radially outwardly from an outer circumferential surface thereof. A brake disk and an automobile wheel or the like, not shown, are mounted on the wheel mounting flange by a plurality of unillustrated hub bolts.

Figure 3:
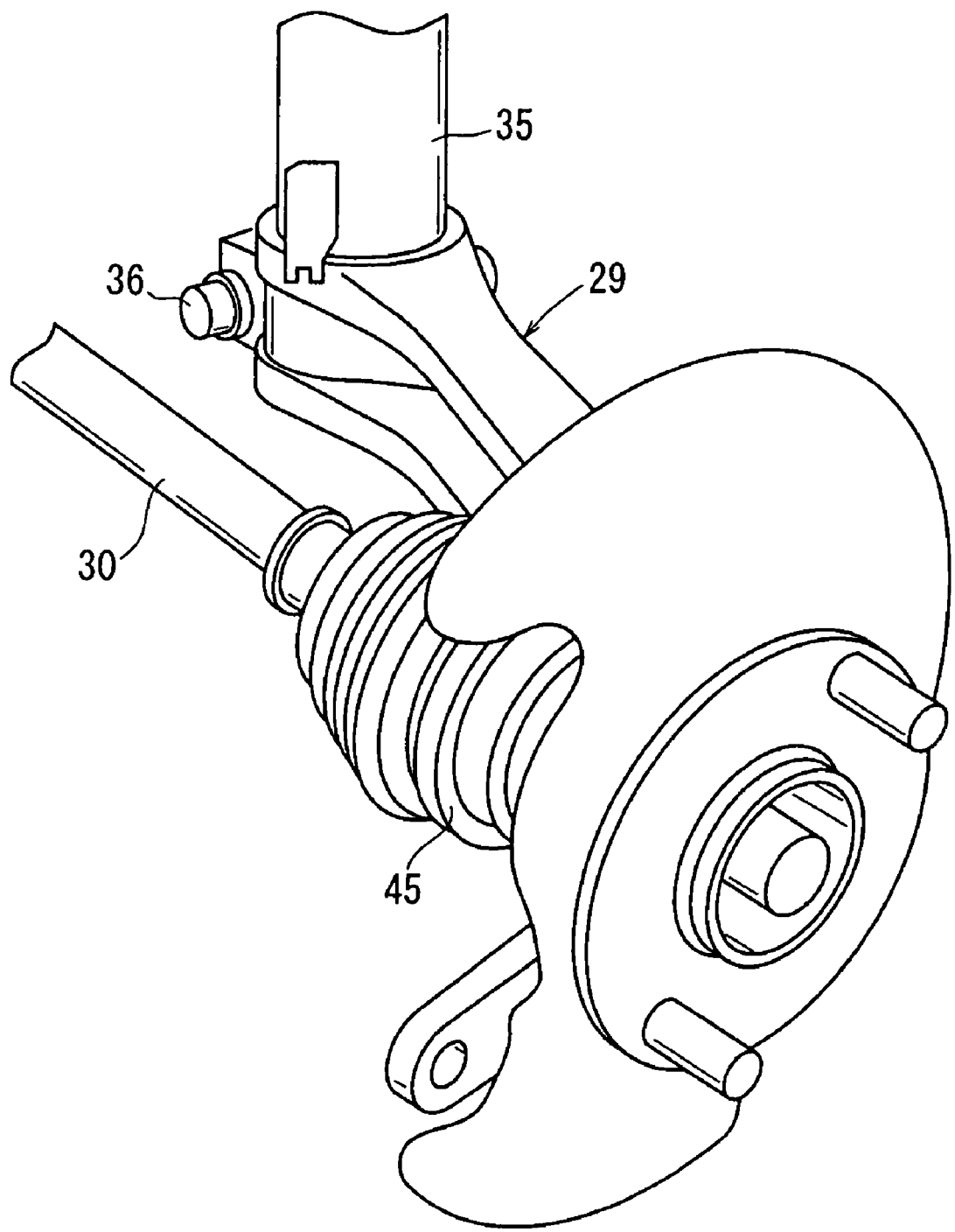
FIG. 3 is a perspective view, partly cut away, showing a knuckle member coupled to the post of a vehicle body suspension.

As shown in FIG. 3, the knuckle member 29 is fastened by a bolt 36 onto a post 35 of a vehicle body suspension. The hub bearing 26 and the hub 22 are fitted in an inner surface of the knuckle member 29.

Since the hub bearing 26 is fixed to the vehicle body, not shown, by the knuckle member 29, both the hub 22, which is disposed inwardly of the hub bearing 26, and the outer race member 28 are rotatably supported by the hub bearing 26.

Figure 2:
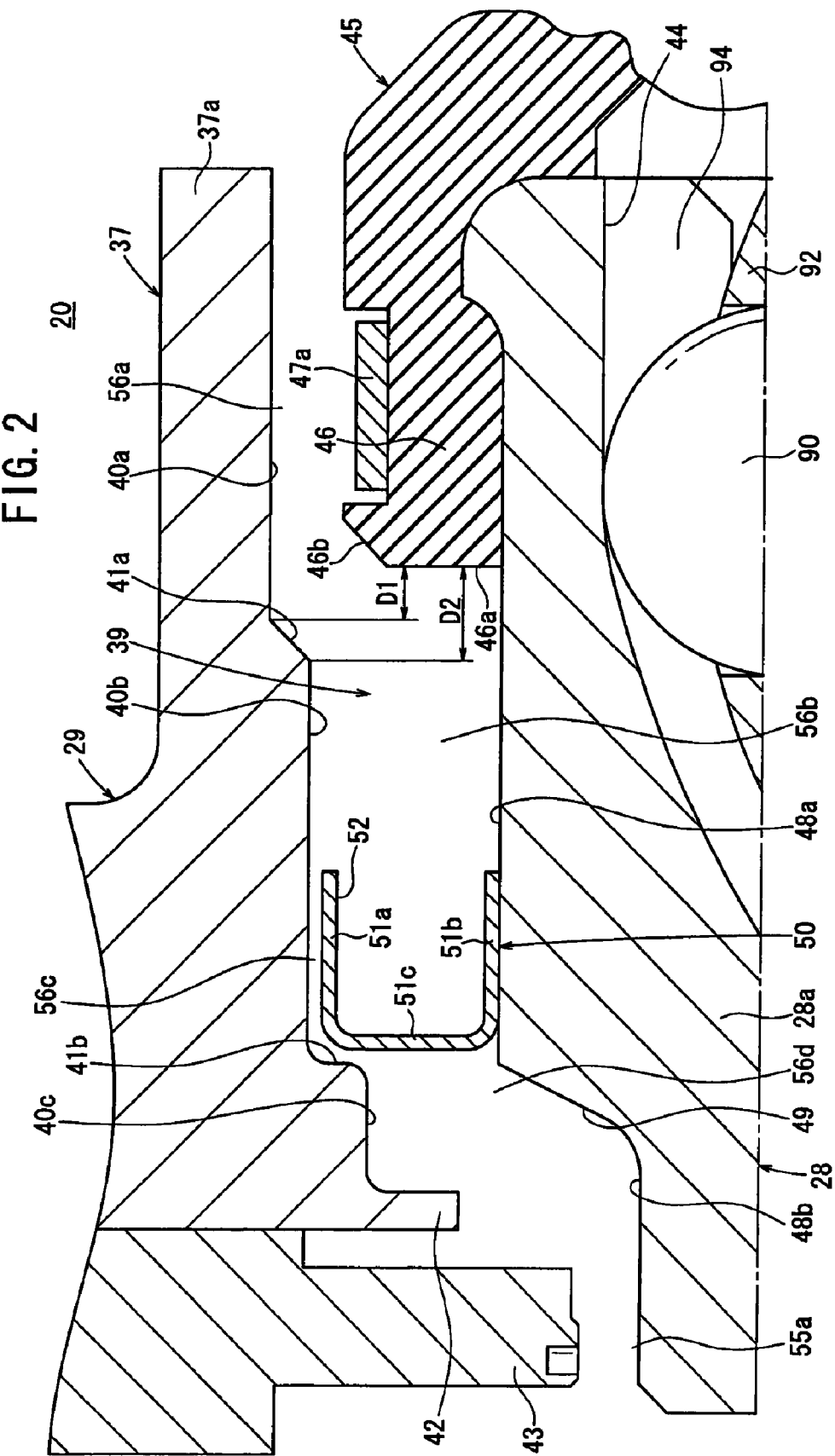
FIG. 2 is an enlarged fragmentary vertical cross-sectional view of FIG. 1.

As shown in FIGS. 1 and 2, the knuckle member 29 includes an annular flange 37 projecting substantially parallel to an outer circumferential surface of the outer race member 28. The annular flange 37 functions to extend a gap 39, defined between the annular flange 37 of the knuckle member 29 and the outer circumferential surface of the outer race member 28, along the axial direction of the outer race member 28.

As shown in FIG. 2, the inner wall surface of the knuckle member 29 that is integrally formed with the annular flange 37 includes, disposed successively in order from an outwardly projecting peripheral portion thereof, a first radial inner surface 40a having a large constant diameter, a first annular step 41a contiguous to the first radial inner surface 40a and having a cross section inclined downwardly to the left, a second radial inner surface 40b contiguous to the first annular step 41a and having a medium-sized constant diameter, a second annular step 41b contiguous to the second radial inner surface 40b and having a cross section inclined vertically downwardly in FIG. 2, a third radial inner surface 40c contiguous to the second annular step 41b and having a small constant diameter, and a ridge 42 contiguous to the third radial inner surface 40c and projecting radially inwardly a predetermined length.

Figure 6:
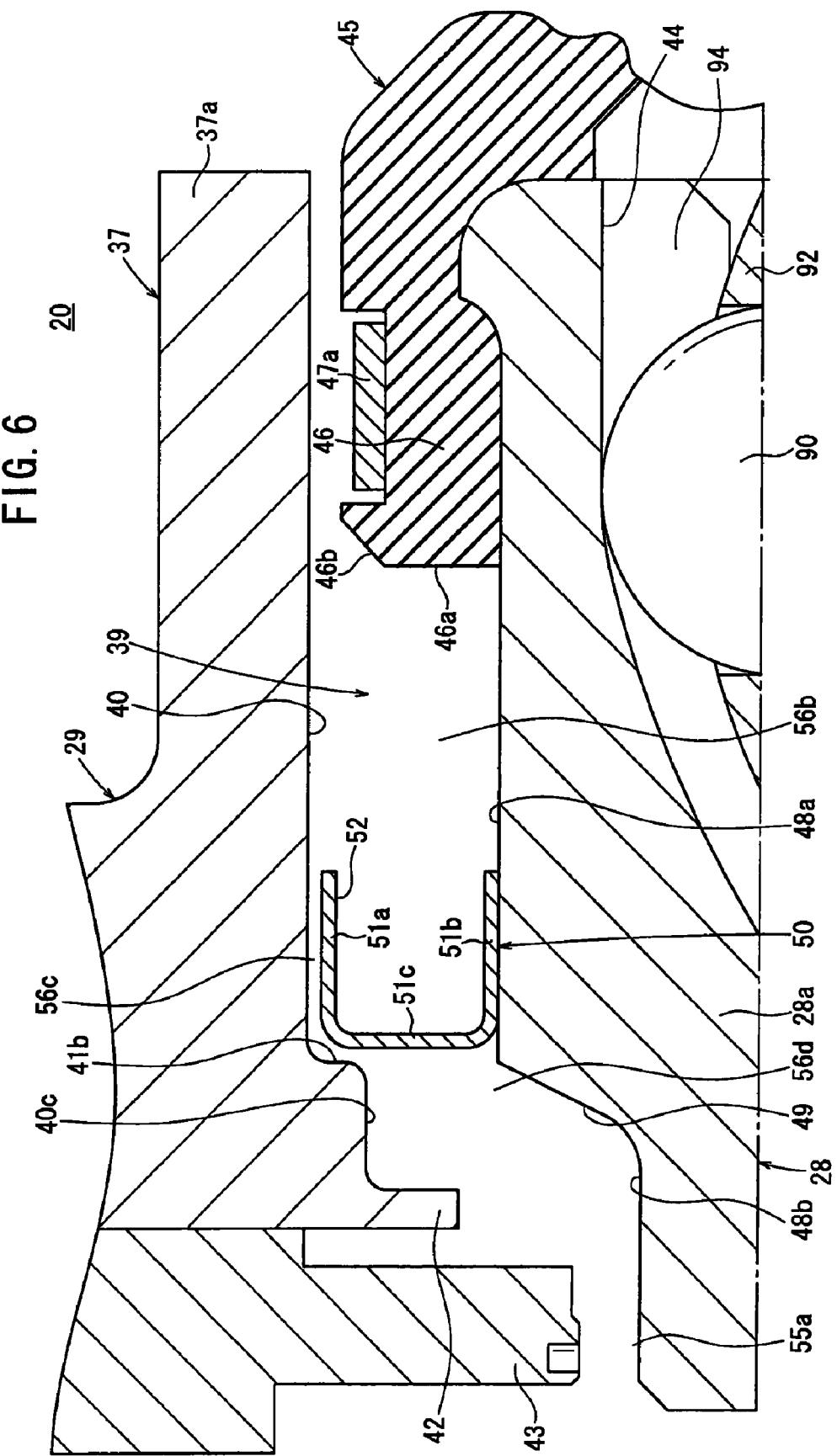
FIG. 6 is an enlarged fragmentary vertical cross-sectional view of a drive wheel bearing device according to a modification of the embodiment of FIG. 2.
Figure 7:
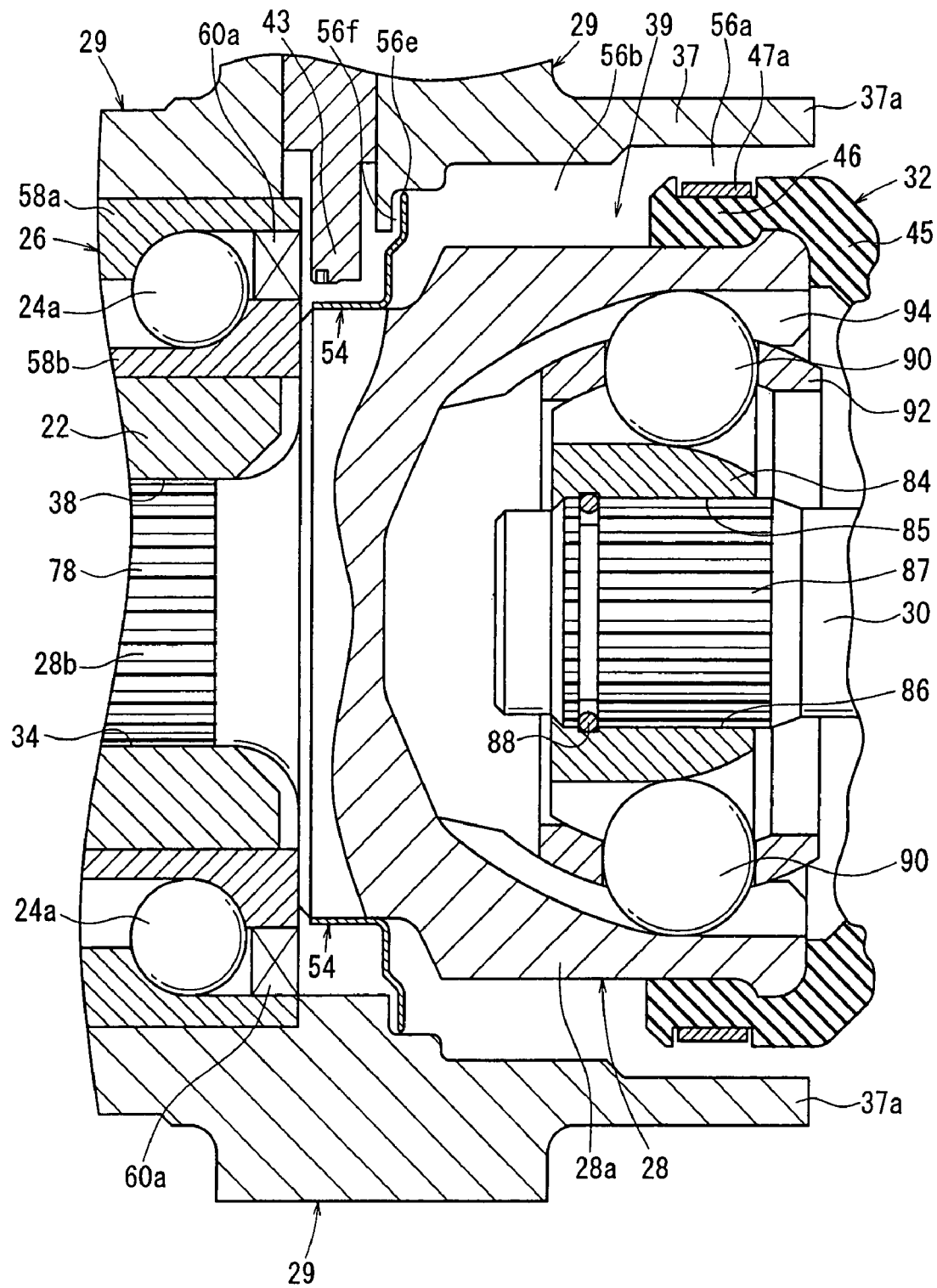
FIG. 7 is a fragmentary vertical cross-sectional view of a drive wheel bearing device according to a second embodiment of the present invention.

As shown in FIG. 6, the first annular step 41a may be dispensed with, such that the first radial inner surface 40a and the second radial inner surface 40b are joined together to form a radial inner surface 40 having the same inside diameter.

The inner wall surface of the knuckle member 29, including the first annular step 41a and the first radial inner surface 40a, which are concave radially outwardly in comparison with the other wall surface, allows the outer race member 28 together with the joint boot 45 mounted thereon to be easily assembled into the opening of the knuckle member 29.

The horizontally disposed peripheral portion 37a of the annular flange 37 of the knuckle member 29 extends to a position where it covers a portion of the joint boot 45, as shall be described later. The peripheral portion 37a which is out of contact with the joint boot 45 performs a sealing function to prevent water, muddy water, etc., from being introduced from the peripheral portion 37a to the outer surface of the joint boot 45. The peripheral portion 37a also provides a clearance therebetween for discharging water, muddy water, etc., which may have entered into the bearing device.

A rotational speed sensor 43 is disposed near the ridge 42 of the knuckle member 29 and projects radially inwardly into the gap 39. The rotational speed sensor 43 comprises a Hall device or the like, for example, and detects a magnetic field generated by a magnetic ring, not shown, thereby generating a detection signal.

The outer race member 28 has an outer circumferential surface extending from the opening 44 toward the shaft 28b. The outer circumferential surface includes a first radial outer surface 48a to which a larger-diameter end 46 of the joint boot 45 is fastened by a metal band 47a and having a substantially constant diameter, an annular step 49 contiguous to the first radial outer surface 48a and having a cross section inclined downwardly to the left as shown in FIG. 2, and a second radial outer surface 48b contiguous to the annular step 49 and having a substantially constant diameter, which is smaller than the first radial outer surface 48a. The second radial outer surface 48b extends to the bottom of a cup 28a.

The larger-diameter end 46 of the joint boot 45 includes an end face 46a, which confronts a first seal member 50 to be described later. The end face 46a includes a slanted surface 46b substantially parallel to the first annular step 41a. The slanted surface 46b increases the opening area of a discharge passage, through which water, muddy water, etc., that is introduced into the gap is discharged externally from the bearing device.

The boundary between the radial inner surface 40a and the first annular step 41a and the end face 46a of the larger-diameter end 46 are disposed in respective positions that are offset horizontally by a predetermined distance D1. The boundary between the first annular step 41a and the second radial inner surface 40b and the end face 46a of the larger-diameter end 46 are disposed in respective positions that are offset horizontally by a predetermined distance D2 (see FIG. 2).

The offsets provide a large distance by which the first annular step 41a and the slanted surface 46b of the larger-diameter end 46 of the joint boot 45 are spaced from each other, resulting in the opening of the passage having a large volume for discharging water, muddy water, etc., stored within the first seal member 50, and thereby allowing such water, muddy water, etc., to be discharged easily.

The first seal member 50, which is made of a metal material and has an annular shape, is disposed in a region where the second radial inner surface 40b of the knuckle member 29 and the first radial outer surface 48a of the outer race member 28 face each other.

Figure 4:
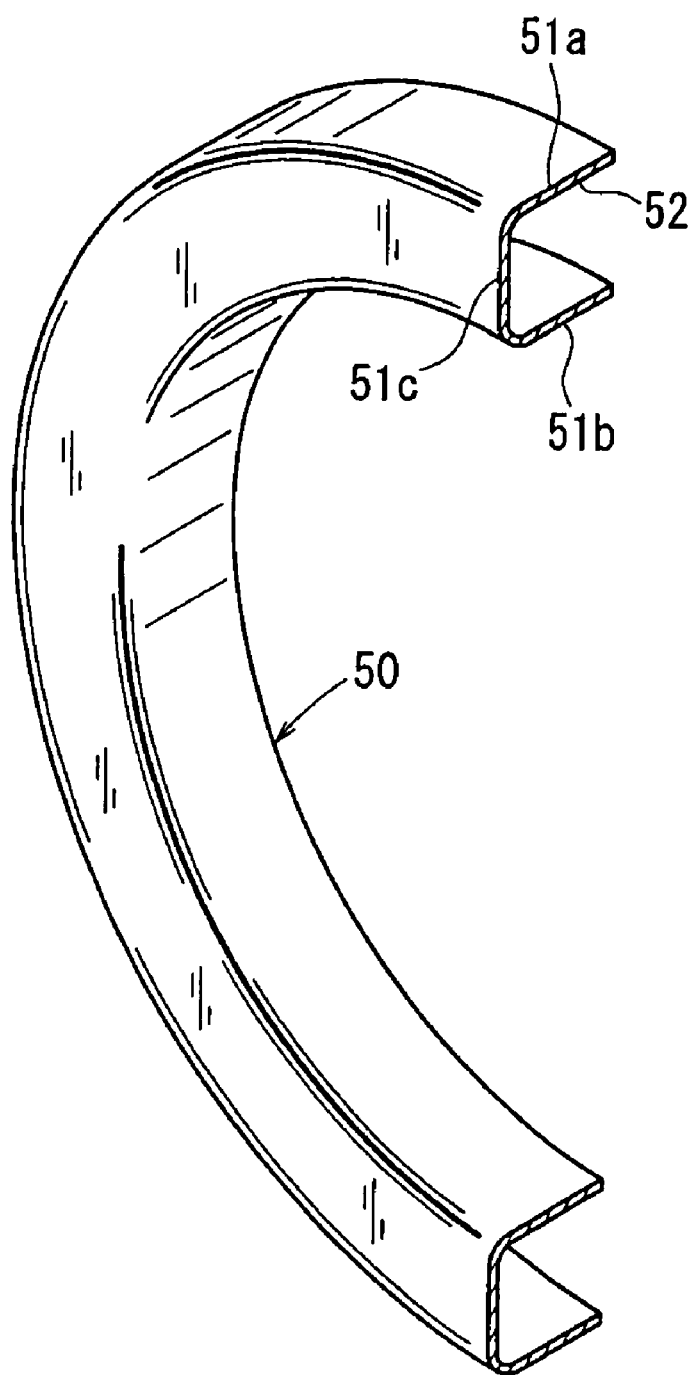
FIG. 4 is a perspective view, partly broken away, of a first seal member of the drive wheel bearing device shown in FIG. 1.

As shown in FIGS. 2 and 4, the first seal member 50 comprises an outer first annular side wall 51a and an inner second annular side wall 51*b*, which are spaced from each other by a predetermined distance so as to face each other substantially in parallel with each other. A third annular side wall 51*c* extends perpendicularly to the first annular side wall 51*a* and the second annular side wall 51*b*, and interconnects the first annular side wall 51*a* and the second annular side wall 51*b*. The outer first annular side wall 51*a* functions as a radial outer end of the first seal member 50.

When the second annular side wall 51*b* is held in contact with and fastened to the outer circumferential surface of the outer race member 28, the first seal member 50 becomes locked onto the outer circumferential surface of the outer race member 28. The first seal member 50 has an opening 52 defined by the first annular side wall 51*a* and the second annular side wall 51*b*, wherein the opening 52 is oriented outwardly toward the joint boot 45.

Stated otherwise, the opening 52 of the first seal member 50 opens toward a direction in which water, muddy water, etc., enters along the gap 39 that is defined between the knuckle member 29 and the outer race member 28. The first seal member 50, which has a folded shape as shown in FIGS. 2 and 4, can easily be press-fitted onto the outer circumferential surface of the outer race member 28, thus simplifying the assembly process.

As shown in FIG. 2, the gap 39 includes a first clearance 56*a* defined between the first radial inner surface 40*a* of the knuckle member 29 and the larger-diameter end 46 of the joint boot 45, a second clearance 56*b* defined between the second radial inner surface 40*b* of the knuckle member 29 and the first radial outer surface 48*a* of the outer race member 28, wherein the second clearance 56*b* has a larger spacing than the first clearance 56*a* and extends along the axial direction of the outer race member 28, a narrow third clearance 56*c* defined between the second radial inner surface 40*b* of the knuckle member 29 and the first annular side wall 51*a* of the first seal member 50 and extending continuously over the same length as the first annular wall 51*a*, and a fourth clearance 56*d* defined between the third radial inner surface 40*c* of the knuckle member 29 and the annular step 49 of the outer race member 28 and having a large spacing.

As shown in FIG. 1, annular seal members 60*a*, 60*b* (the annular seal member 60*b* has been omitted from illustration) are mounted in position between an outer first hollow cylindrical body 58*a* and an inner second hollow cylindrical body 58*b* of the hub bearing 26 at axially opposite ends of the hub bearing 26, for preventing water, dirt, etc., from entering into the hub bearing 26 where the rolling bodies 24*a*, 24*b* roll.

The outer race member 28 comprises an integral combination of a cup 28*a* formed in a cup shape on one end thereof and a cylindrical shaft 28*b* formed on the other end thereof. The cylindrical shaft 28*b* is fitted in the through hole 34 of the hub 22.

The shaft 28*b* has serrations 78 (or splines) formed on the outer circumferential surface thereof. When the shaft 28*b* is inserted into the through hole 34 of the hub 22, the serrations 78 are fitted into serration grooves 38 (or spline grooves) in the through hole 34.

Specifically, the serrations 78 (or splines) of the shaft 28*b* and the serration grooves 38 (or spline grooves) of the hub 22 mesh with each other, whereby the outer race member 28 is fitted into the hub 22 through the serrations (or splines), such that the outer race member 28 is limited against rotation relative to the hub 22. Therefore, when drive power is transmitted through the first constant velocity universal joint 32, the outer race member 28 and the hub 22 rotate in unison with each other.

If the serration grooves 38 are formed along the inner circumferential surface of the through hole 34, then corresponding serrations 78 are formed on the outer circumferential surface of the shaft 28*b*. If spline grooves are formed along the inner circumferential surface of the through hole 34, then splines are formed on the outer circumferential surface of the shaft 28*b*.

When the shaft 28*b* of the outer race member 28 is inserted into the through hole 34, the bottom surface of the cup 28*a* of the outer race member 28 abuts and is axially positioned against the end face of the hub bearing 26. When the distal end of the shaft 28*b* is fixed in position by a crimping mechanism, a bolt, or the like, not shown, the hub 22 is firmly secured to the outer race member 28. The outer race member 28 is thus made both angularly and axially displaceable in unison with the hub 22.

Figure 5:
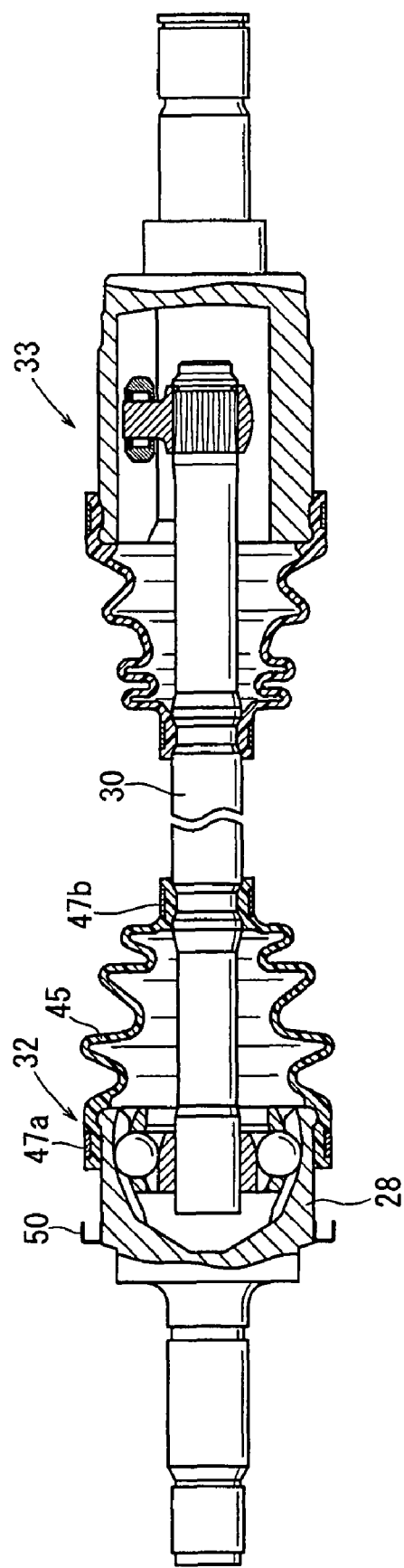
FIG. 5 is a vertical cross-sectional view showing a first constant velocity universal joint and a second constant velocity universal joint, which are connected respectively to both ends of a drive shaft.

The larger-diameter end 46 of the joint boot 45, which is in the form of a bellows, is fastened to the outer circumferential surface of the outer race member 28 by a large-diameter metal band 47*a*, whereas the smaller-diameter end of the joint boot 45 is mounted on the outer circumferential surface of the drive shaft 30 by a small-diameter metal band 47*b* (see FIG. 5).

An inner ring 84 having a substantially spherical outer circumferential surface is inserted in a radial inner portion of the outer race member 28. The inner ring 84 includes an insertion hole 86 defined substantially centrally therein and extending axially, with spline grooves 85 defined on an inner circumferential surface thereof. The spline grooves 85 provided in the insertion hole 86 extend substantially parallel to the axis of the inner ring 84. An end of the drive shaft 30, which is inserted into the insertion hole 86, has splines 87 defined on an outer circumferential surface thereof complementary to the insertion hole 86.

When the end of the drive shaft 30 is inserted into the insertion hole 86 in order to bring the splines 87 into fitting engagement with the spline grooves 85 provided in the insertion hole 86, the inner ring 84 and the drive shaft 30 are limited against relative rotation, and hence the drive shaft 30 and the inner ring 84 rotate in unison with each other. Drive power from the engine, not shown, is thus reliably transmitted through the drive shaft 30 to the inner ring 84.

A stopper 88 having a substantially C-shaped cross section is mounted on the end of the drive shaft 30 with the splines 87 formed thereon. The stopper 88 is resilient and is urged radially outwardly. In other words, the stopper 88 engages with the inner ring 84 in order to prevent the drive shaft 30 from being removed from the inner ring 84.

A plurality of balls 90 are disposed between the inner ring 84 and the outer race member 28, wherein the balls 90 are spaced at equal angular intervals in the circumferential direction. The balls 90 are rotatably accommodated within retaining windows of a retainer 92, and engage inside of respective track grooves 94 that are defined in the radial inner surface of the outer race member 28. The track grooves 94 correspond in number with the number of balls 90, and the track grooves 94 extend in the axial direction along the outer race member 28.

The drive wheel bearing device 20 according to the first embodiment of the present invention is basically constructed as described above. Operations and advantages of the drive wheel bearing device 20 shall now be described below.

Drive power produced by an engine or the like, not shown, is transmitted from the second constant velocity universal joint 33 to the drive shaft 30, thereby rotating the inner ring 84, which is splined to the drive shaft 30 in unison therewith. The outer race member 28 of the constant velocity universal joint 32 is rotated through the track grooves 94, wherein the balls 90 that are disposed along the outer circumferential surface of the inner ring 84 engage within the track grooves 94.

Since the outer race member 28 is held in meshing engagement with the through hole 34 in the hub 22 through the serrations 78 (or splines) provided on the shaft 28b, the hub 22 rotates in unison with the outer race member 28, while being supported by the hub bearing 28. The hub bearing 26 is fastened to a vehicle body, not shown, by the knuckle member 29.

Drive power transmitted from the engine or the like is transmitted through the wheel-mounting flange of the hub 22 to the brake disk and/or to the wheel mounted on the brake disk.

In the first embodiment, the horizontally disposed peripheral portion 37a of the annular flange 37 of the knuckle member 29 extends to a position where it covers a portion of the joint boot 45. The peripheral portion 37a is out of contact with the joint boot 45 and performs a sealing function to prevent water, muddy water, etc., from being introduced from the peripheral portion 37a to the outer surface of the joint boot 45. The peripheral portion 37a also provides a clearance therebetween for discharging water, muddy water, etc., which may have entered into the bearing device.

In the first embodiment, furthermore, there are provided the first clearance 56a defined between the first radial inner surface 40a of the knuckle member 29 and the larger-diameter end 46 of the joint boot 45, the second clearance 56b defined between the second radial inner surface 40b of the knuckle member 29 and the first radial outer surface 48a of the outer race member 28, wherein the second clearance 56b has a larger spacing than the first clearance 56a and extends along the axial direction of the outer race member 28, the third clearance 56c defined between the second radial inner surface 40b of the knuckle member 29 and the first annular side wall 51a of the first seal member 50, wherein the third clearance 56c is narrow and extends continuously over the same length as the first annular wall 51a, and the fourth clearance 56d defined between the third radial inner surface 40c of the knuckle member 29 and the annular step 49 of the outer race member 28 and having a large spacing. The narrow third clearance 56c formed between the first seal member 50 and the second radial inner surface 40b of the knuckle member 29 performs a sealing function.

Therefore, the gap between the second radial inner surface 40b of the knuckle member 29 and the radial outer end of the first seal member 50, in a region around the hub bearing 26, is small enough to perform an appropriate sealing function while preventing water, etc., from entering into the hub bearing 26.

In the first embodiment, the knuckle member 29 includes the annular flange 37 projecting substantially in parallel toward the outer circumferential surface of the outer race member 28. Further, the annular flange 37 includes, on an inner circumferential surface thereof facing the outer circumferential surface of the outer race member 28, the first annular step 41a whose diameter increases in a direction away from the outer circumferential surface of the outer race member 28, and the first radial inner surface 40a contiguous to the first annular step 41a. The first annular step 41a and the first radial inner surface 40a extend to the peripheral portion 37a, which communicates with the exterior. Accordingly, in the first embodiment, water, muddy water, etc., which has entered into the gap 39 and is prevented from entering further into the bearing device by the first seal member 50 having the opening 52, is stored in a lower portion of the gap 39 by gravity. Such stored water, muddy water, etc., is easily discharged along the first annular step 41a and the first radial inner surface 40a. The first annular step 41a may have a tapered cross-sectional shape or a rounded cross-sectional shape, for example, with a diameter that becomes progressively greater toward the peripheral portion 37a.

In the first embodiment, the drive wheel bearing device 20 is illustrated as being applied to a Birfield-type constant velocity universal joint. However, the drive wheel bearing device 20 is not limited to use with a Birfield-type constant velocity universal joint, but may also be applied to a tripod-type constant velocity universal joint, as shall be described below.

A drive wheel bearing device 20a according to a second embodiment of the present invention is shown in FIGS. 7 through 12. Components of the drive wheel bearing device 20a according to the embodiment described below that are identical to those of the drive wheel bearing device 20 according to the first embodiment are designated using the same reference numerals, and such features shall not be described in detail below.

The drive wheel bearing device 20a according to the second embodiment differs in that it includes a second seal member 54 as an alternative to the first seal member 50, wherein the second seal member 54 is different in shape from the first seal member 50.

The second seal member 54, which has an annular shape and is made of metal, is disposed near a region where the first seal member 50 is not mounted, and within a region where the third radial inner surface 40c of the knuckle member 29 and the second radial outer surface 48b of the outer race member 28 face each other.

Figure 8:
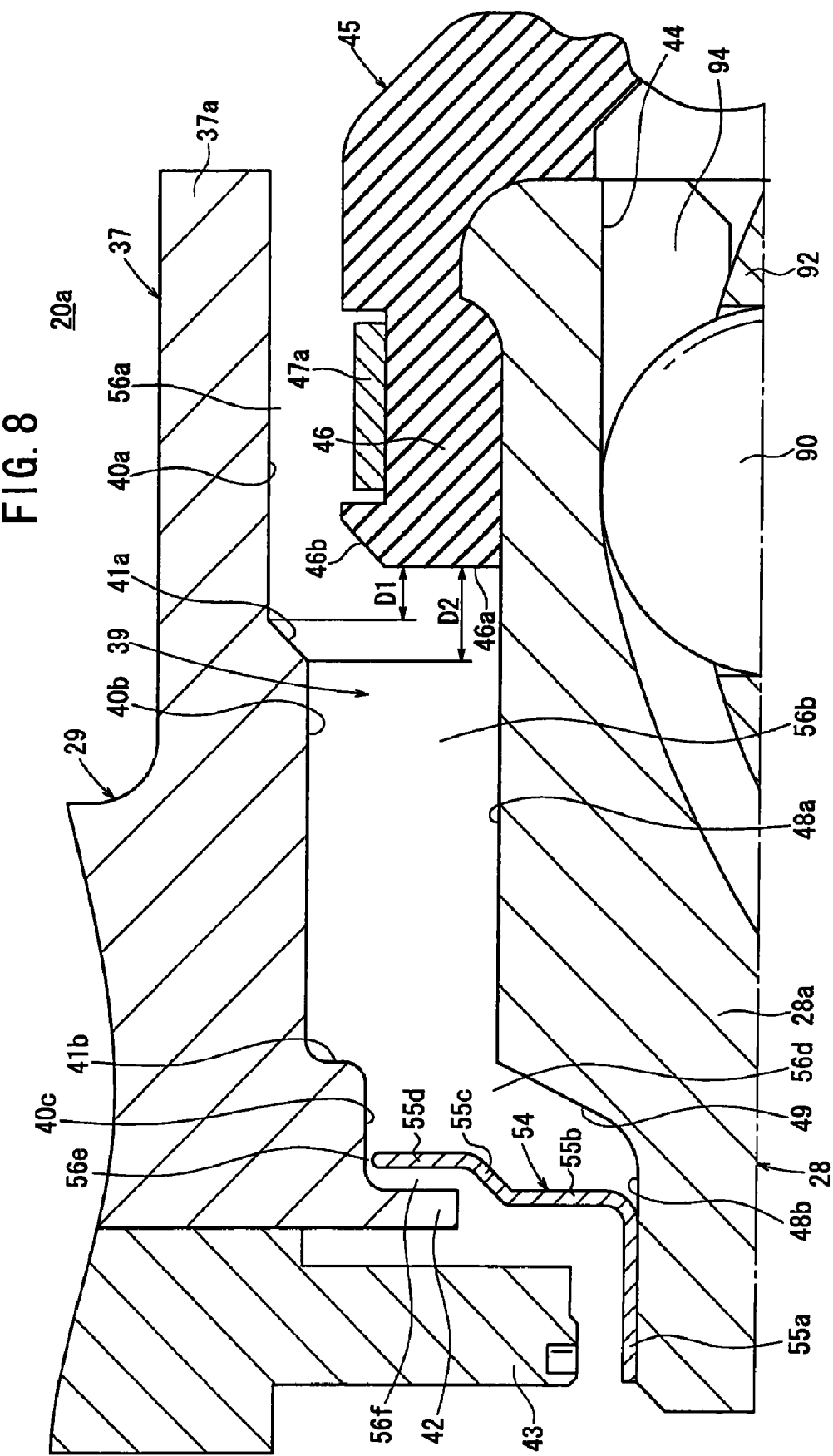
FIG. 8 is an enlarged fragmentary vertical cross-sectional view of FIG. 7.
Figure 9:
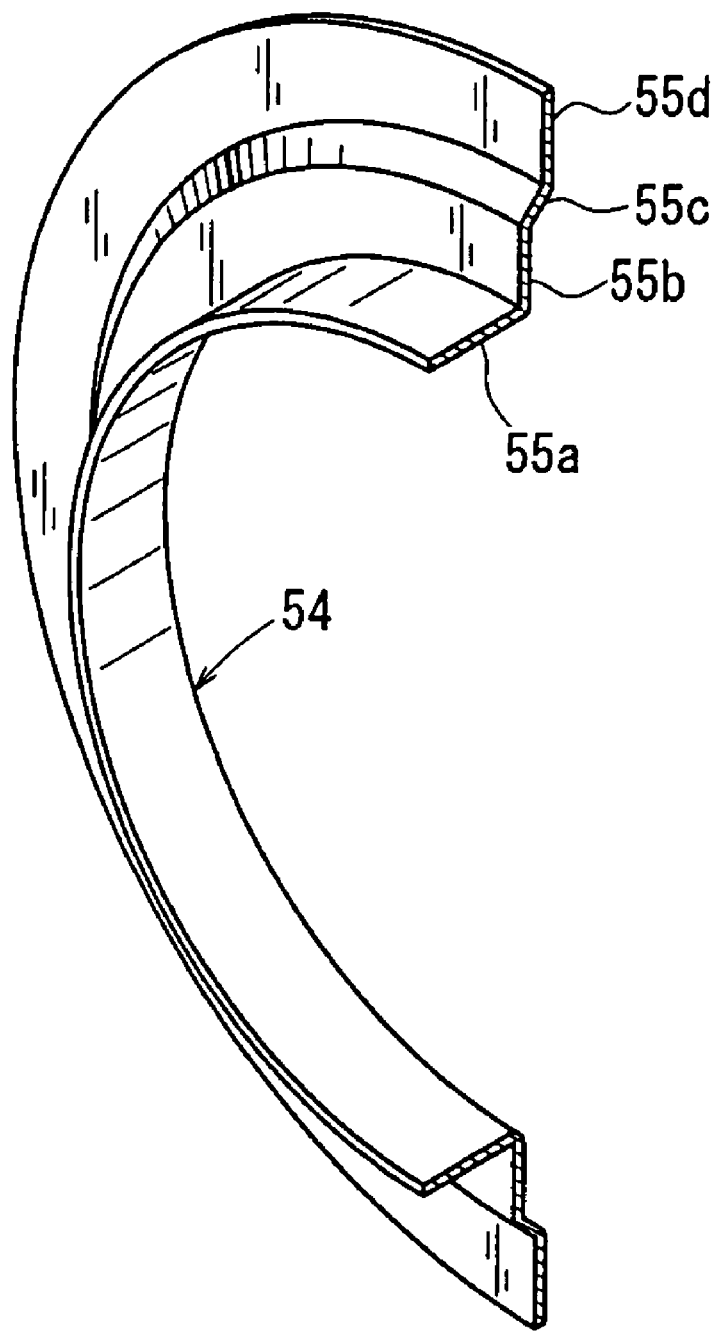
FIG. 9 is a perspective view, partly broken away, of a second seal member of the drive wheel bearing device shown in FIG. 7.
Figure 10:
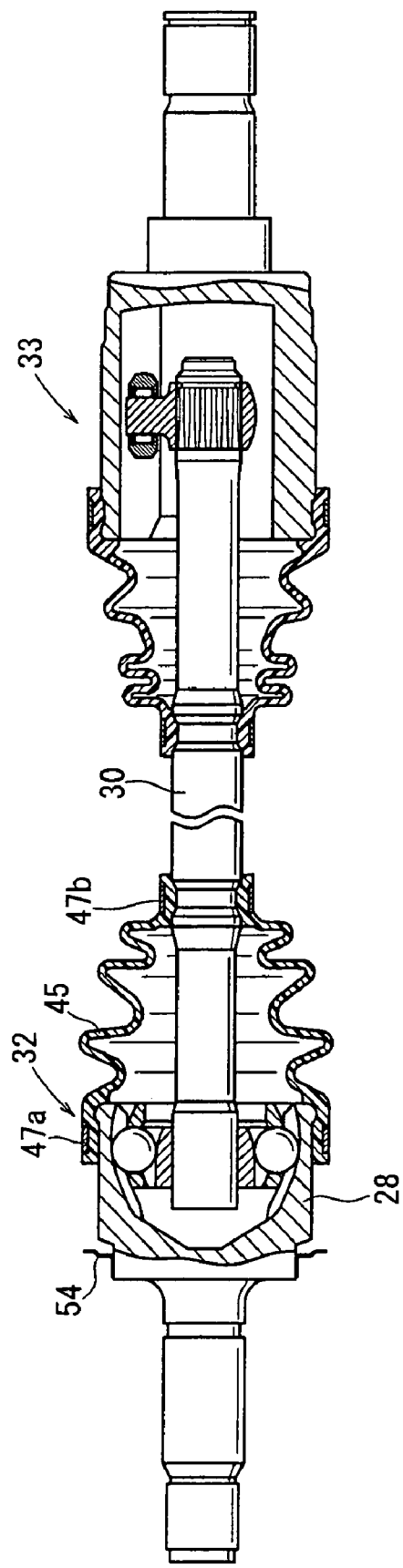
FIG. 10 is a vertical cross-sectional view showing a first constant velocity universal joint and a second constant velocity universal joint, which are connected respectively to both ends of a drive shaft.
Figure 11:
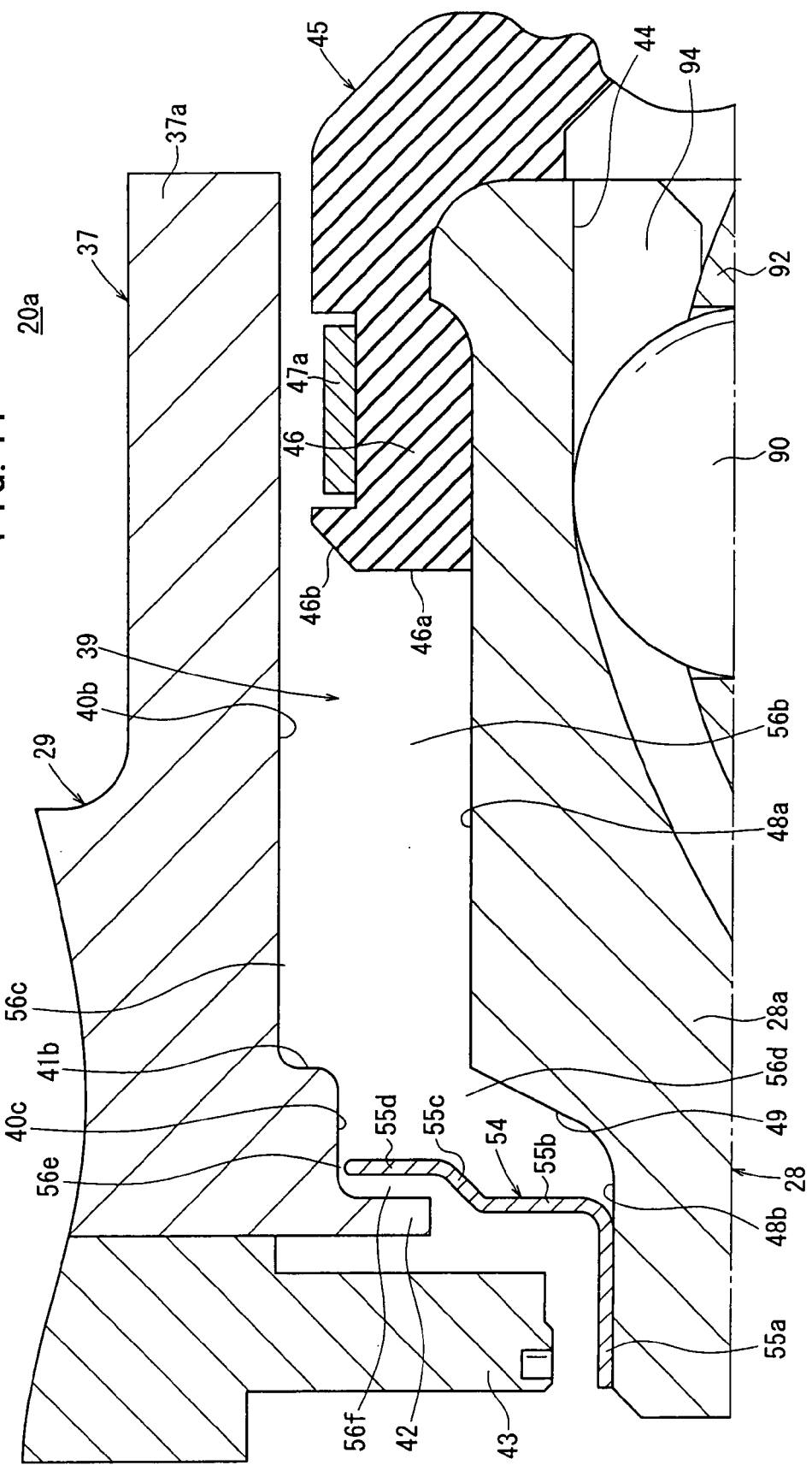
FIG. 11 is an enlarged fragmentary vertical cross-sectional view of a drive wheel bearing device according to a modification of the embodiment of FIG. 7.

As shown in FIGS. 8 and 9, the second seal member 54 comprises a hollow cylindrical member 55a, which is held in contact with and fastened to the second radial outer surface 48b of the outer race member 28 in order to lock the second seal member 54 onto the outer race member 28, a bent member 55b bent into an L-shaped cross section substantially perpendicularly to the hollow cylindrical member 55a, a slanted member 55c contiguous to the bent member 55b and inclined upwardly to the left in the cross-sectional view shown in FIG. 8, and a circumferential member 55d contiguous to the slanted member 55c and extending radially substantially in parallel with the ridge 42 of the knuckle member 29, with a certain clearance formed therebetween. The circumferential member 55d functions as a radial outer end of the second seal member 54.

The gap 39 includes a first clearance 56a defined between the first radial inner surface 40a of the knuckle member 29 and the larger-diameter end 46 of the joint boot 45, a second clearance 56b defined between the second radial inner surface 40b of the knuckle member 29 and the first radial outer surface 48a of the outer race member 28, wherein the second clearance 56b has a larger spacing than the first clearance 56a and extends along the axial direction of the outer race member 28, a narrow fifth clearance 56e defined between the third radial inner surface 40c of the knuckle member 29 and the circumferential member 55d of the second seal member 54, and a sixth clearance 56f defined between a wall surface of the ridge 42 of the knuckle member 29 and the circumferential member 55d of the second seal member 54.

Therefore, the gap provided by the fifth clearance 56e and the sixth clearance 56f, between the second seal member 54 and a wall surface of the knuckle member 29 in a region around the hub bearing 26, is small enough to perform an appropriate sealing function while preventing water, etc., from entering into the hub bearing 26.

Figure 12:
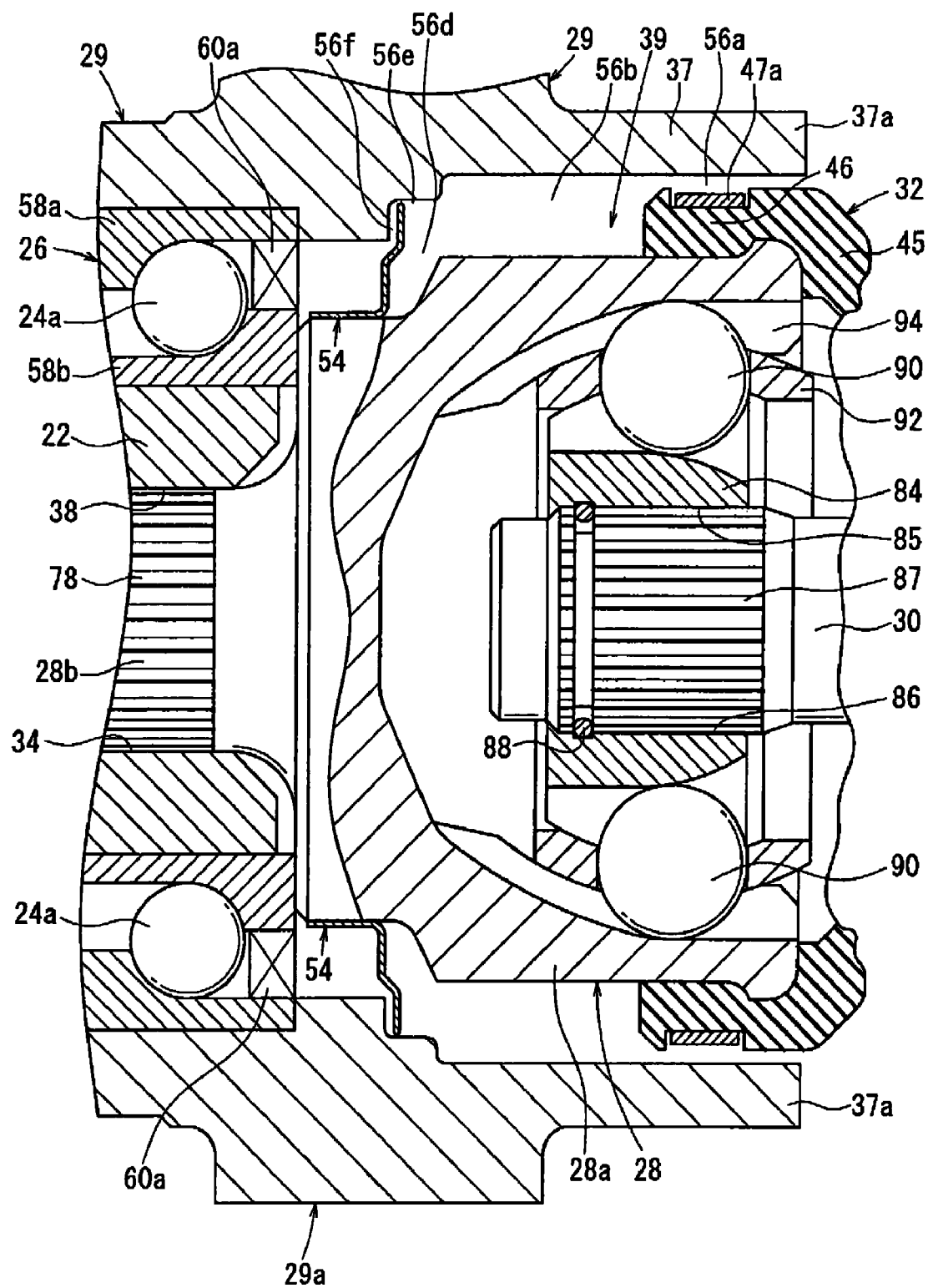
FIG. 12 is a fragmentary vertical cross-sectional view of the drive wheel bearing device according to the modification of the embodiment of FIG. 7.
Figure 13:
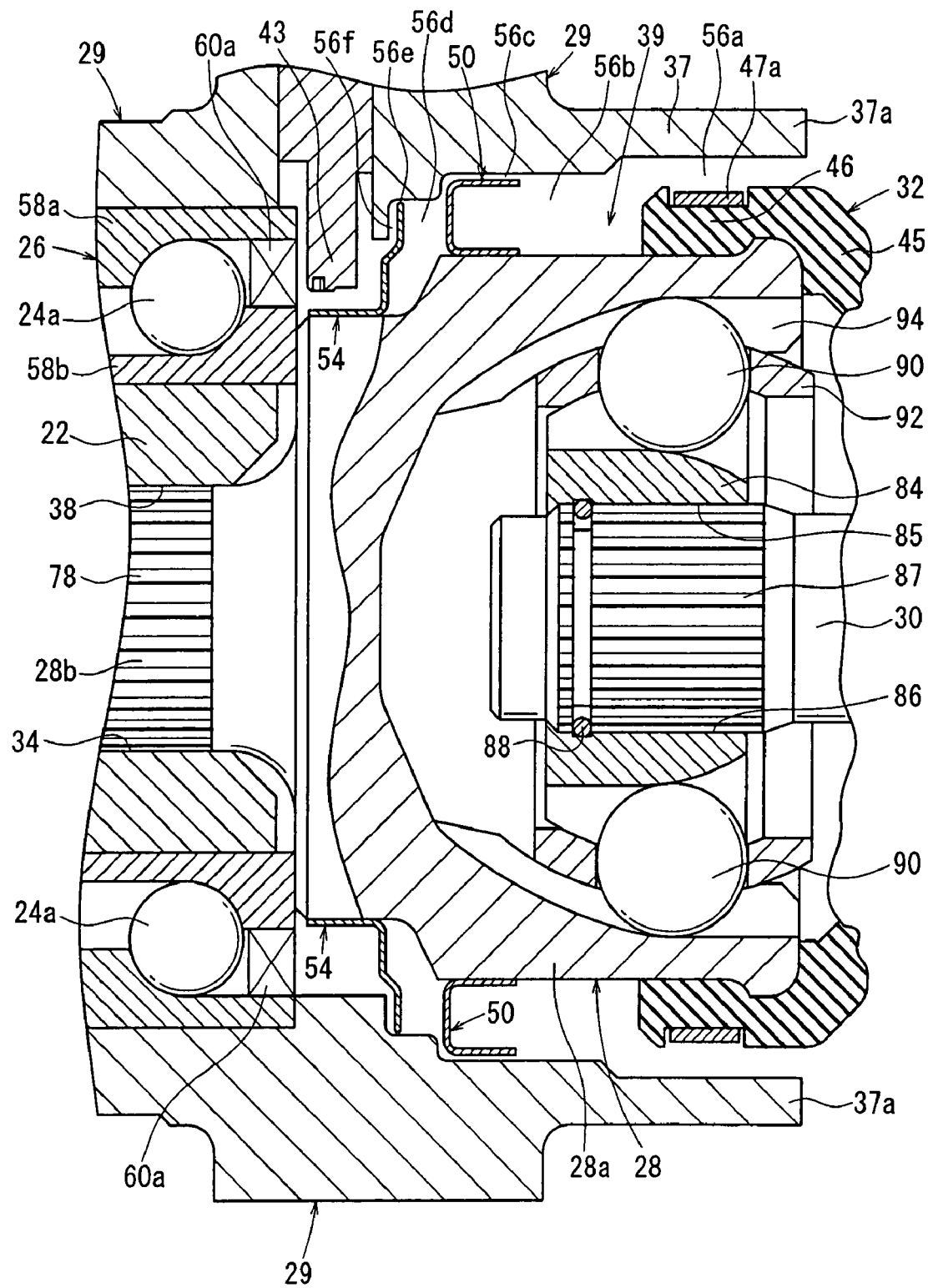
FIG. 13 is a fragmentary vertical cross-sectional view of a drive wheel bearing device according to a third embodiment of the present invention.

The second embodiment may also be applied to a drive wheel bearing device 20*a*, which does not include the rotational speed sensor 43 shown in FIG. 12.

A drive wheel bearing device 20*b* according to a third embodiment is shown in FIGS. 13 through 20.

According to the third embodiment, the drive wheel bearing device 20*b* differs in that, in addition to the seal members 60*a*, 60*b*, a first seal member 50 and a second seal member 54, which are annular in shape and are separated from each other, are disposed inside the gap 39 between the knuckle member 29 and the outer circumferential surface of the outer race member 28, for thereby preventing water, mud, dirt, etc., from entering into the hub bearing 26, including the rolling bodies 24*a*, 24*b*.

Figure 14:
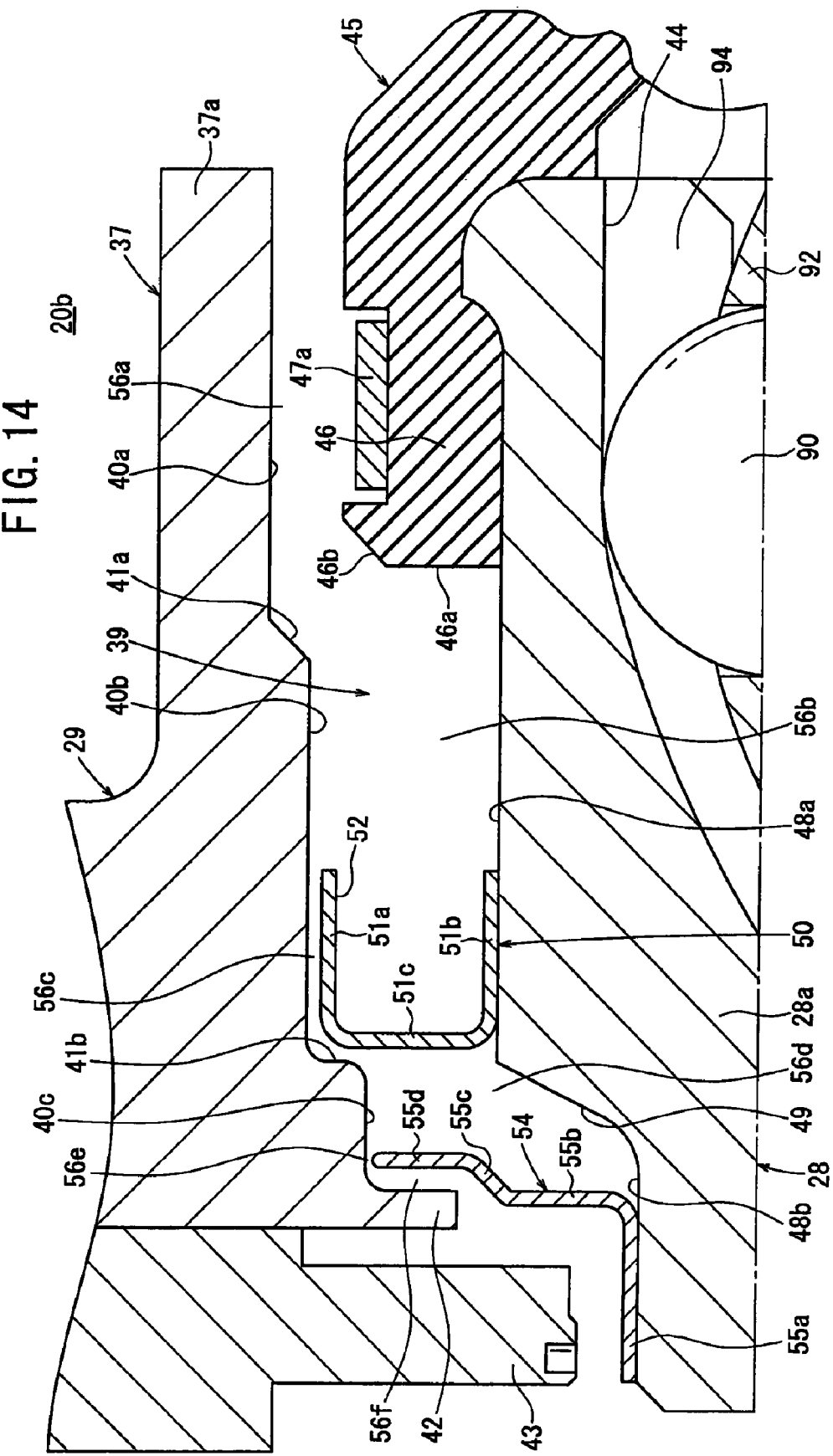
FIG. 14 is an enlarged fragmentary vertical cross-sectional view of FIG. 13.
Figure 15:
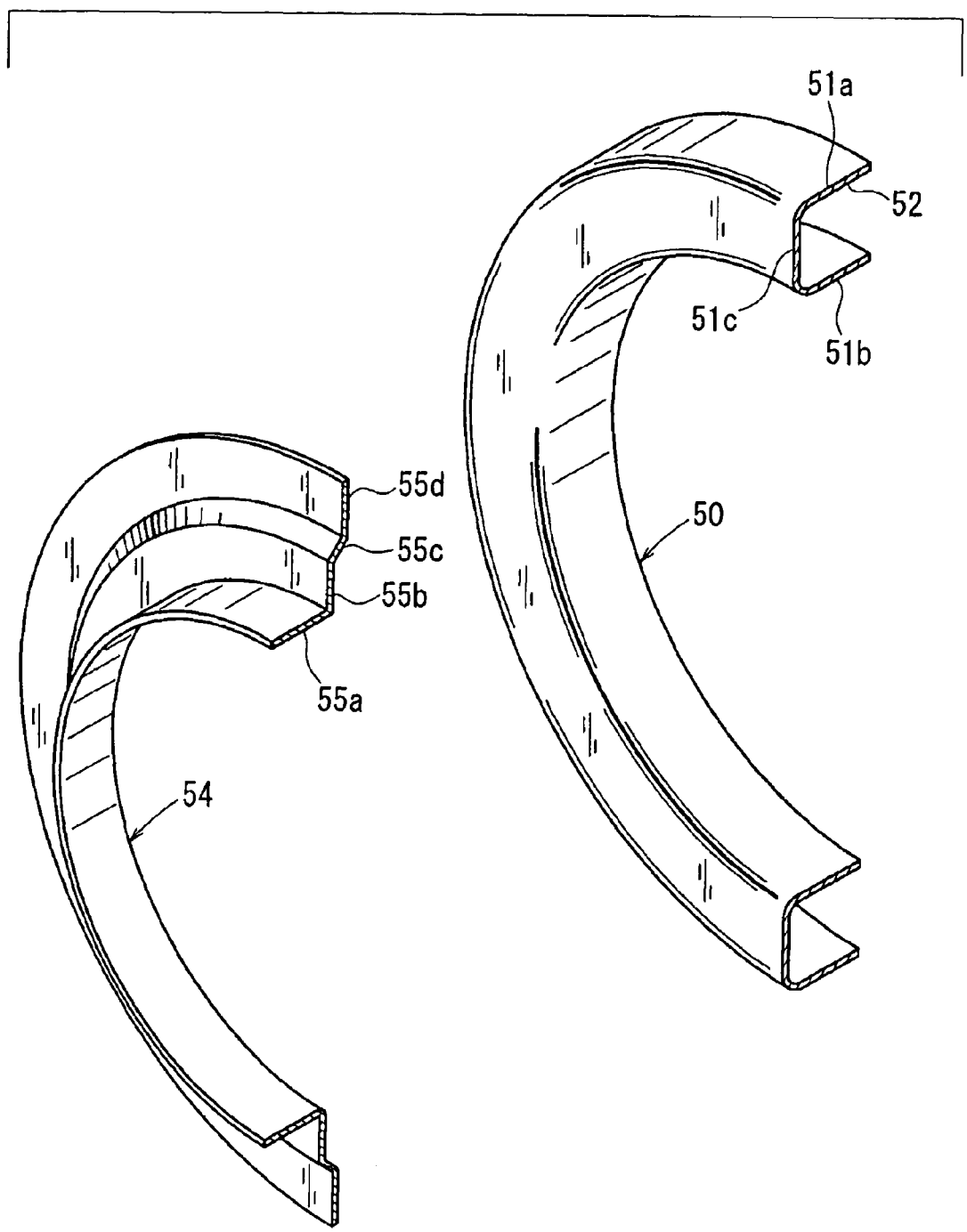
FIG. 15 is a perspective view, partly broken away, of a first seal member and a second seal member of the drive wheel bearing device shown in FIG. 13.
Figure 16:
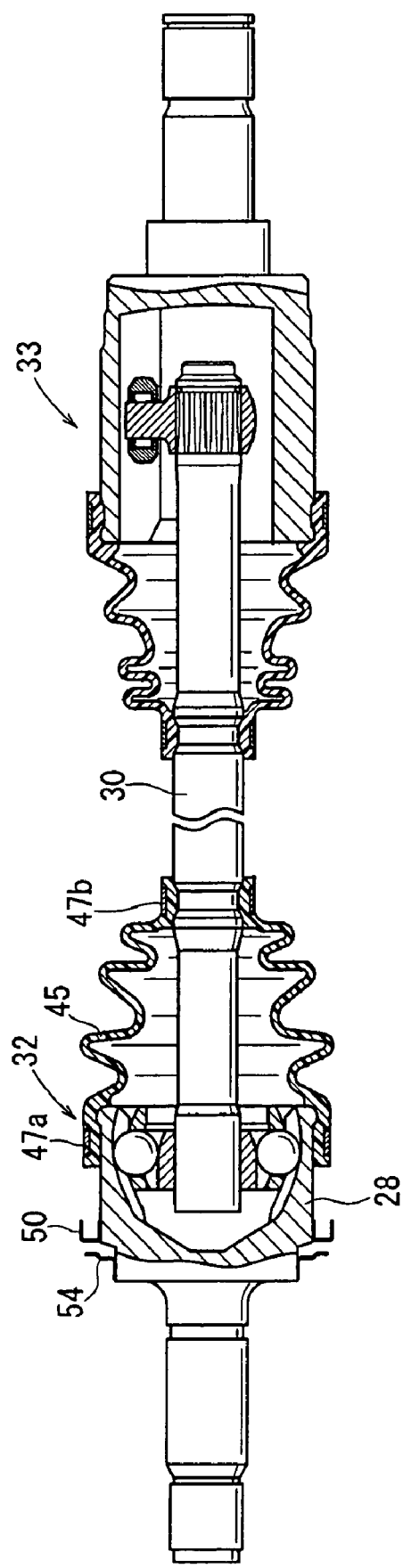
FIG. 16 is a vertical cross-sectional view showing a first constant velocity universal joint and a second constant velocity universal joint, which are connected respectively to both ends of a drive shaft.
Figure 17:
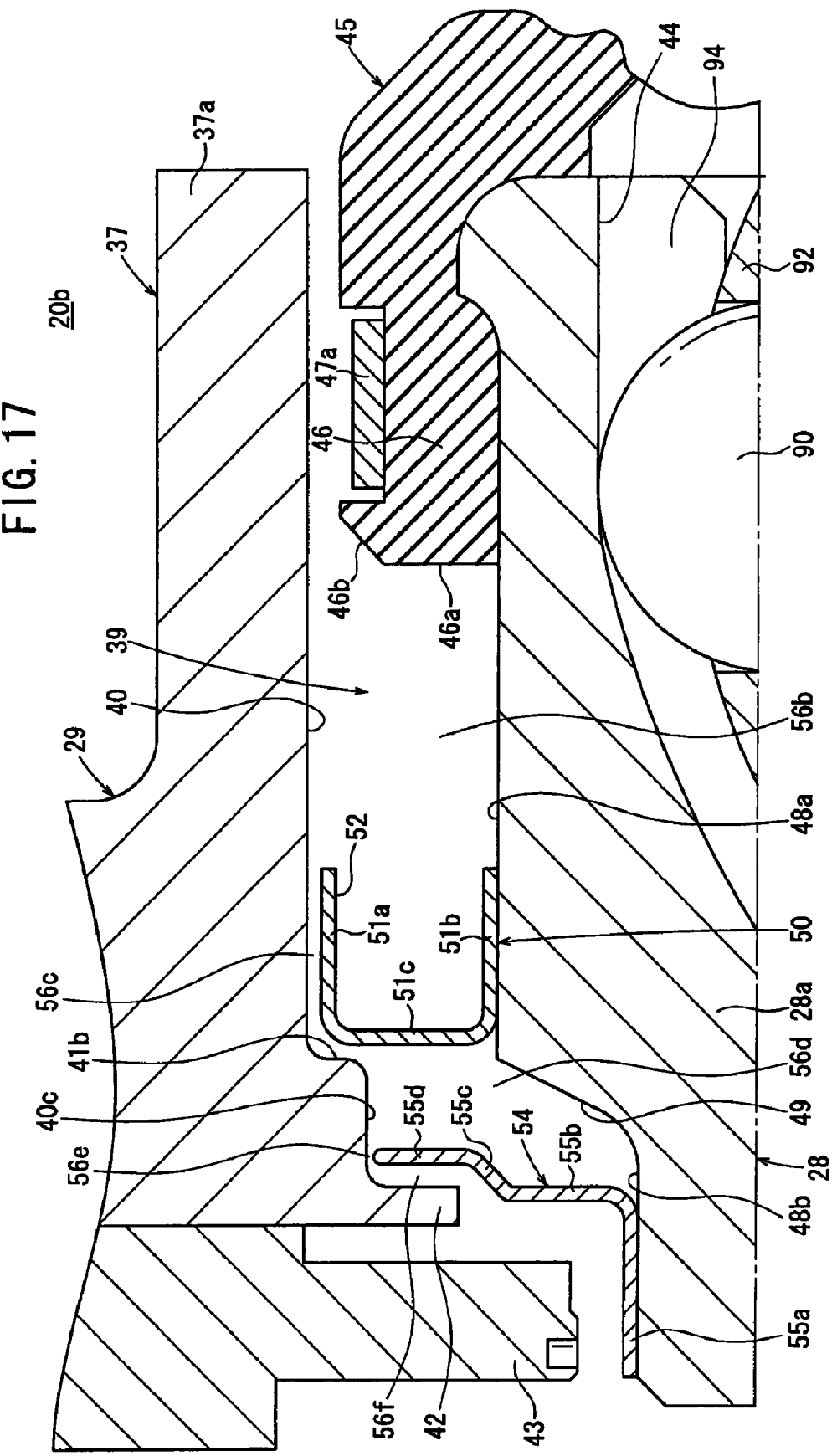
FIG. 17 is an enlarged fragmentary vertical cross-sectional view of a drive wheel bearing device according to a modification of the embodiment of FIG. 13.

As shown in FIG. 14, a first clearance 56*a* is defined radially between the first radial inner surface 40*a* of the knuckle member 29 and the larger-diameter end 46 of the joint boot 45. A second clearance 56*b* is defined between the second radial inner surface 40*b* of the knuckle member 29 and the first radial outer surface 48*a* of the outer race member 28, wherein the second clearance 56*b* has a larger radial spacing than the first clearance 56*a* and extends a predetermined length along the axial direction of the outer race member 28. A third clearance 56*c* is defined between the second radial inner surface 40*b* of the knuckle member 29 and the first annular side wall 51*a* of the first seal member 50, wherein the third clearance 56*c* has a small radial spacing and extends continuously the same length as the first annular wall 51*a*. A fourth clearance 56*d* is defined between the third radial inner surface 40*c* of the knuckle member 29 and the annular step 49 of the outer race member 28, wherein the fourth clearance 56*d* has a larger spacing than the third clearance 56*c*. A fifth clearance 56*e* is defined between the third radial inner surface 40*c* of the knuckle member 29 and the circumferential member 55*d* of the second seal member 54, wherein the fifth clearance 56*e* has a small radial spacing similar to the third clearance 56*c*. A sixth clearance 56*f* is defined between a wall surface of the ridge 42 of the knuckle member 29 and the circumferential member 55*d* of the second seal member 54.

In the third embodiment, the first through sixth clearances 56*a* through 56*f* provide a labyrinth-like seal structure having different radial spacings, for thereby preventing water, mud, etc., from entering into the gap 39 between the knuckle member 29 and the outer race member 28.

In the third embodiment, the third clearance 56*c* defined between the first seal member 50 and the second radial inner surface 40*b* of the knuckle member 29 is narrow and extends a predetermined length along the axial direction, whereas the narrow fifth clearance 56*e* is defined between the second seal member 54 and the third radial inner surface 40*c* of the knuckle member 29. Even if water, etc., enters into the gap 39, the water is prevented from entering further toward the rotational speed sensor 43.

In the third embodiment, even if water, etc., enters into the gap 39 through the first and second clearances 56*a* and 56*b*, since the opening 52 of the first seal member 50 opens outwardly toward the direction in which water, etc., enters, the water is stored within the opening 52 of the first seal member 50 and is prevented from entering further toward the rotational speed sensor 43. Since the volume (space) of the second clearance 56*b* near the opening 52 of the first seal member 50 is large, the water that has been prevented from entering by the first seal member 50 is appropriately stored therein.

Stated otherwise, even if water, etc., has entered into the gap 39 through the first and second clearances 56*a* and 56*b*, the water that has entered remains stored within the opening 52 of the first seal member 50 as a result of centrifugal forces of the rotating outer race member 28, and the water flows radially outwardly as a result of the centrifugal forces of the outer race member 28 until the water is discharged outwardly (to the atmosphere) along the inner wall surface of the knuckle member 29.

According to the third embodiment, therefore, even if water, etc., enters into the gap 39, such water is prevented from adversely affecting the rotational speed sensor 43 that is disposed near the hub bearing 26. Furthermore, since separately disposed first and second seal members 50 and 54 are provided in addition to the seal members 60*a*, 60*b* for protecting the rolling bodies 24*a* and 24*b*, a large quantity of muddy water or the like that has been splashed by the front wheels of an independent 4WD vehicle, for example, is appropriately prevented from entering into the gap 39 that communicates with the hub 22 of the rear wheel.

Figure 18:
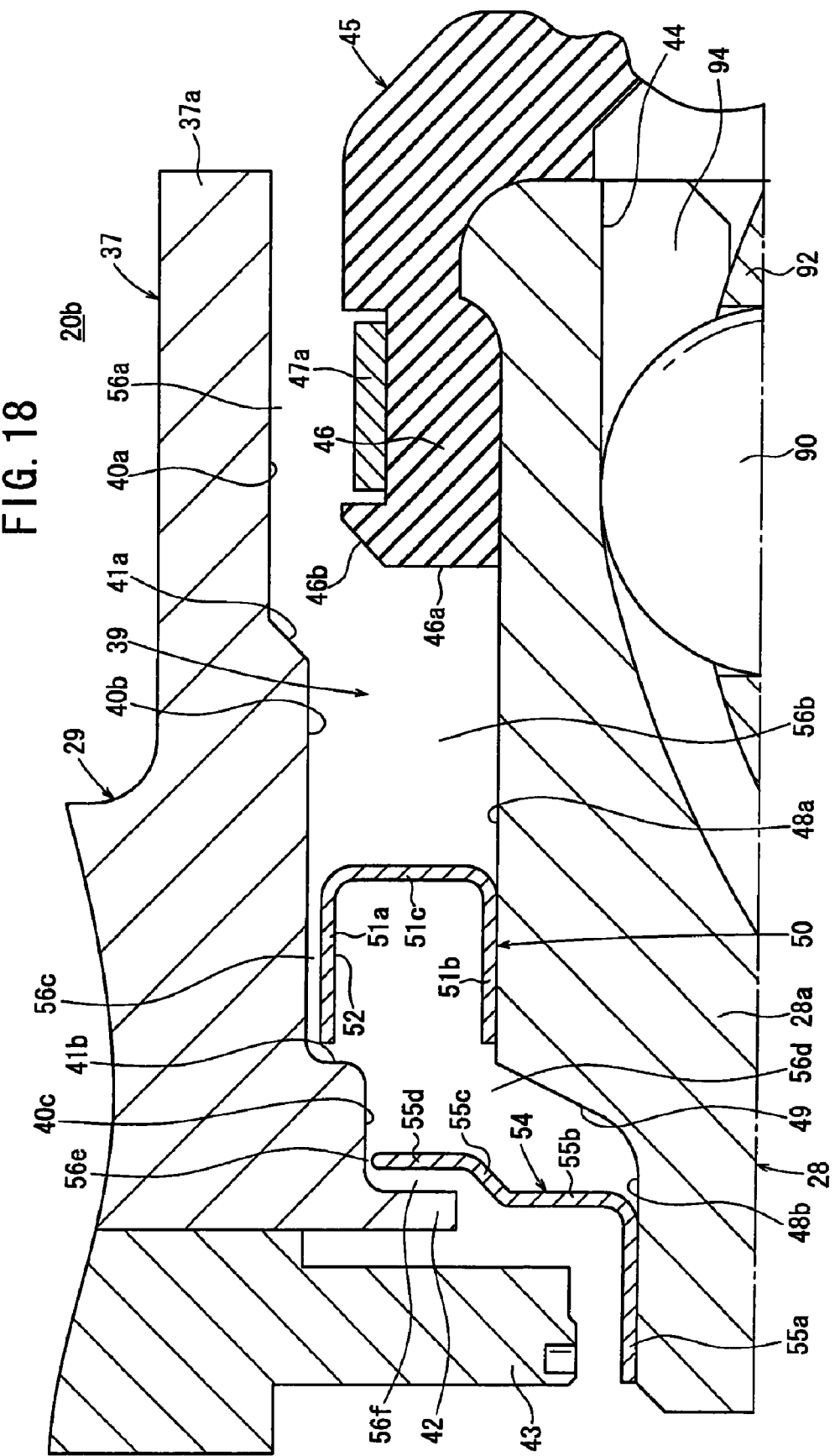
FIG. 18 is an enlarged fragmentary vertical cross-sectional view showing a first seal member having an opening oriented in an opposite direction as compared with FIG. 17.

In addition, as shown in FIG. 18, the opening 52 of the first seal member 50 may be oriented inwardly toward the second seal member 54, rather than outwardly.

Figure 19:
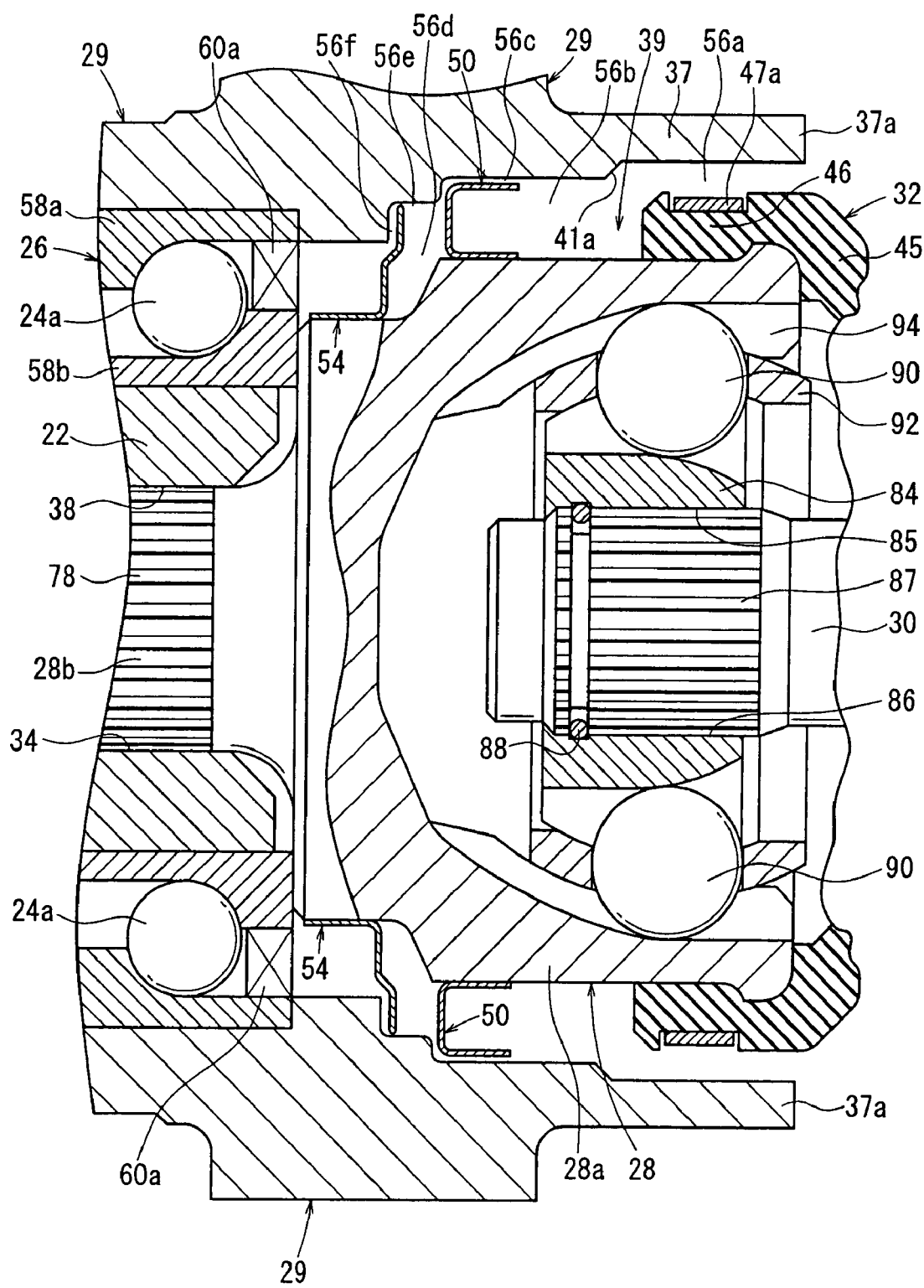
FIG. 19 is a fragmentary vertical cross-sectional view of the drive wheel bearing device according to the modification of the embodiment of FIG. 13.
Figure 20:
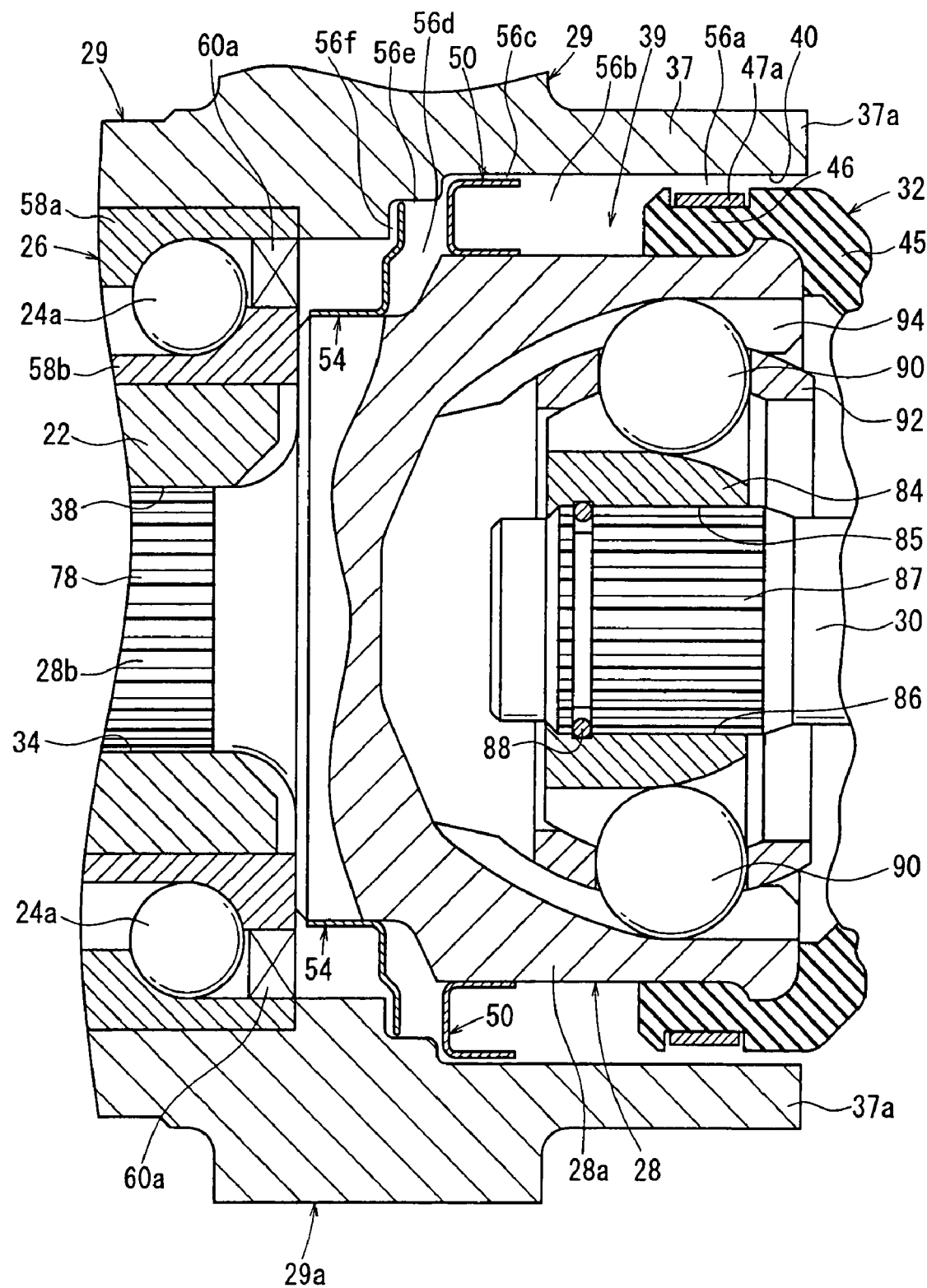
FIG. 20 is a fragmentary vertical cross-sectional view of the drive wheel bearing device according to the modification of the embodiment FIG. 13.

As shown in FIGS. 19 and 20, the third embodiment may also be applied to drive wheel bearing devices 20*b*, which do not include the rotational speed sensor 43. The drive wheel bearing device 20*b* shown in FIG. 20 is different from the drive wheel bearing device 20*b* shown in FIG. 19, in that the inner wall surface of the annular flange 37 does not include the first annular step 41*a*, but rather is formed as a radial inner surface 40 having a straight cross section.

The present invention is not limited to a drive wheel bearing device including a Birfield-type constant velocity universal joint, but may also be applied to drive wheel bearing devices 100 and 100*a* through 100*c*, according to a fourth embodiment that includes a tripod-type constant velocity universal joint, as shown in FIGS. 21 through 24. Those parts of the drive wheel bearing devices 100 and 100*a* through 100*c* that are identical to those of the drive wheel bearing device 20 according to the first embodiment shown in FIG. 1 are denoted using identical reference characters, and such features shall not be described in detail below.

The drive wheel bearing device 100 according to the fourth embodiment includes an outer race member 112, comprising an integral combination made up of a tubular cup 112*a* and a shaft 112*b* fitted into the hub 22.

Figure 21:
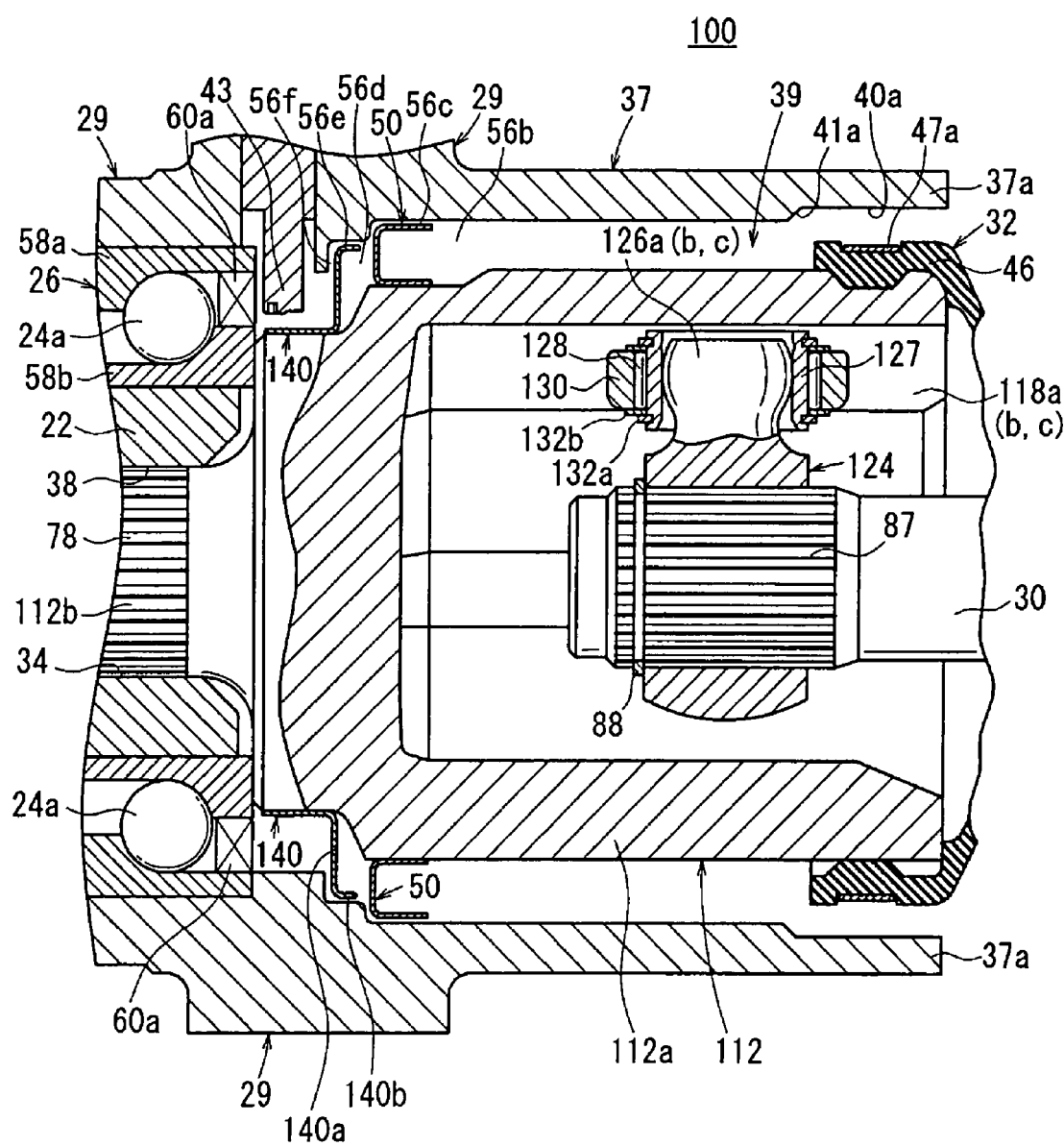
FIG. 21 is a fragmentary vertical cross-sectional view of a drive wheel bearing device according to a fourth embodiment of the present invention.
Figure 22:
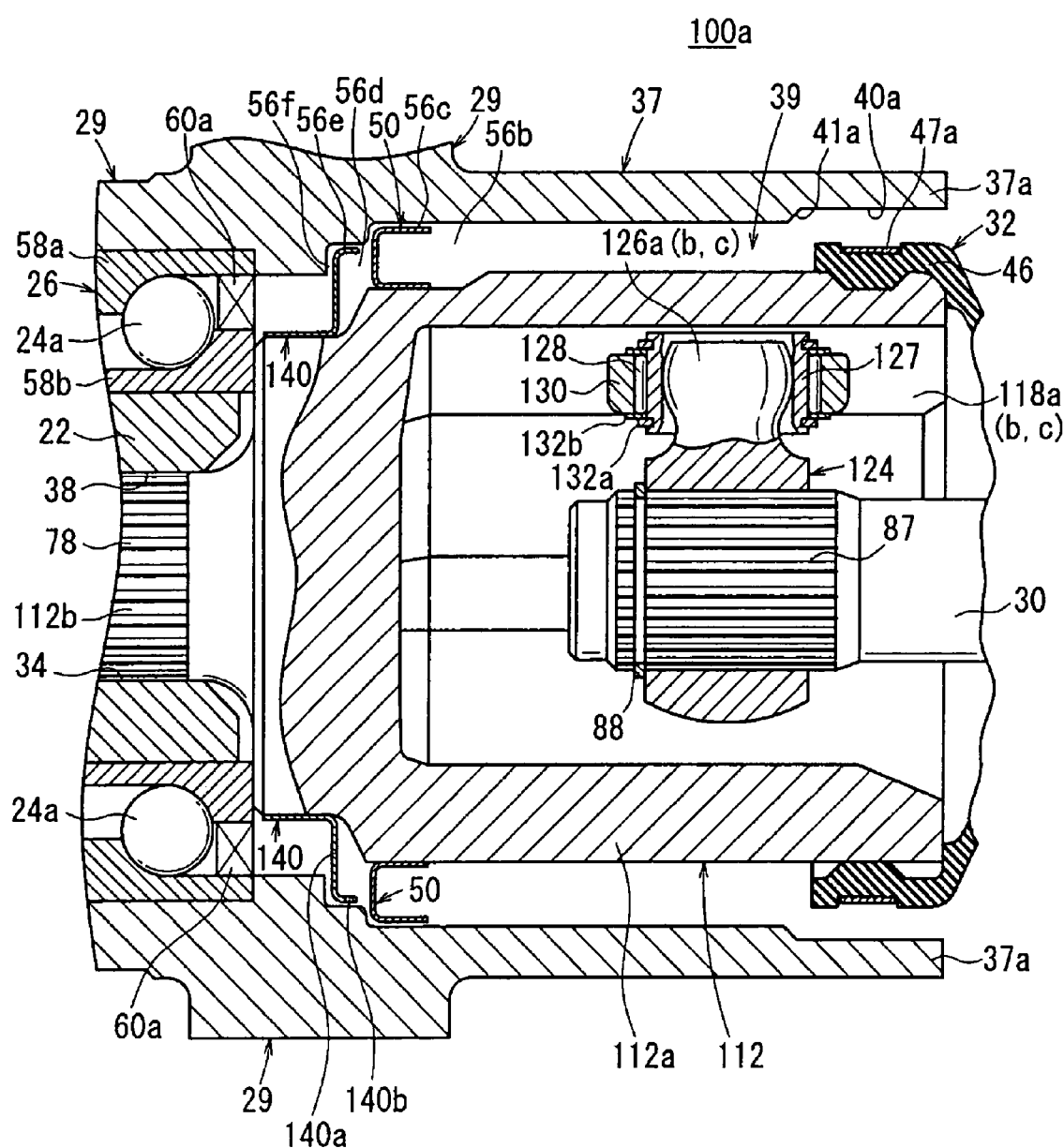
FIG. 22 is a fragmentary vertical cross-sectional view of a drive wheel bearing device according to a first modification of the embodiment of FIG. 21.
Figure 23:
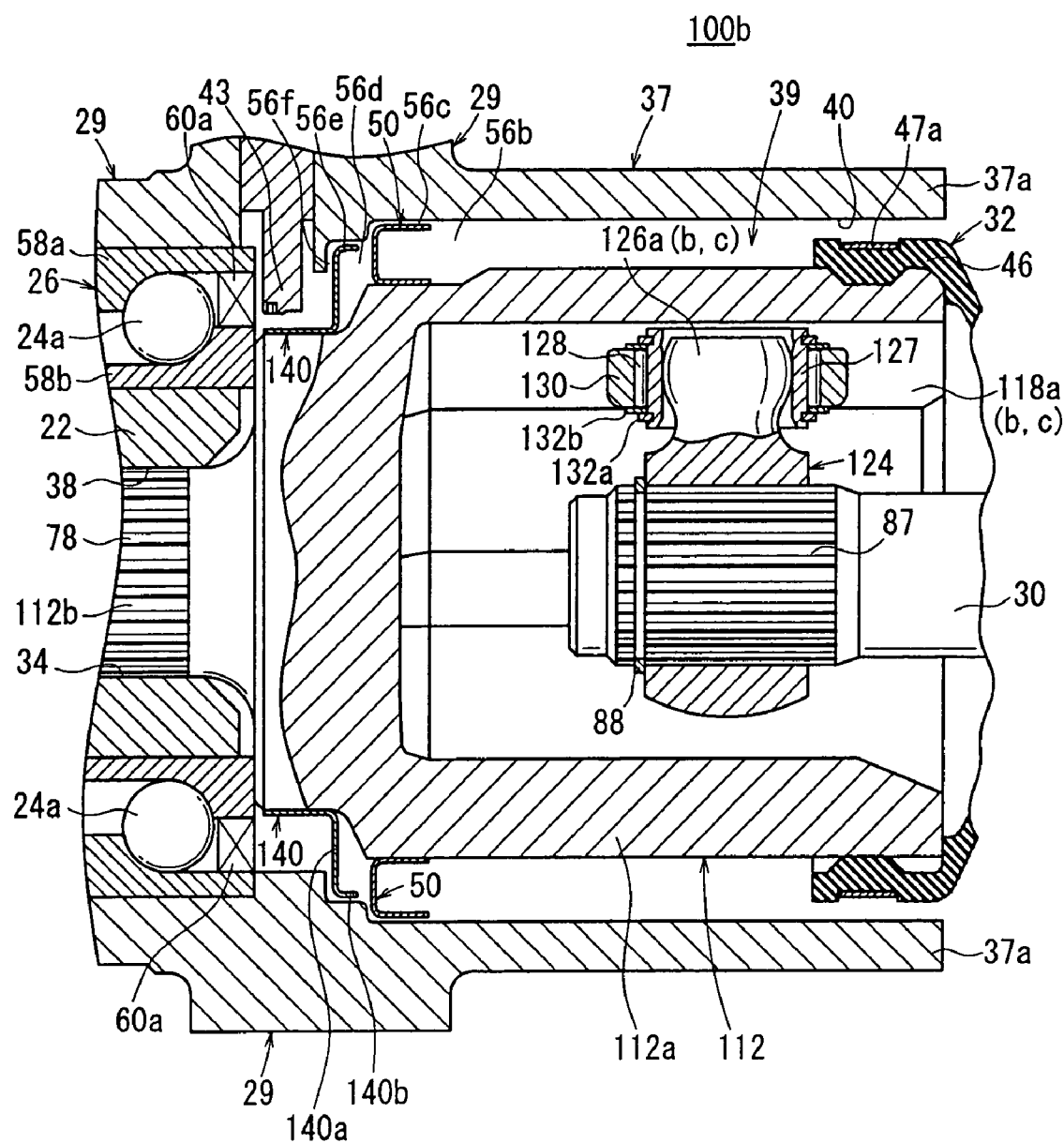
FIG. 23 is a fragmentary vertical cross-sectional view of a drive wheel bearing device according to a second modification of the embodiment of FIG. 21.
Figure 24:
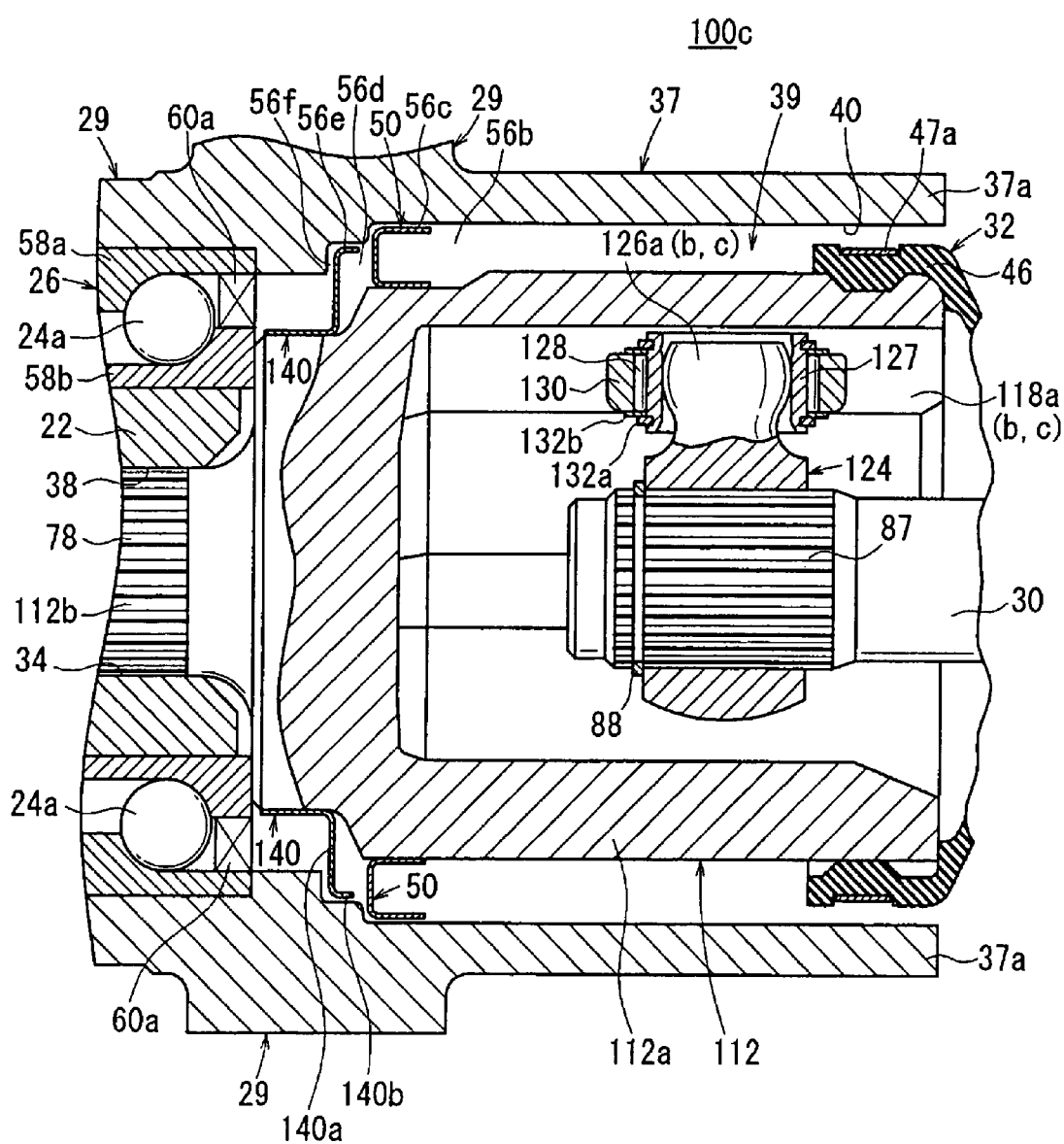
FIG. 24 is a fragmentary vertical cross-sectional view of a drive wheel bearing device according to a third modification of the embodiment of FIG. 21.

As shown in FIG. 21, the outer race member 112 includes an inner wall surface having three guide grooves 118*a* through 118*c* (guide grooves 118*b* and 118*c* are omitted from illustration) defined therein, which extend along the axial direction and are angularly spaced 120° around the axis. A ring-shape spider 124 is fitted over the end of the drive shaft 30. Three trunnions 126*a* through 126*c* (trunnions 126*b* and 126*c* are omitted from illustration) project from an outer circumferential surface of the spider 124 toward the respective guide grooves 118*a* through 118*c*, and are angularly spaced 120° around the axis.

A ring-shaped inner roller 127 is fitted over the outer circumferential surface of the trunnion 126*a* (126*b*, 126*c*), which is spherical in the circumferential direction. A ring-shaped outer roller 130 is fitted over the outer circumferential surface of the inner roller 127, with a plurality of needle bearings 128 interposed therebetween. The needle bearings 128 are held in place by a pair of washers 132*a*, which are mounted on the inner roller 127 by an annular groove and a circlips 132*b*.

A second seal member 140 according to a modification, which is incorporated in a drive wheel bearing device 100 according to a fourth embodiment, shall be described below.

Figure 25:
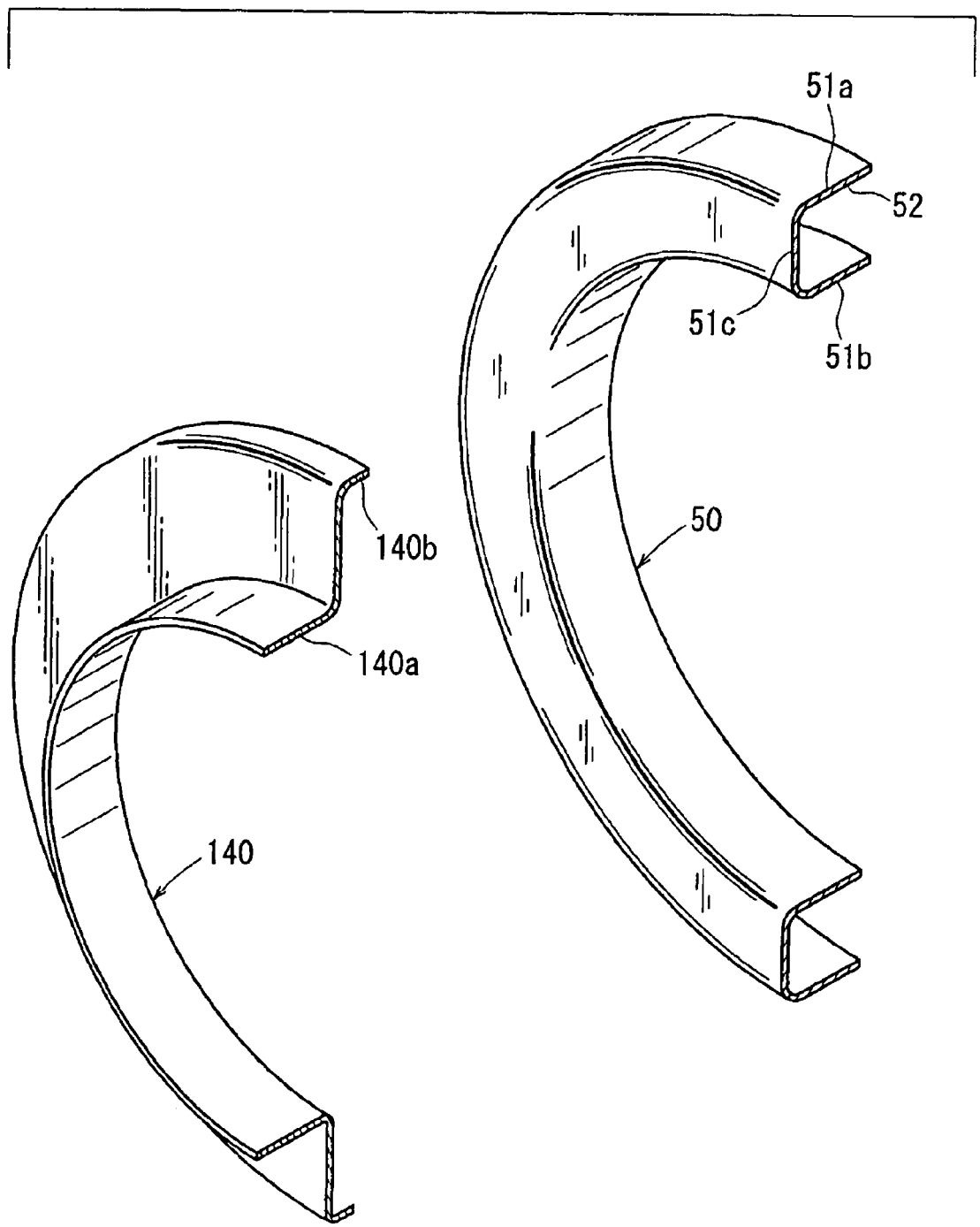
FIG. 25 is a perspective view, partly broken away, of a modified first seal member and second seal member, which are incorporated in the drive wheel bearing device shown in FIG. 21.

As shown in FIG. 25, the second seal member 140 according to the modification comprises an L-shaped bent member 140a bent into an L-shaped cross section and held in contact with and fastened to a radial outer surface of an outer race member 112, and a bent member 140b contiguous to the L-shaped bent member 140a and extending a predetermined length substantially in parallel with the wall surface of the knuckle member 29, with a predetermined clearance therebetween. The bent member 140b functions as a radial outer end of the second seal member 140.

Drive wheel bearing devices 200a through 200c according to a fifth embodiment shall be described below with reference to FIGS. 26 through 28.

In the drive wheel bearing devices 200a through 200c according to the fifth embodiment, the inner surface of the knuckle member 29 does not include the first annular step 41a, but rather, has a straight cross section provided by a radial inner surface 40 having the same inside diameter, wherein the first radial inner surface 40a and the second radial inner surface 40b are joined together.

Figure 26:
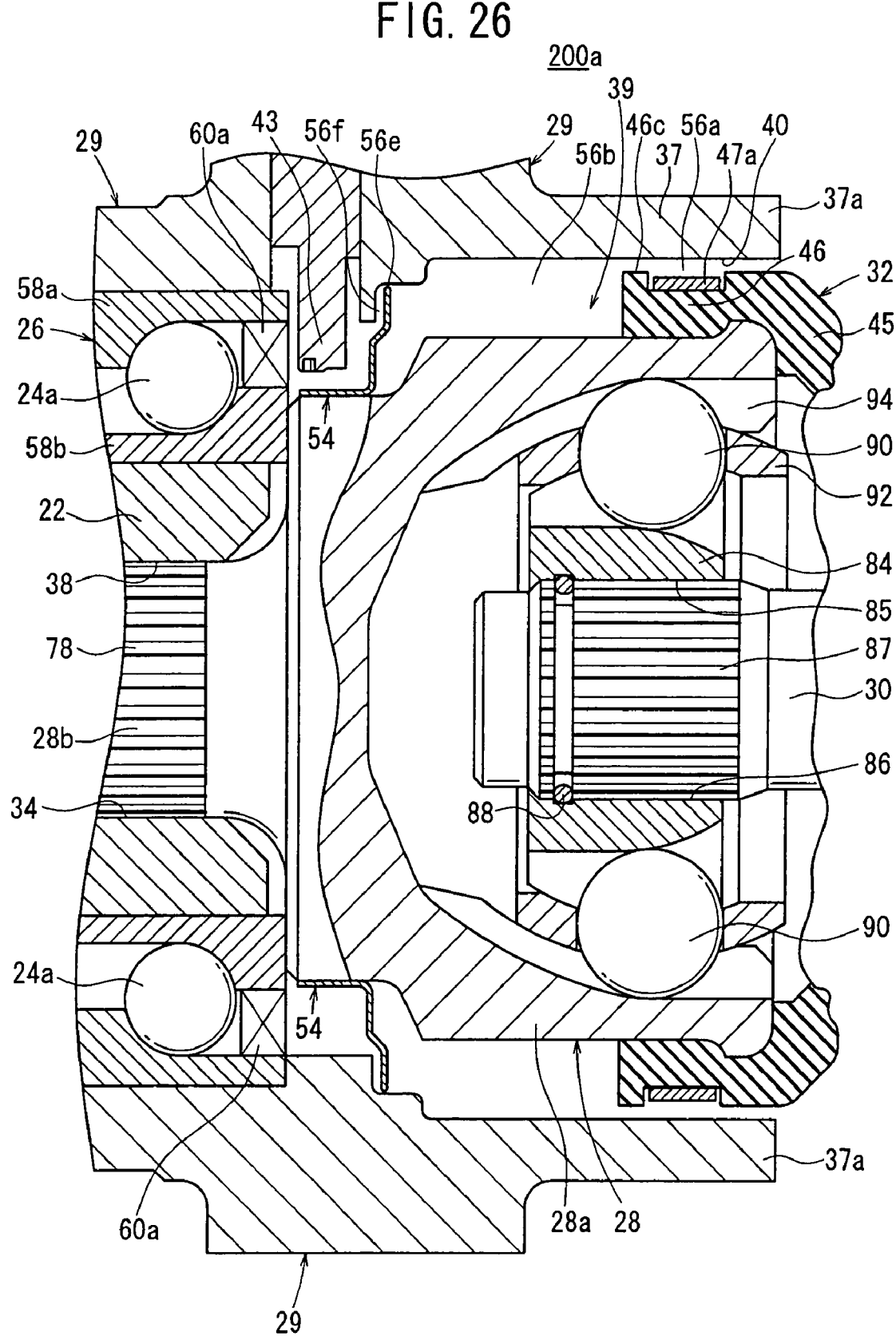
FIG. 26 is a fragmentary vertical cross-sectional view of a drive wheel bearing device according to a fifth embodiment of the present invention.

In the drive wheel bearing device 200a shown in FIG. 26, the second seal member 54 is mounted on the outer circumferential surface of the outer race member 28, and the larger-diameter end 46 of the joint boot 45 includes an outer circumferential edge portion 46c having a rectangular cross section. The spacing between the outer circumferential edge portion 46c with the rectangular cross section of the larger-diameter end 46 and the radial inner surface 40 is small enough so that the spacing performs a sealing function.

Figure 27:
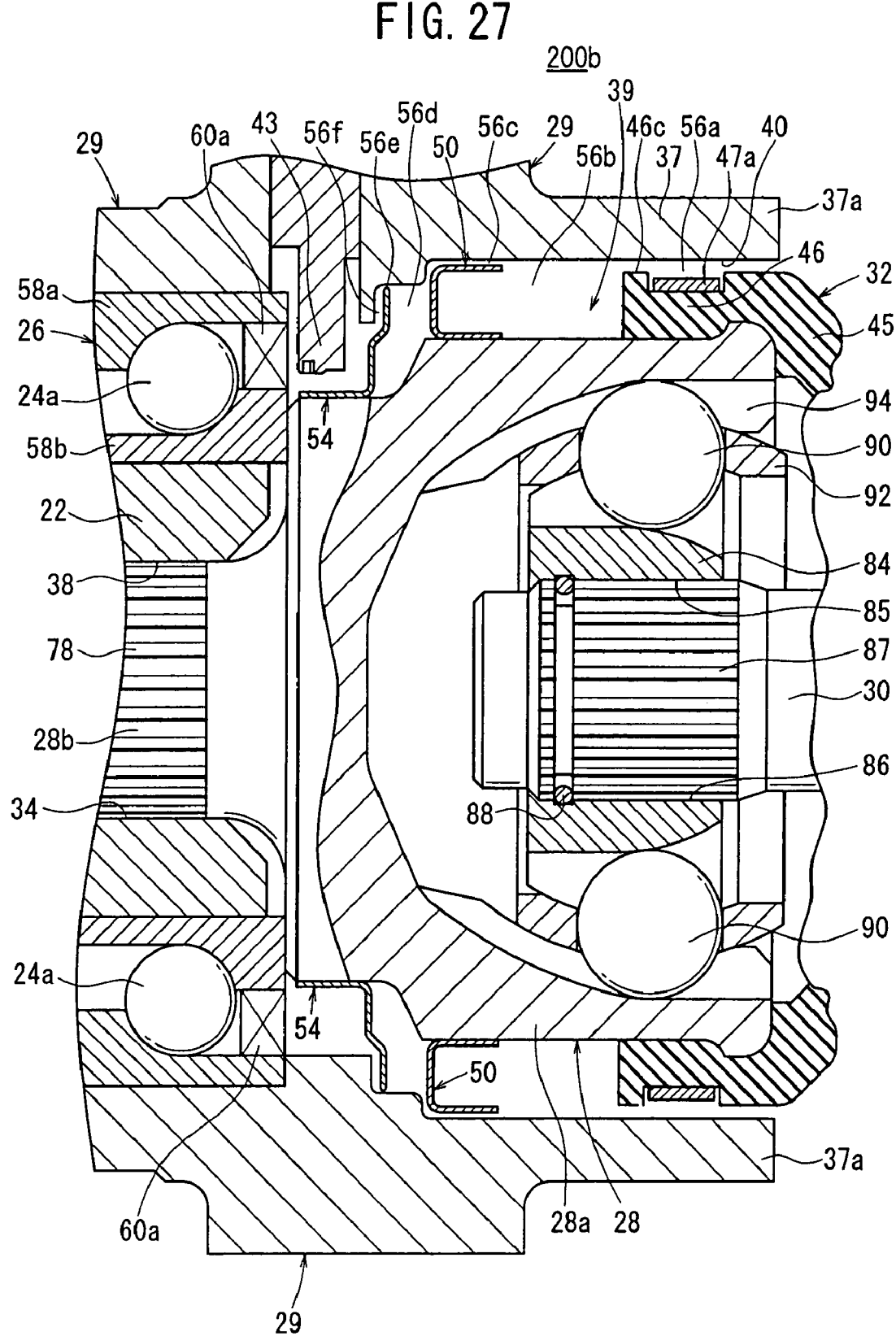
FIG. 27 is a fragmentary vertical cross-sectional view of a drive wheel bearing device according to a modification of the embodiment of FIG. 26.

In the drive wheel bearing device 200b shown in FIG. 27, the first seal member 50 and the second seal member 54 are disposed on the outer circumferential surface of the outer race member 28 such that the first seal member 50 and the second seal member 54 are spaced from each other by a predetermined distance.

Figure 28:
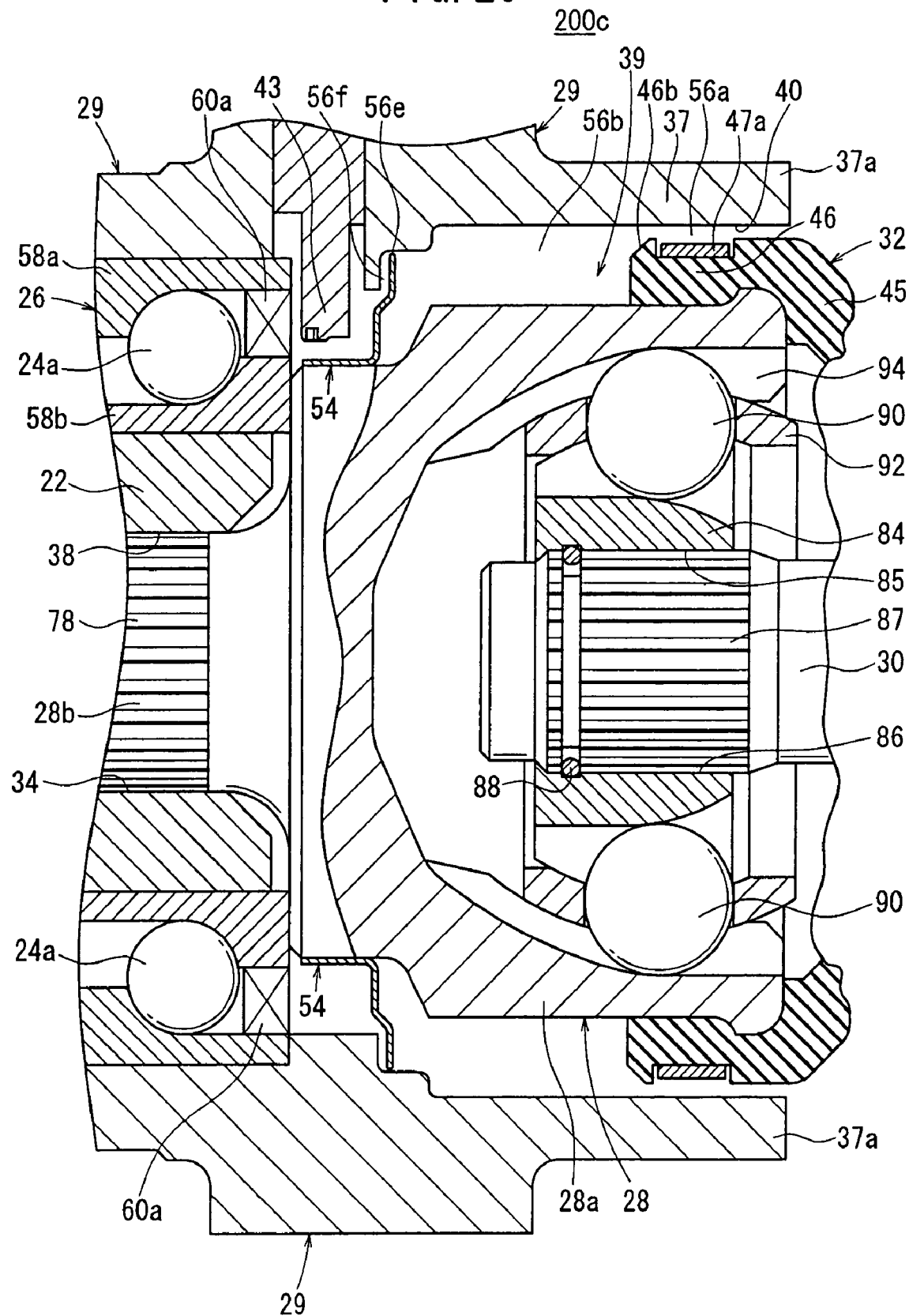
FIG. 28 is a fragmentary vertical cross-sectional view of a drive wheel bearing device according to a modification of the embodiment of FIG. 26.
Figure 29:
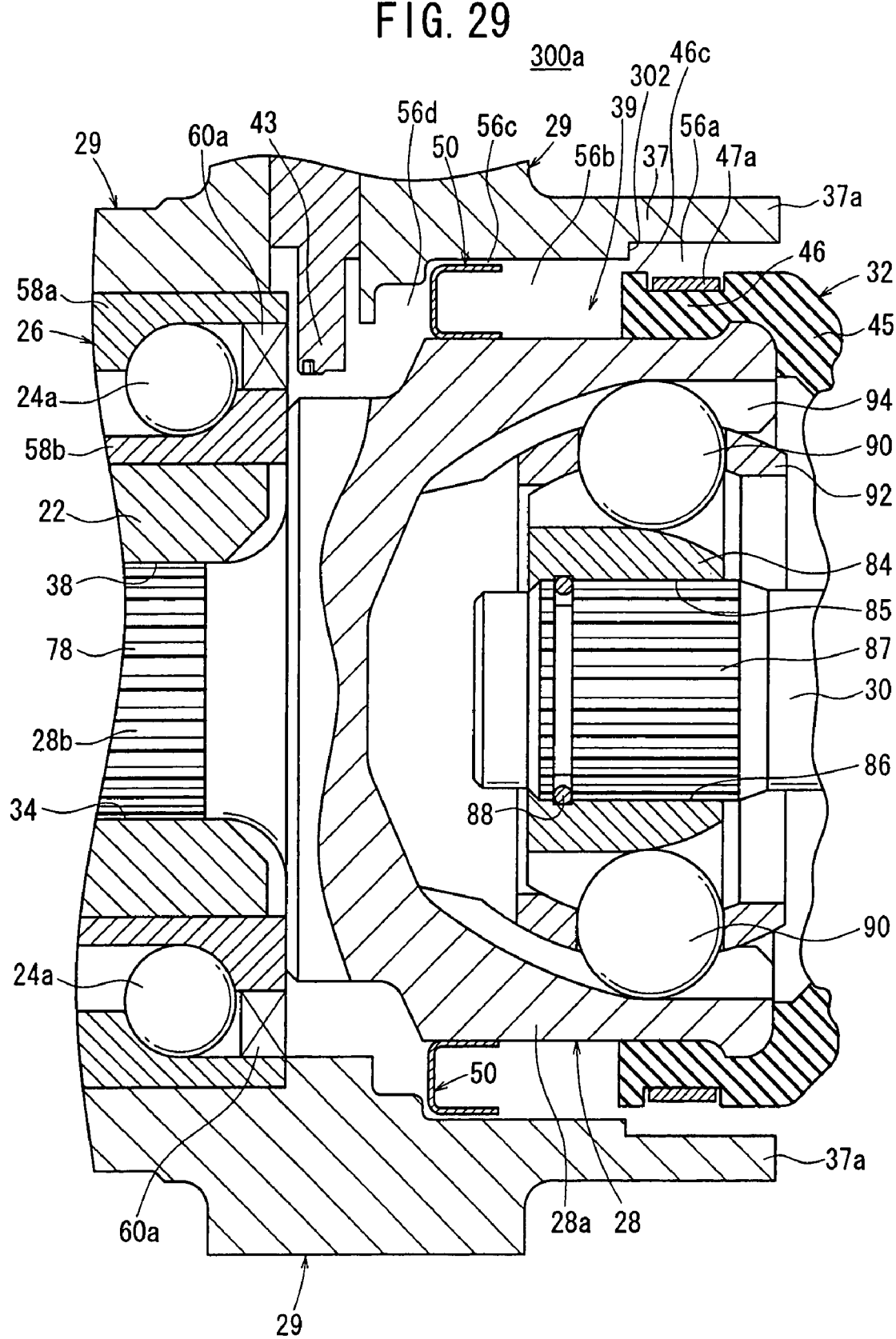
FIG. 29 is a fragmentary vertical cross-sectional view of a drive wheel bearing device according to a sixth embodiment of the present invention.
Figure 30:
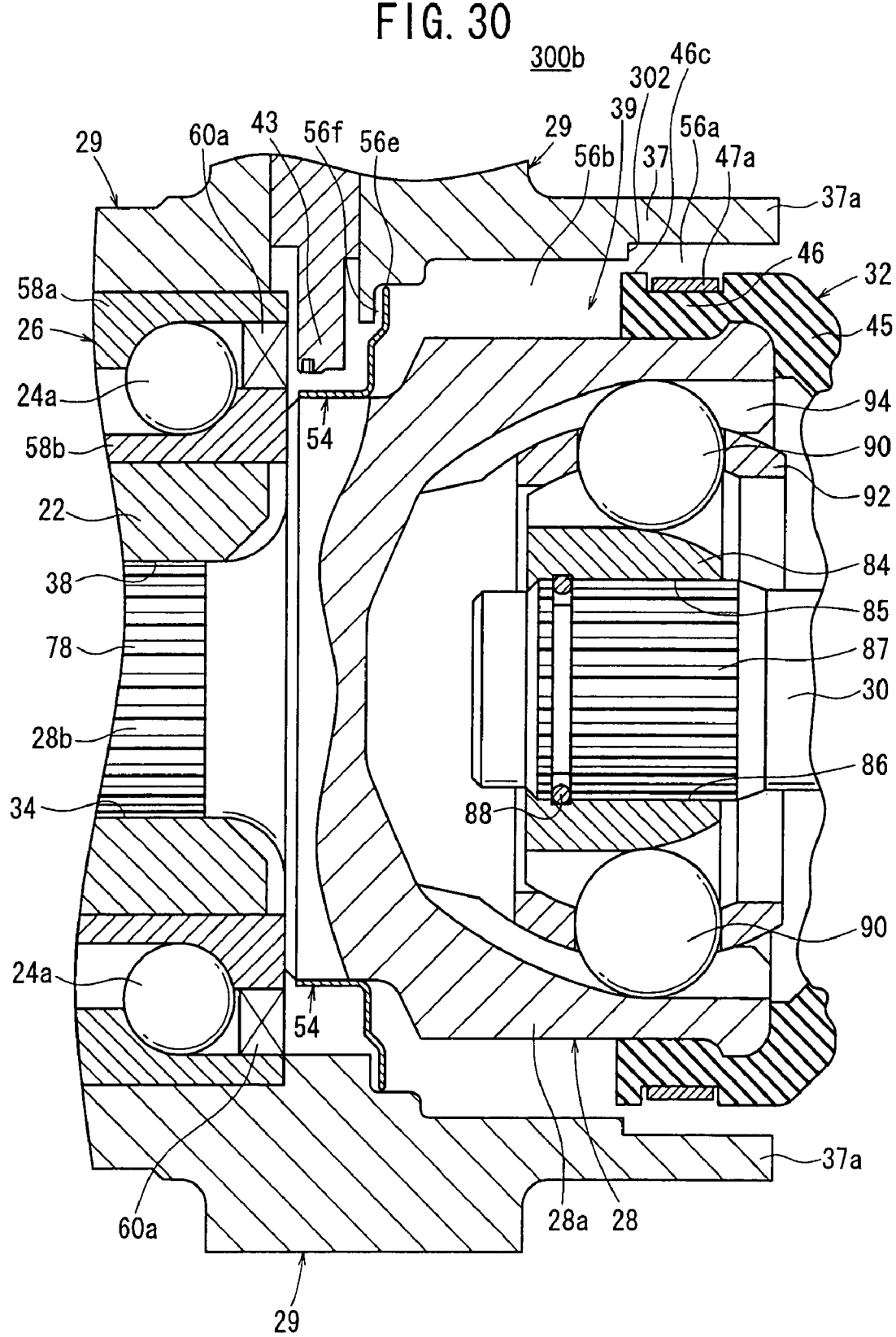
FIG. 30 is a fragmentary vertical cross-sectional view of a drive wheel bearing device according to a modification of the embodiment of FIG. 29.
Figure 31:
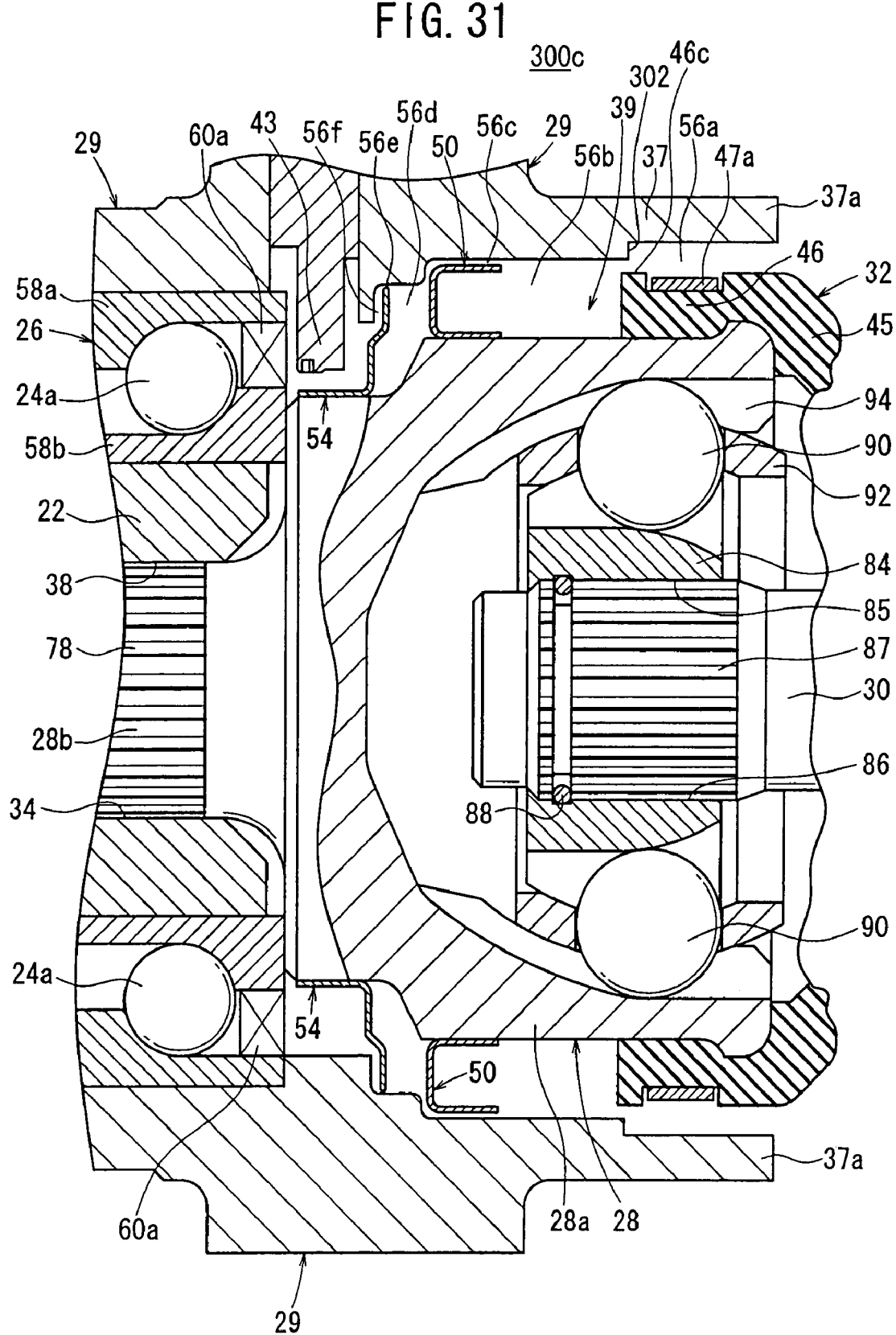
FIG. 31 is a fragmentary vertical cross-sectional view of a drive wheel bearing device according to a modification of the embodiment of FIG. 29.
Figure 32:
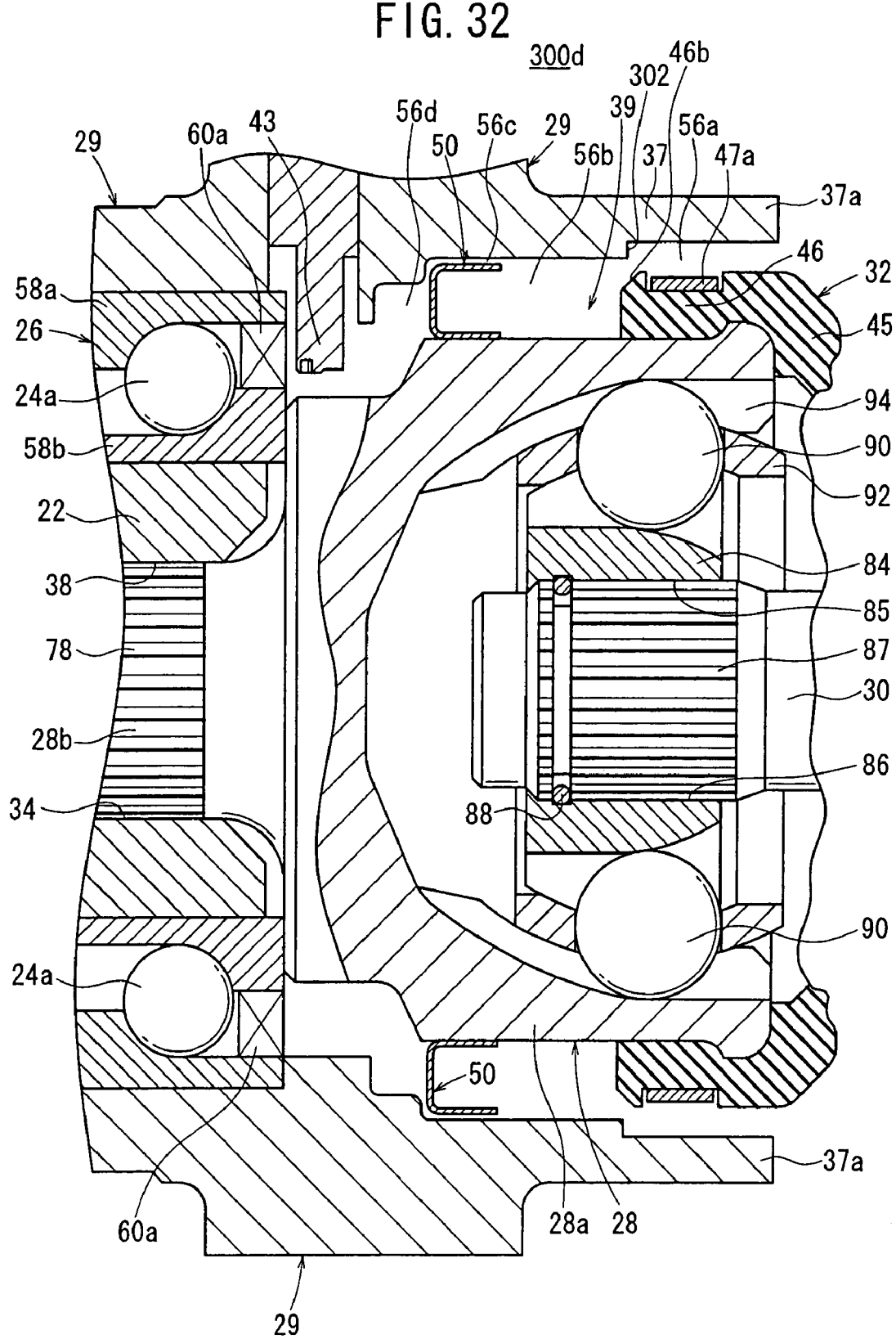
FIG. 32 is a fragmentary vertical cross-sectional view of a drive wheel bearing device according to a modification of the embodiment of FIG. 29.
Figure 33:
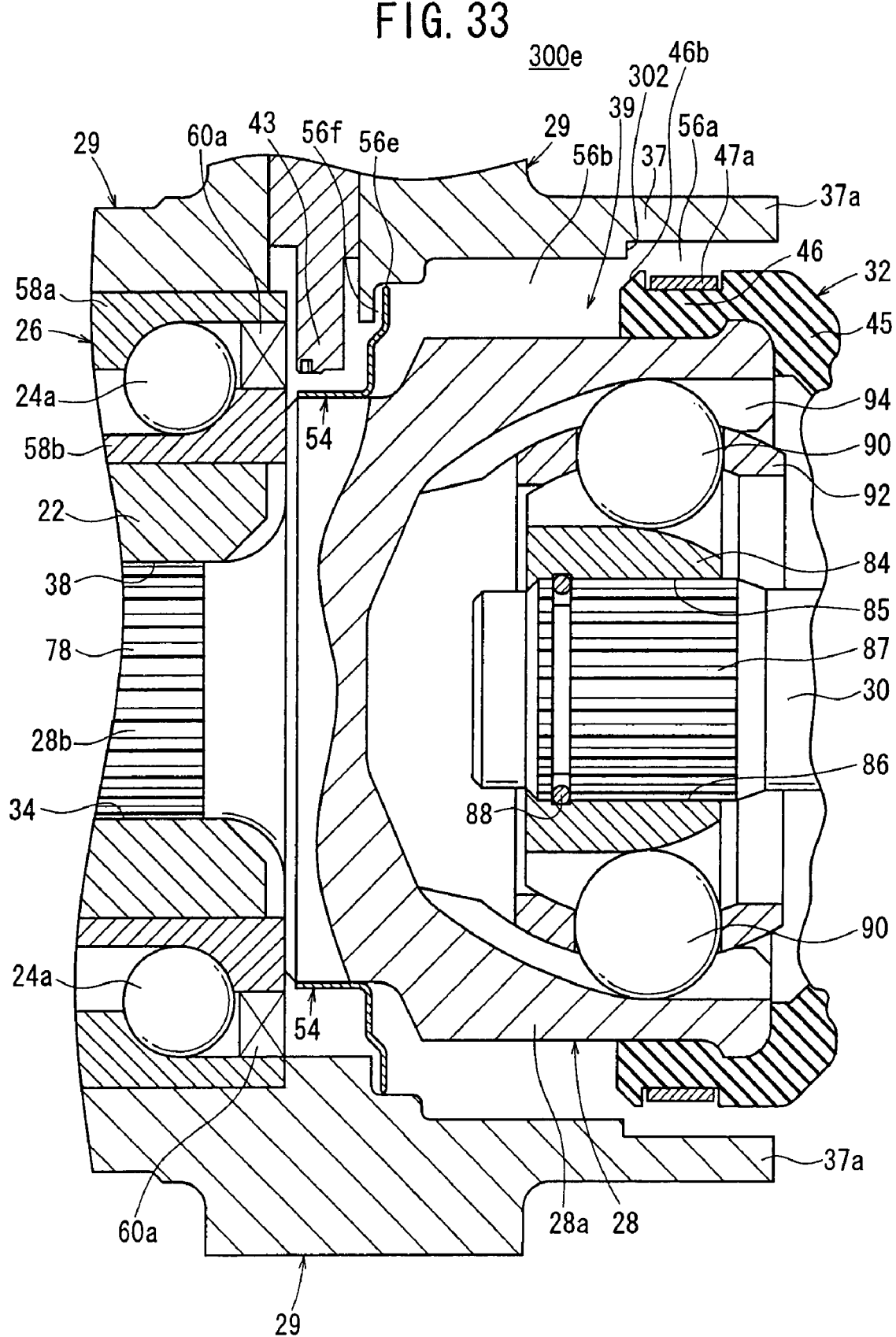
FIG. 33 is a fragmentary vertical cross-sectional view of a drive wheel bearing device according to a modification of the embodiment of FIG. 29.
Figure 34:
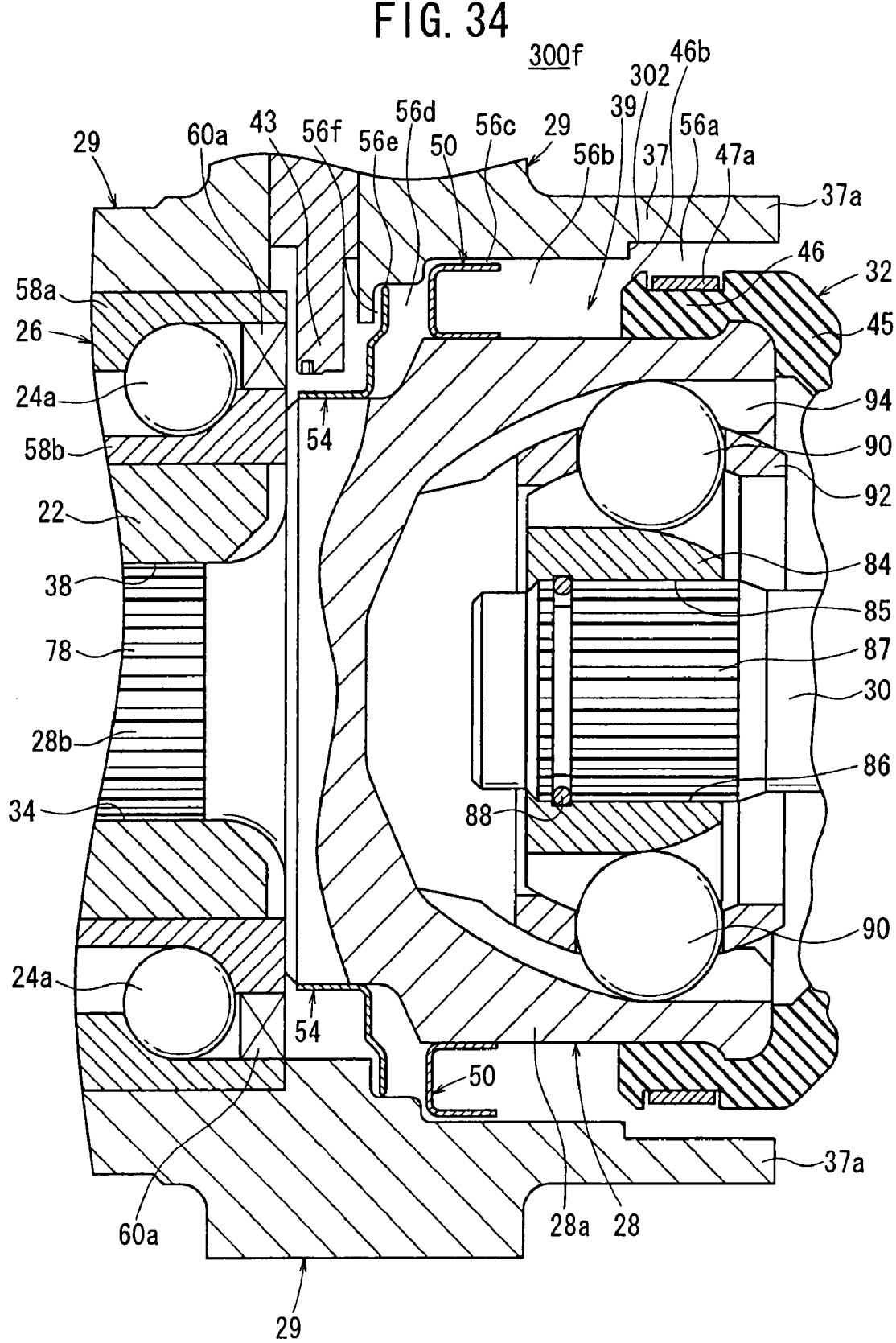
FIG. 34 is a fragmentary vertical cross-sectional view of a drive wheel bearing device according to a modification of the embodiment of FIG. 29.
Figure 35:
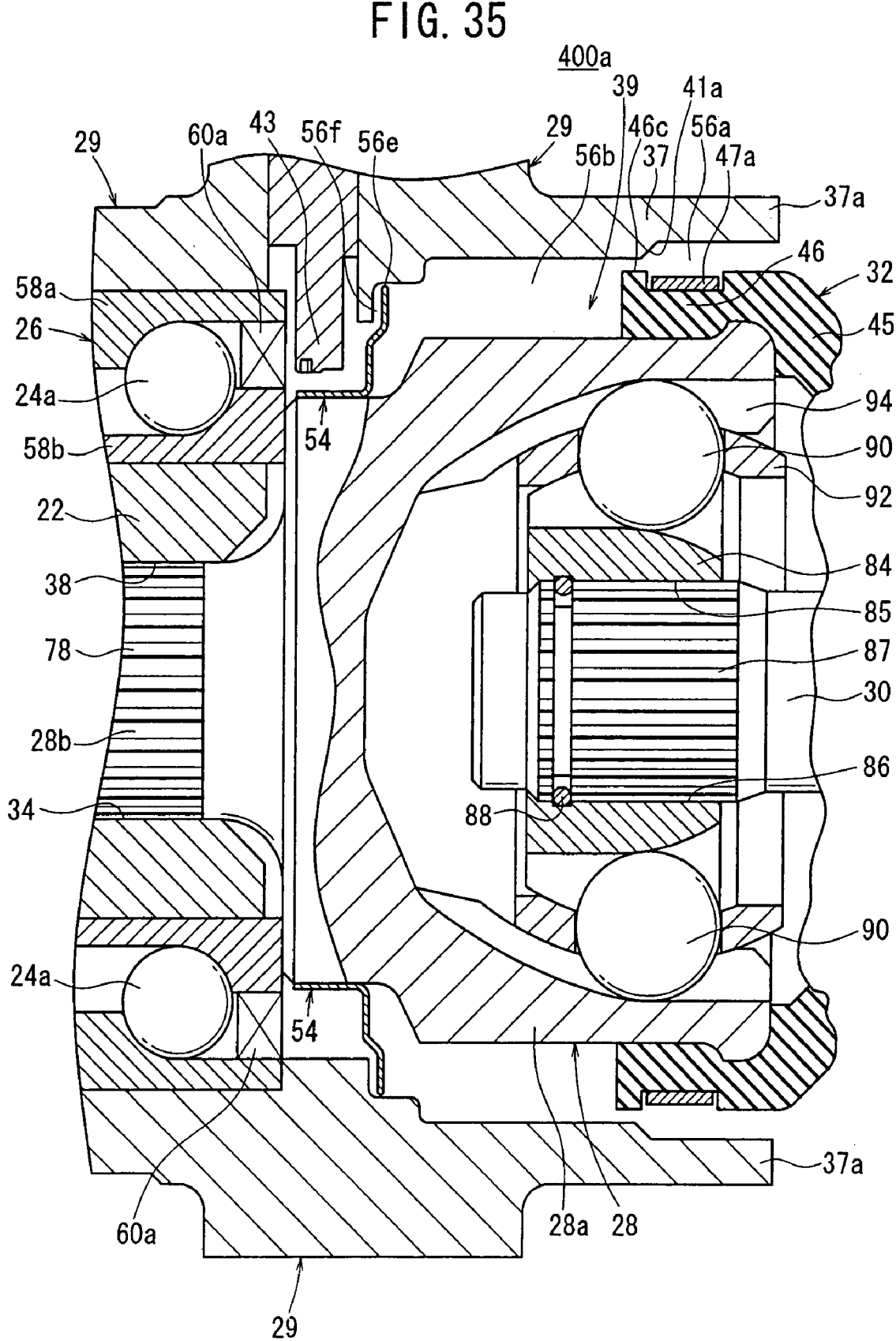
FIG. 35 is a fragmentary vertical cross-sectional view of a drive wheel bearing device according to a seventh embodiment of the present invention.
Figure 36:
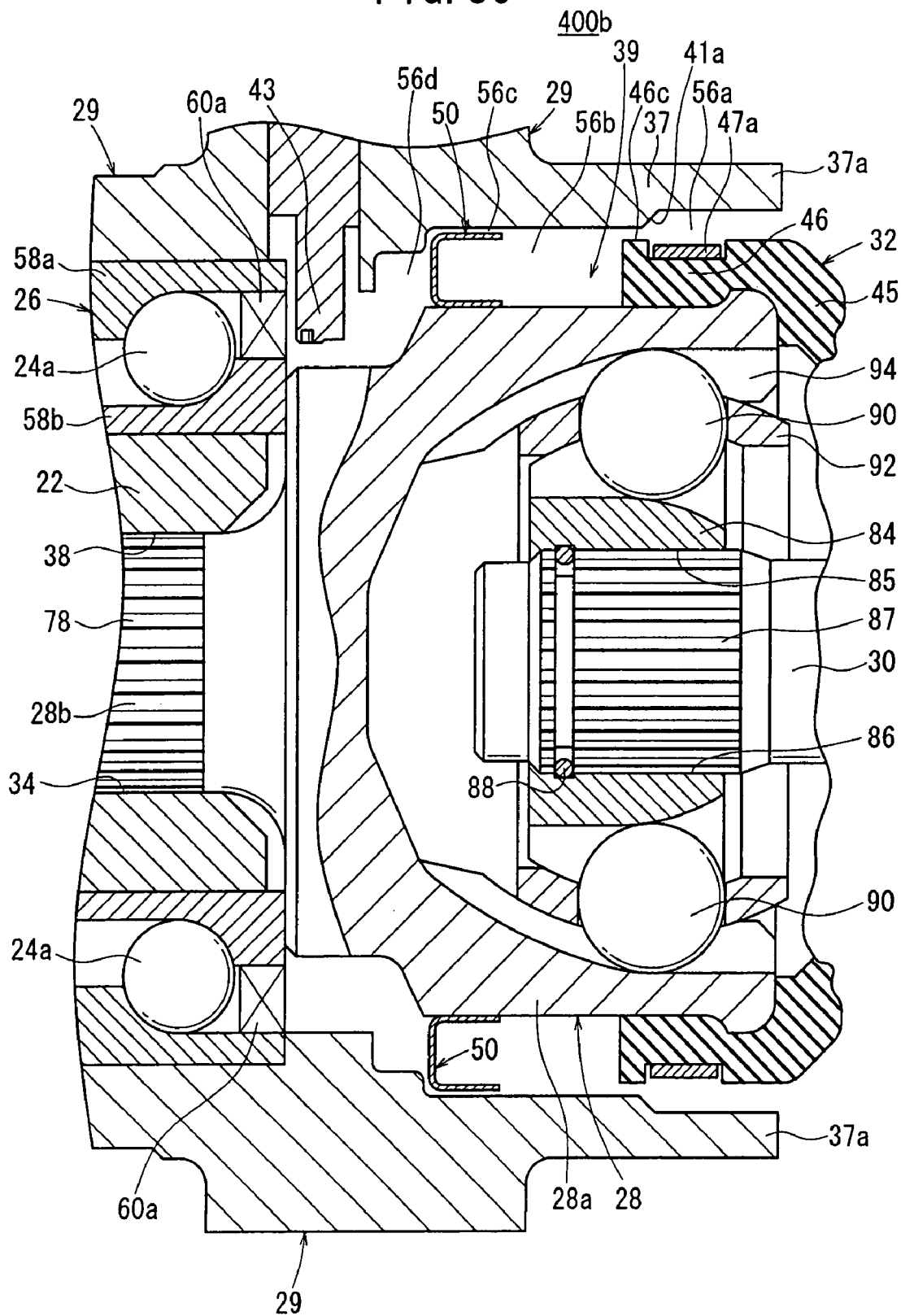
FIG. 36 is a fragmentary vertical cross-sectional view of a drive wheel bearing device according to a modification of the embodiment of FIG. 35.
Figure 37:
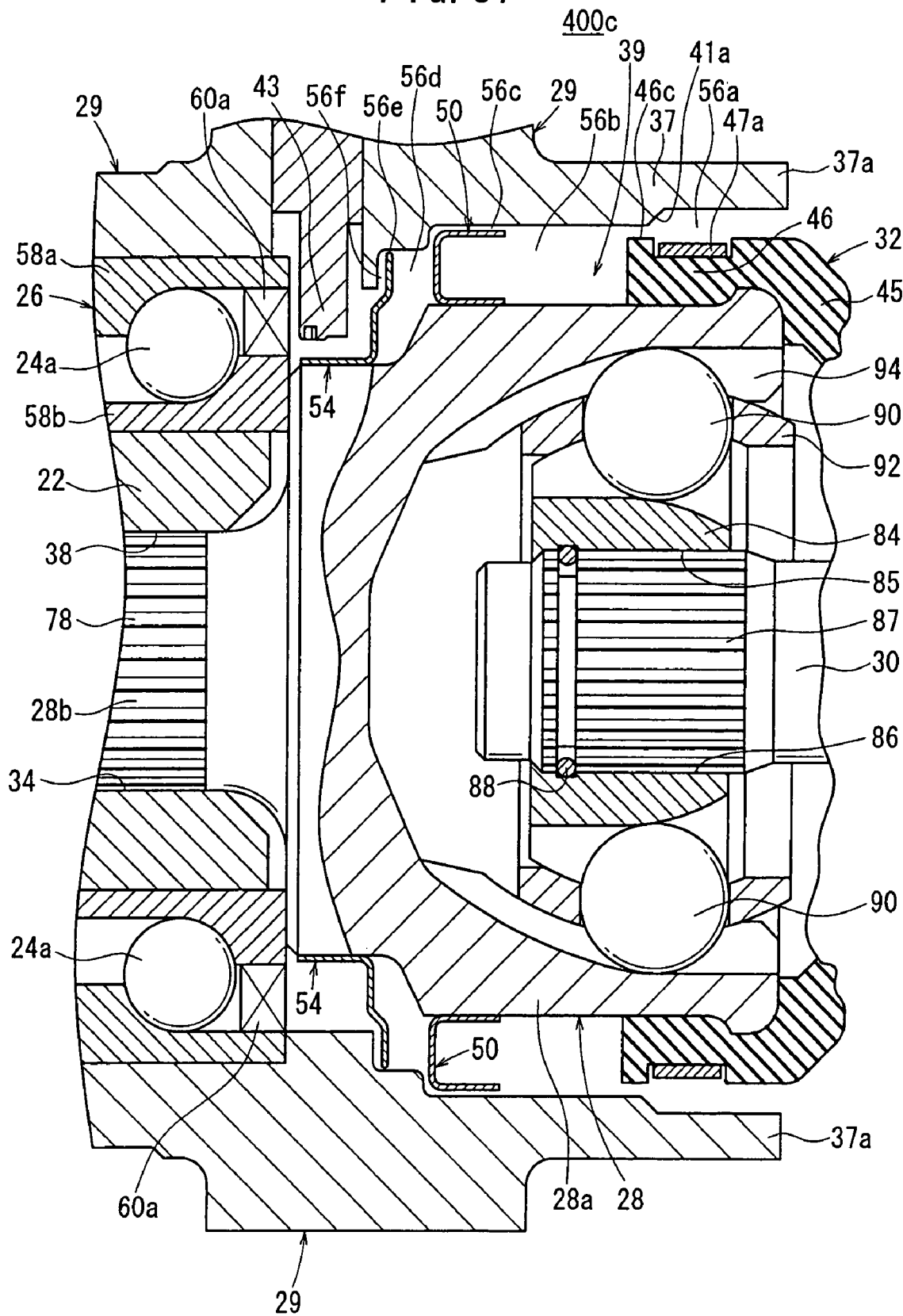
FIG. 37 is a fragmentary vertical cross-sectional view of a drive wheel bearing device according to a modification of the embodiment of FIG. 35.
Figure 38:
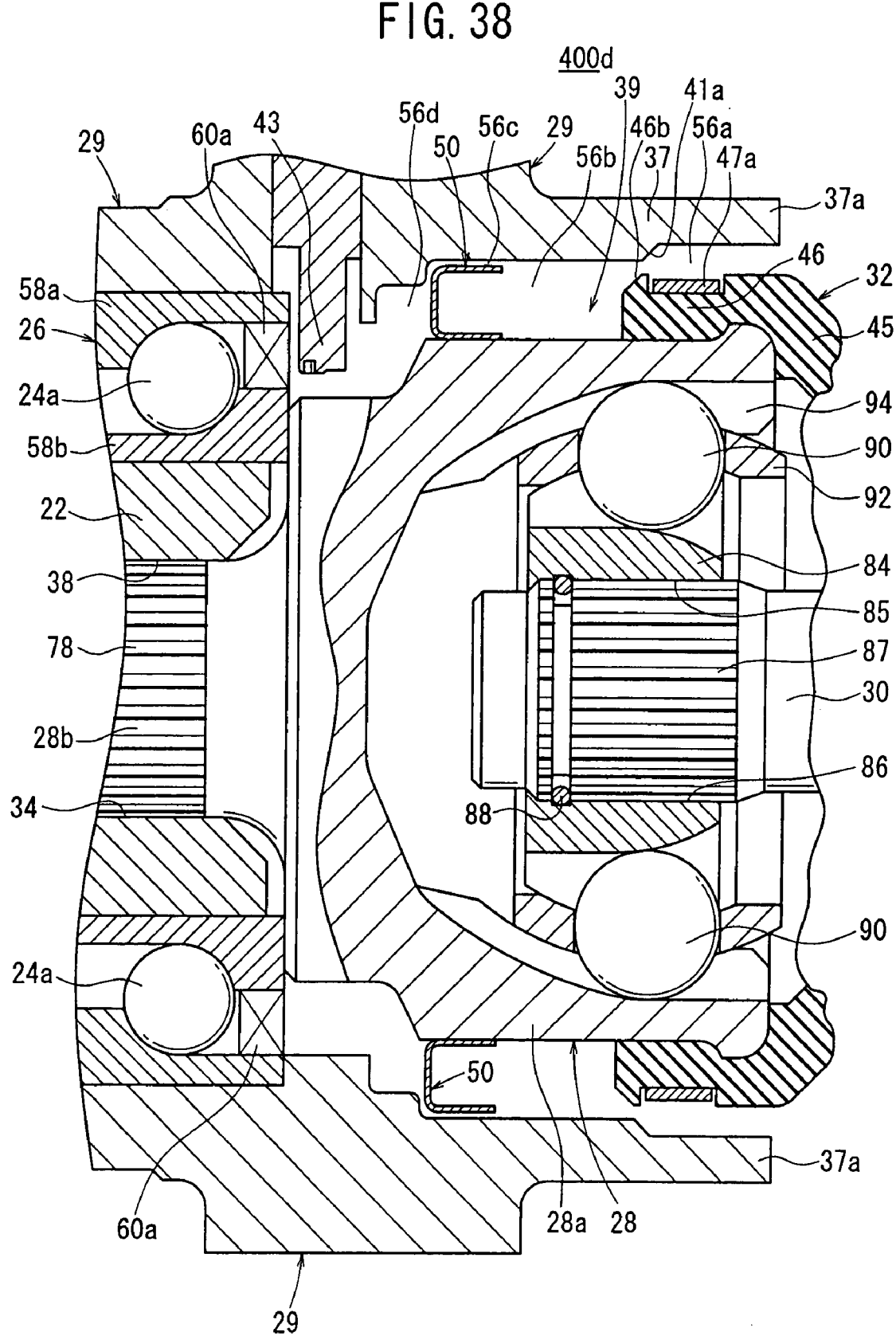
FIG. 38 is a fragmentary vertical cross-sectional view of a drive wheel bearing device according to a modification of the embodiment of FIG. 35.
Figure 39:
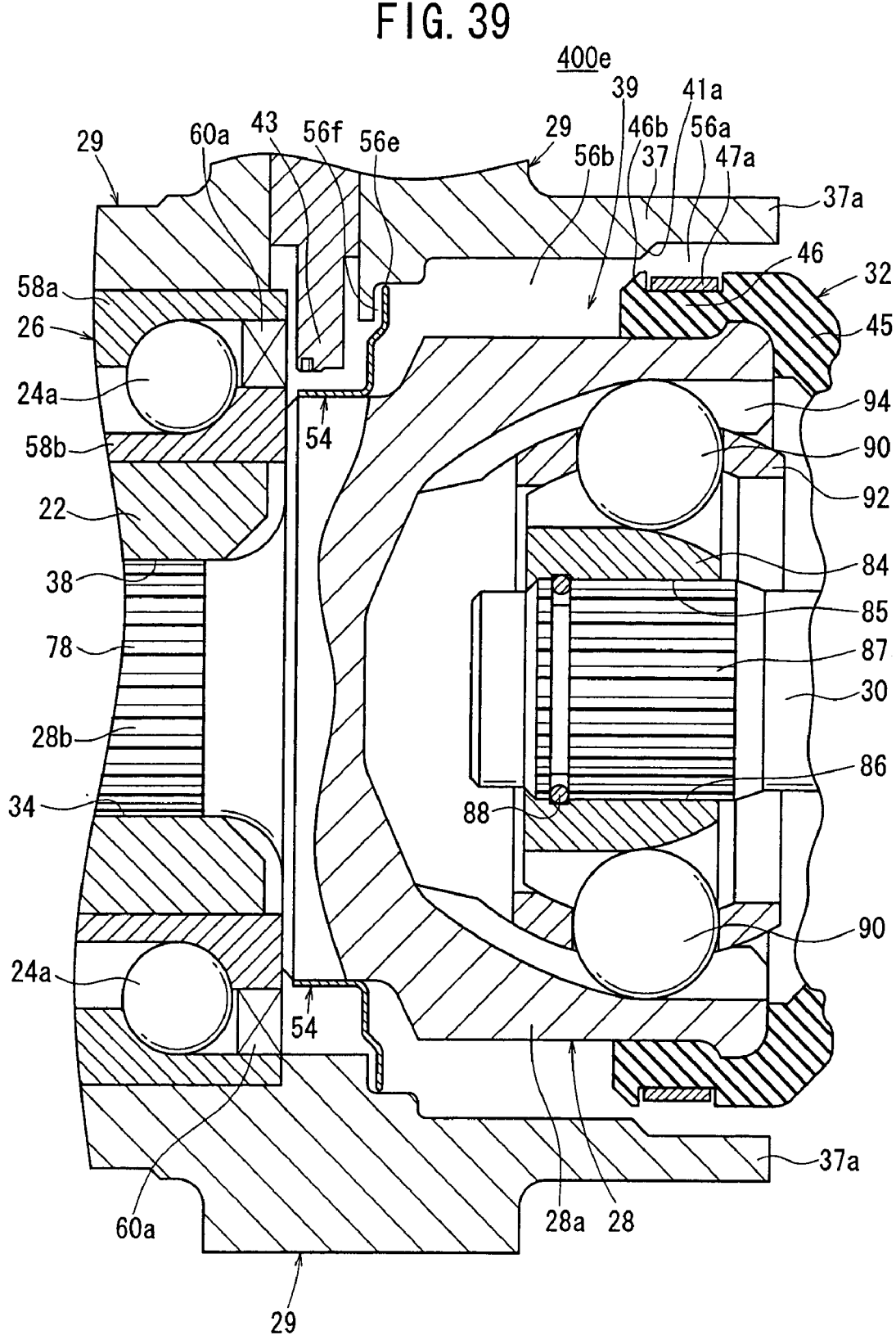
FIG. 39 is a fragmentary vertical cross-sectional view of a drive wheel bearing device according to a modification of the embodiment of FIG. 35.
Figure 40:
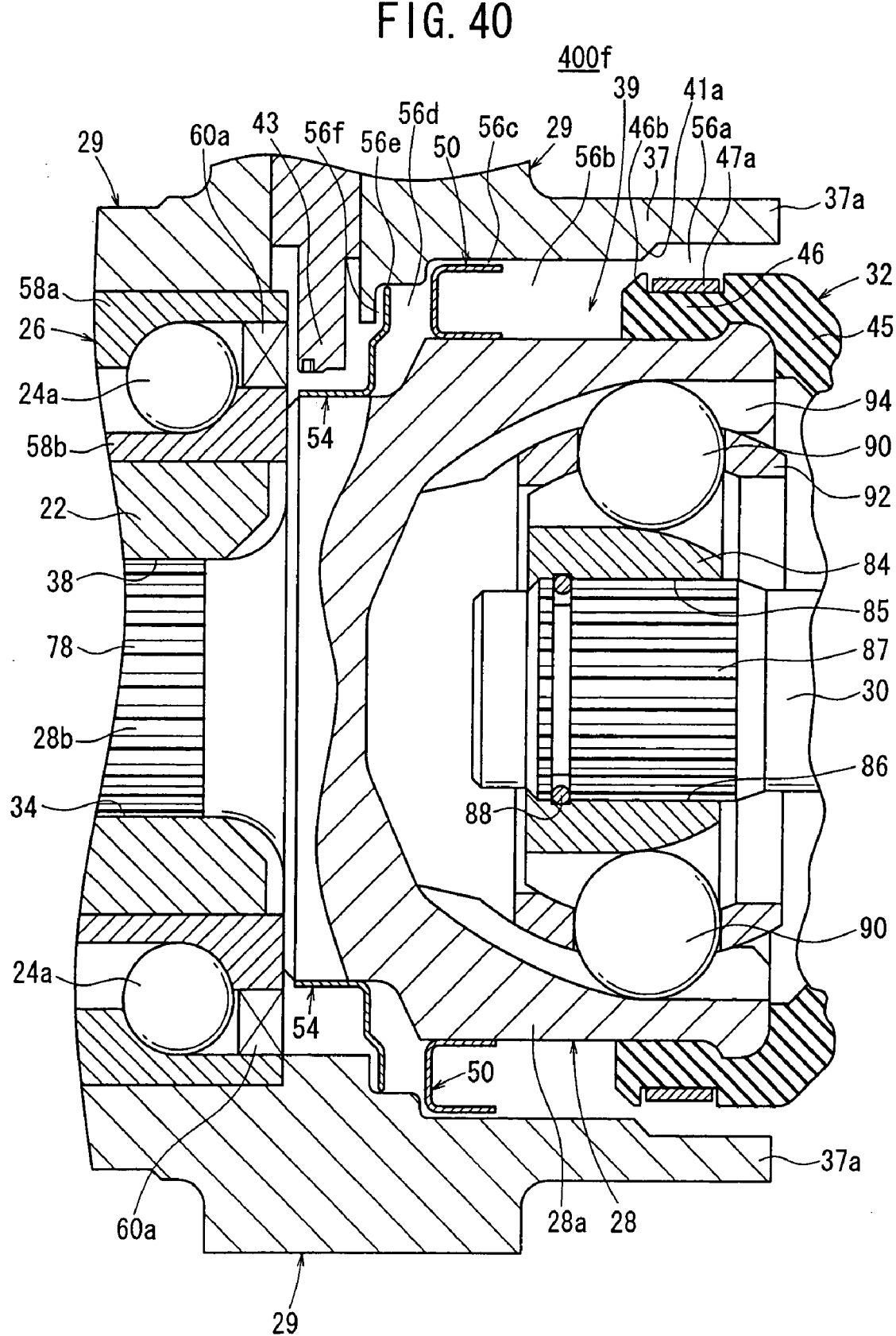
FIG. 40 is a fragmentary vertical cross-sectional view of a drive wheel bearing device according to a modification of the embodiment of FIG. 35.

In the drive wheel bearing device 200c shown in FIG. 28, the slanted surface 46b is provided, instead of the outer circumferential edge portion 46c with the rectangular cross section.

Drive wheel bearing devices 300a through 300f according to a sixth embodiment shall be described below with reference to FIGS. 29 through 34.

In the drive wheel bearing devices 300a through 300f according to the sixth embodiment, the inner wall surface of the knuckle member 29 includes an angularly shaped annular step 302, having a corner which faces the outer circumferential edge portion 46c or the slanted surface 46b of the larger-diameter end 46 of the joint boot 45, with a narrow clearance interposed therebetween. The narrow clearance between the annular step 302 and the outer circumferential edge portion 46c or the slanted surface 46b performs a sealing function.

Drive wheel bearing devices 400a through 400g according to a seventh embodiment shall be described below with reference to FIGS. 35 through 41.

In the drive wheel bearing devices 400a through 400g according to the seventh embodiment, the first annular step 41a on the inner wall surface of the knuckle member 29 is disposed in a position that is slightly displaced horizontally toward the band 47a from the outer circumferential edge portion 46c or the slanted surface 46b of the larger-diameter end 46 of the joint boot 45.

Figure 41:
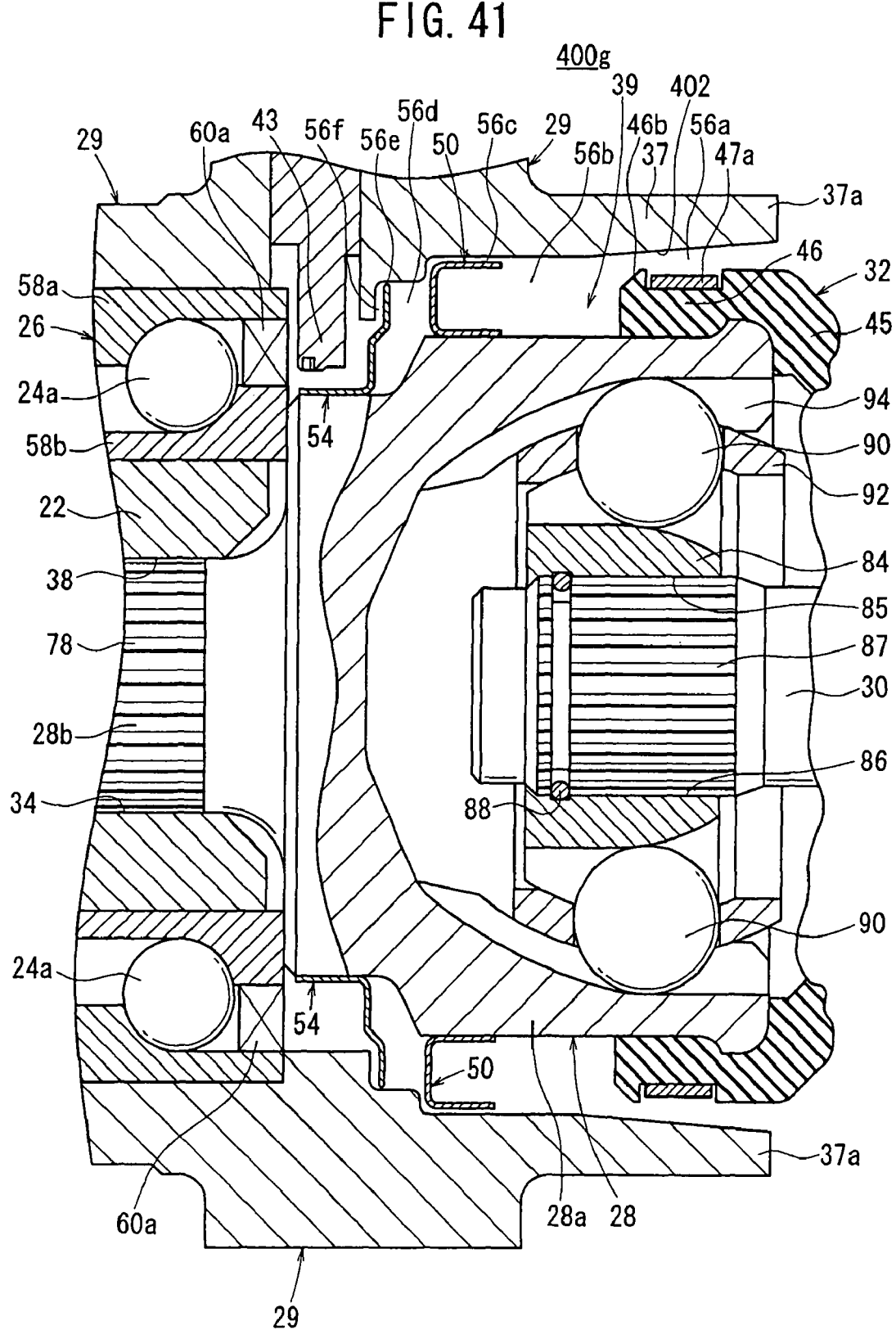
FIG. 41 is a fragmentary vertical cross-sectional view of a drive wheel bearing device according to a modification of the embodiment of FIG. 35.
Figure 42:
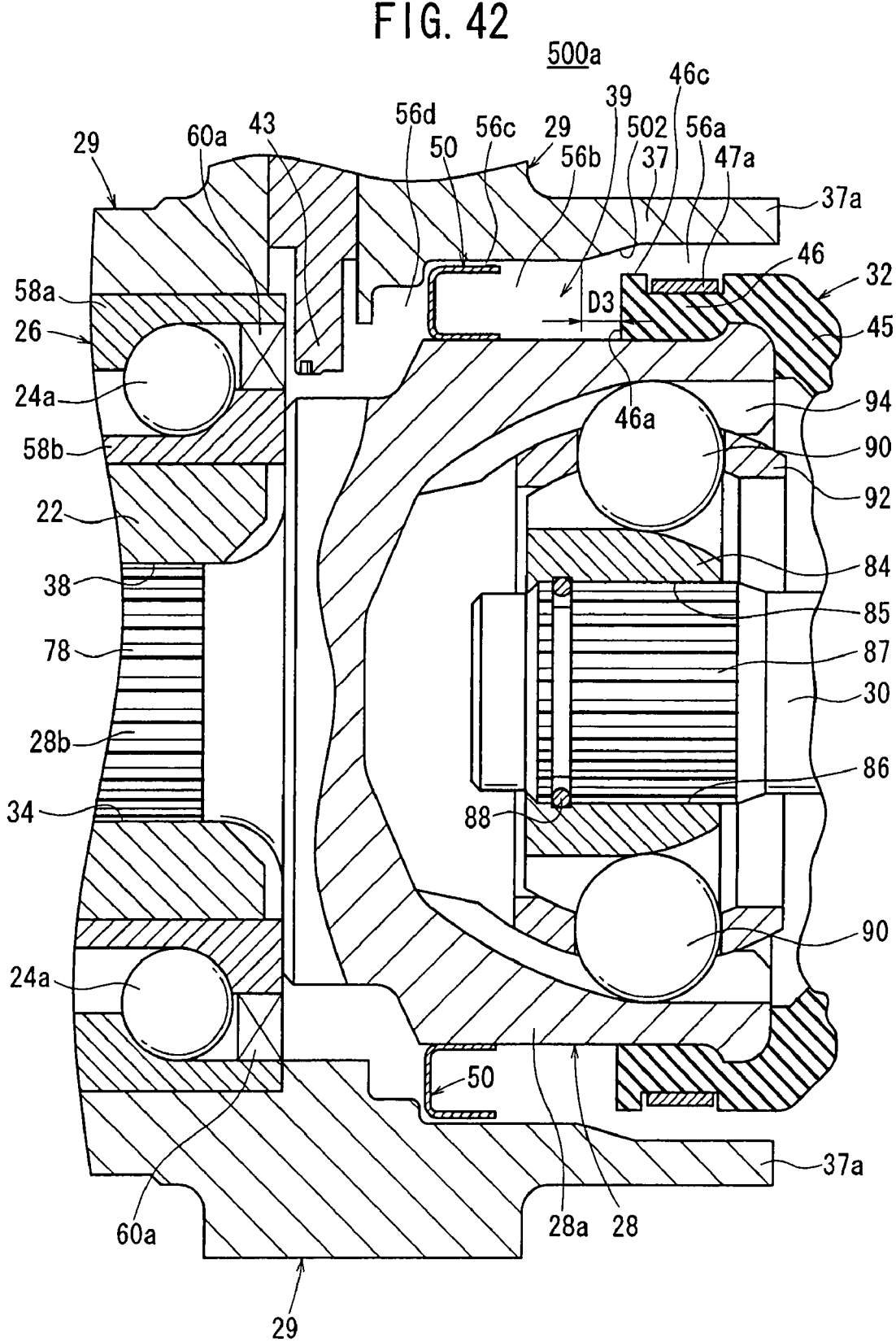
FIG. 42 is a fragmentary vertical cross-sectional view of a drive wheel bearing device according to an eighth embodiment of the present invention.
Figure 43:
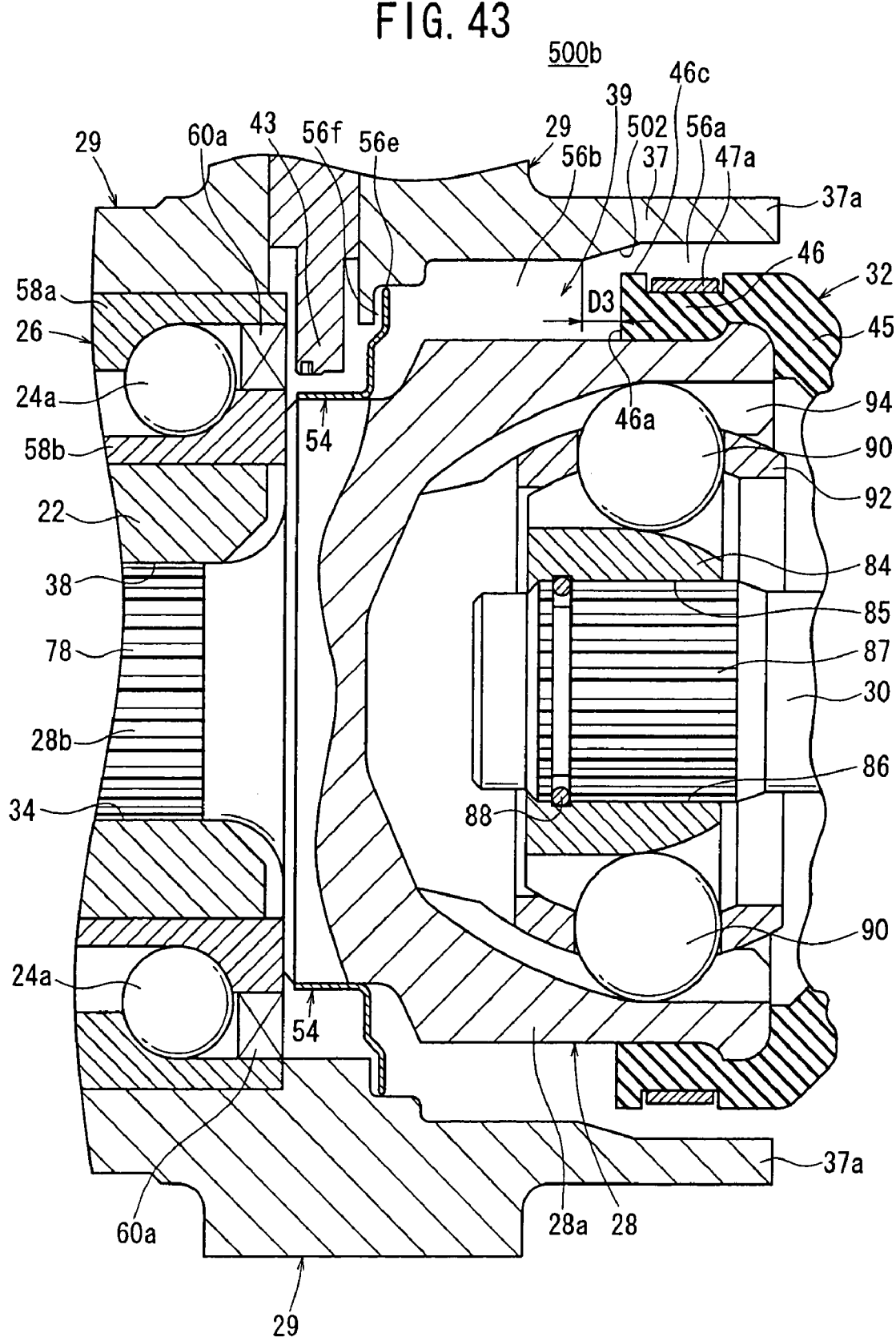
FIG. 43 is a fragmentary vertical cross-sectional view of a drive wheel bearing device according to a modification of the embodiment of FIG. 42.
Figure 44:
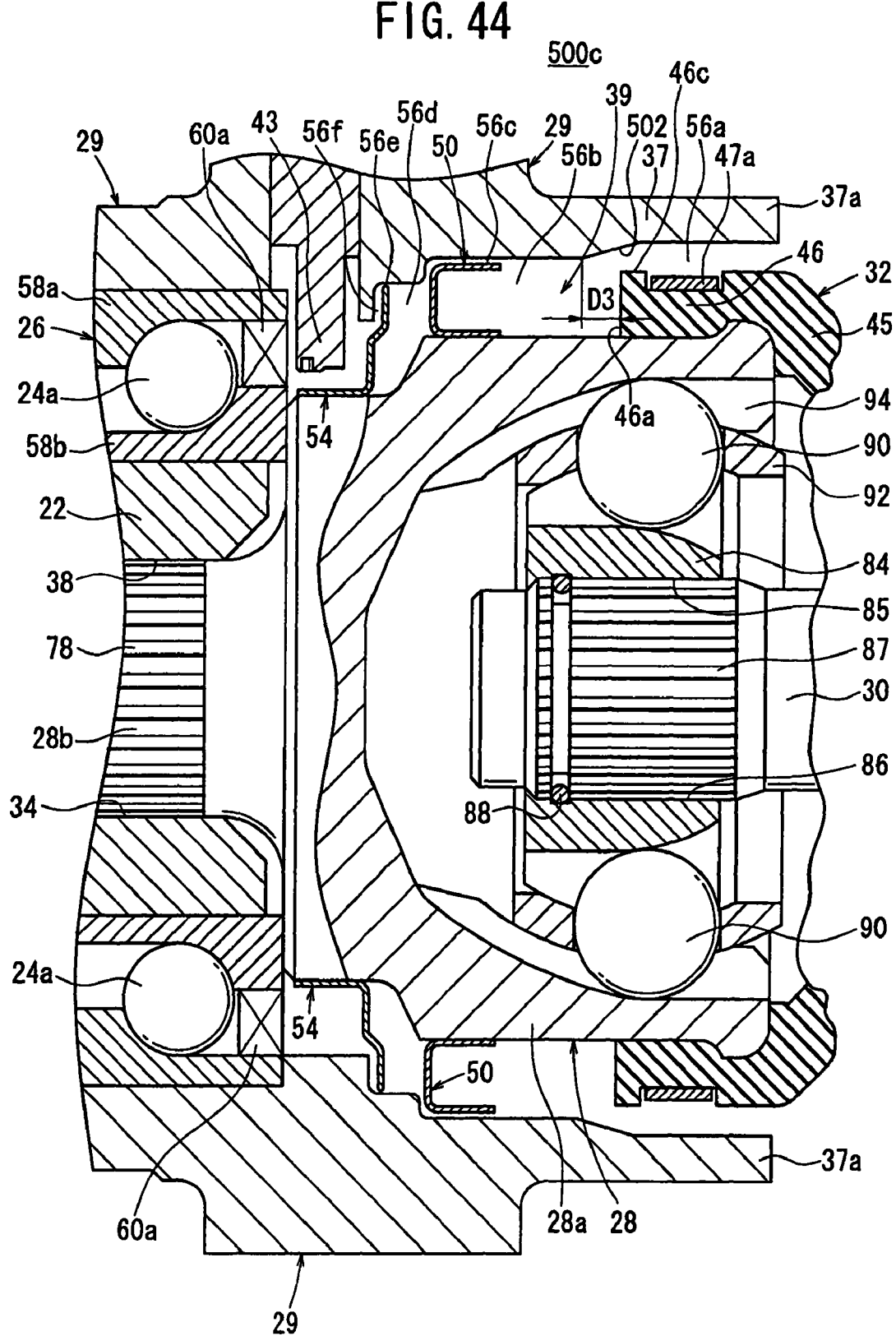
FIG. 44 is a fragmentary vertical cross-sectional view of a drive wheel bearing device according to a modification of the embodiment of FIG. 42.
Figure 45:
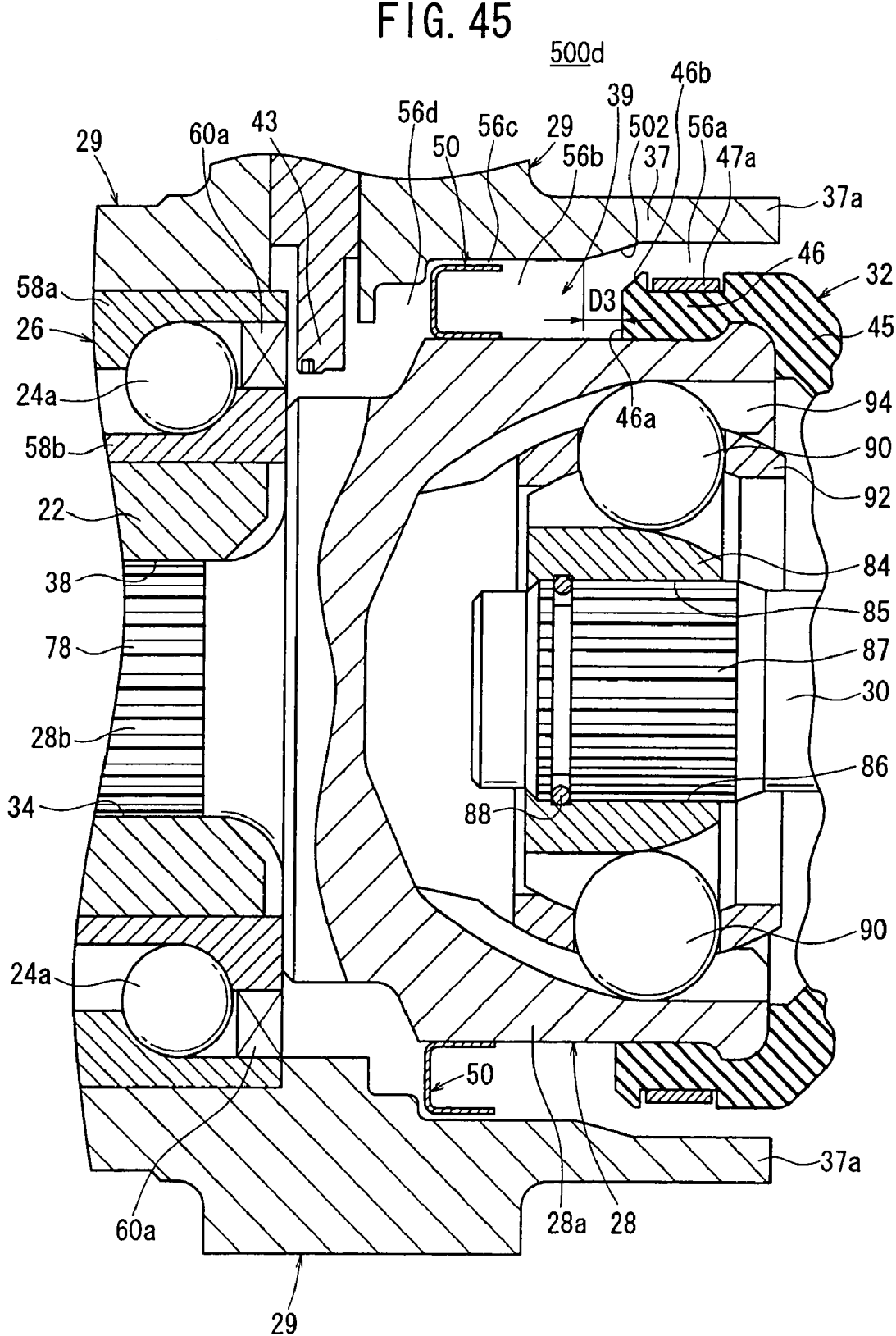
FIG. 45 is a fragmentary vertical cross-sectional view of a drive wheel bearing device according to a modification of the embodiment of FIG. 42.
Figure 46:
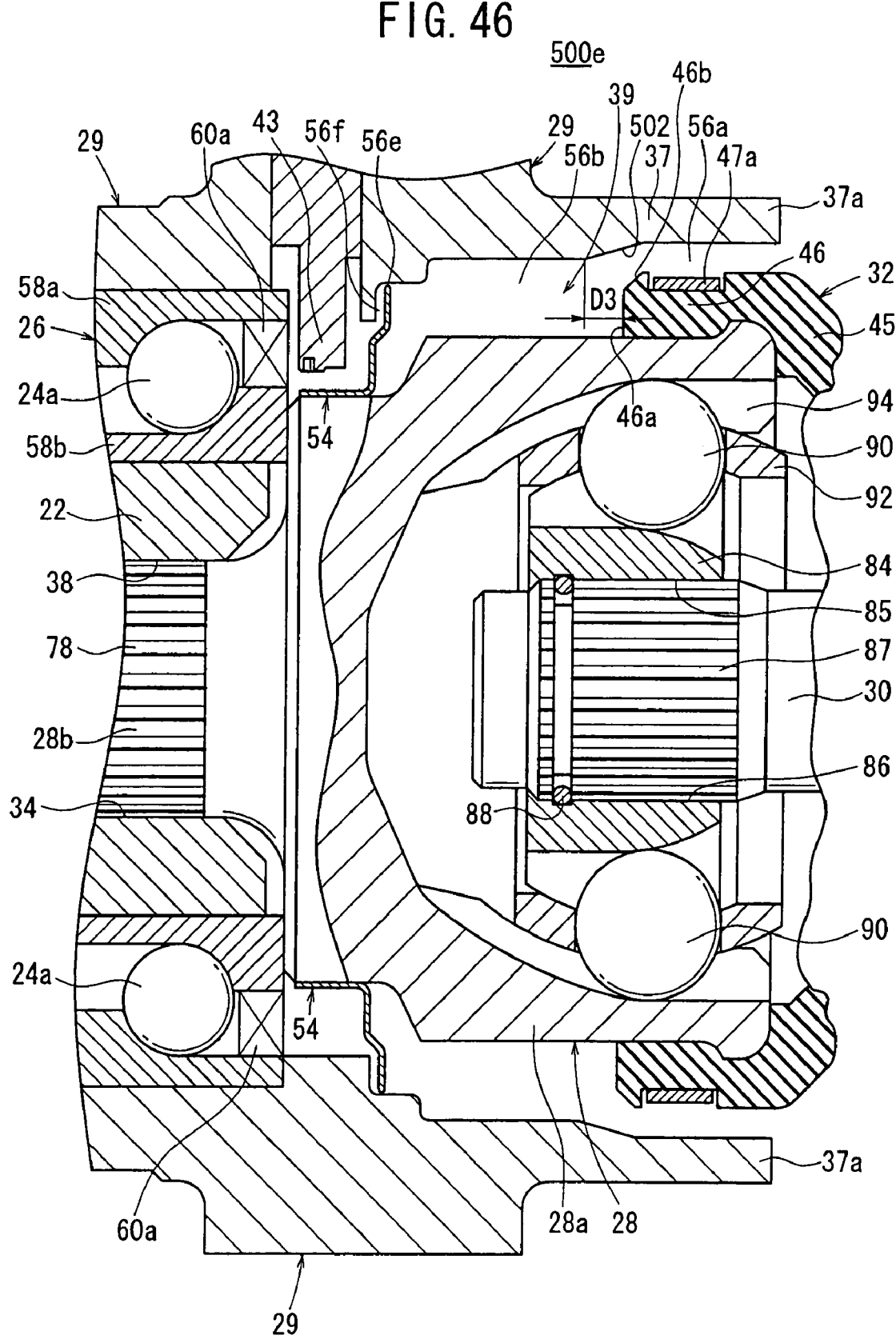
FIG. 46 is a fragmentary vertical cross-sectional view of a drive wheel bearing device according to a modification of the embodiment of FIG. 42.
Figure 47:
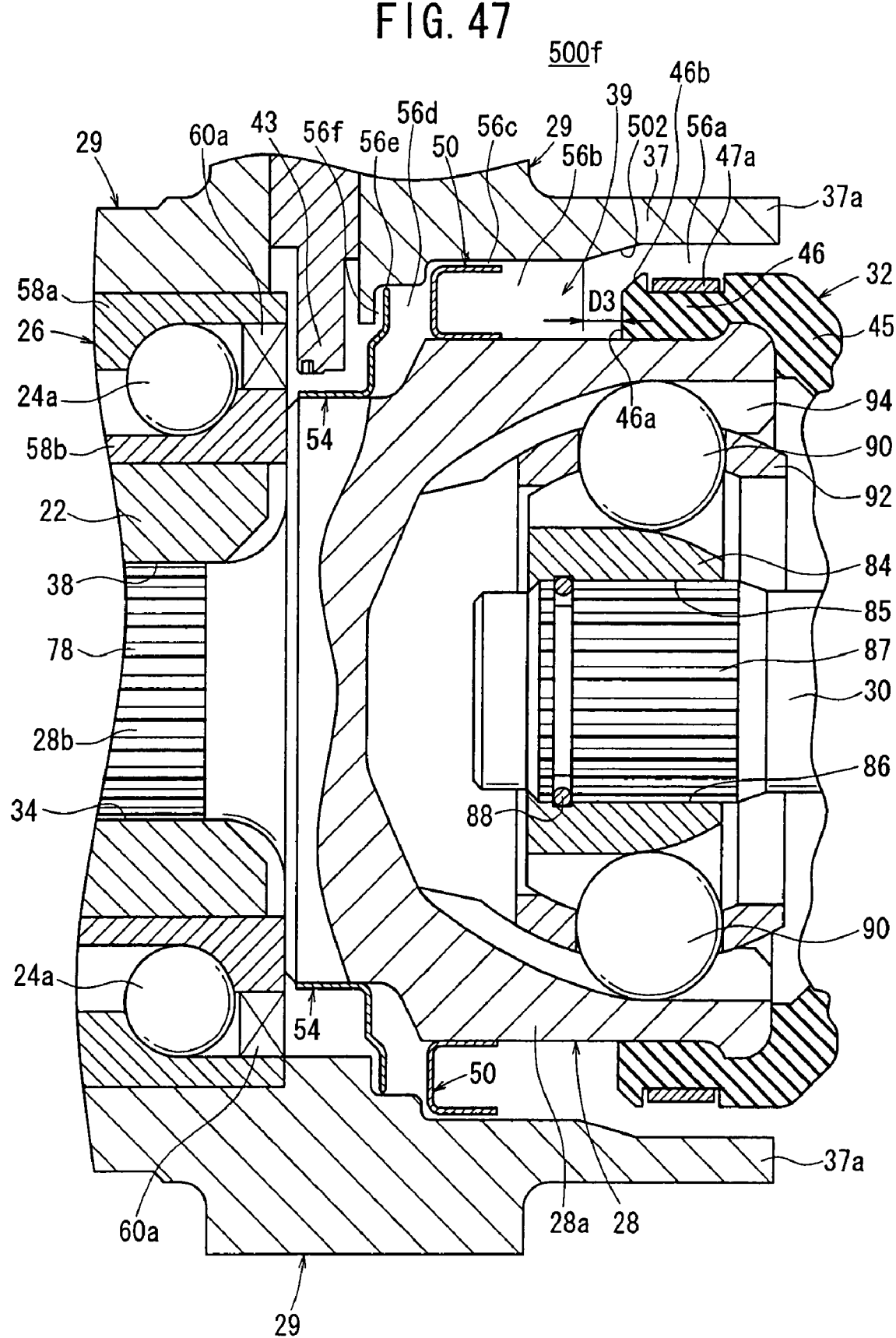
FIG. 47 is a fragmentary vertical cross-sectional view of a drive wheel bearing device according to a modification of the embodiment of FIG. 42.

In the drive wheel bearing device 400g shown in FIG. 41, the first annular step 41a is formed as a slanted surface 402 with a straight cross section, which extends continuously to the peripheral portion 37a.

Drive wheel bearing devices 500a through 500f according to an eighth embodiment shall be described below with reference to FIGS. 42 through 47.

In the drive wheel bearing devices 500a through 500f according to the eighth embodiment, an annular step 502 on the inner wall surface of the knuckle member 29 has a tapered cross section, which is inclined at a smaller angle than the first annular step 41a shown in FIG. 2. Further, the annular step 502 is disposed in a position that is horizontally offset by a predetermined distance D3 from the end face 46a of the larger-diameter end 46 of the joint boot 45. The annular step 502 may have a rounded cross section rather than a tapered cross section.

Drive wheel bearing devices 600a, 600b according to a ninth embodiment shall be described below with reference to FIGS. 48 and 49.

Figure 48:
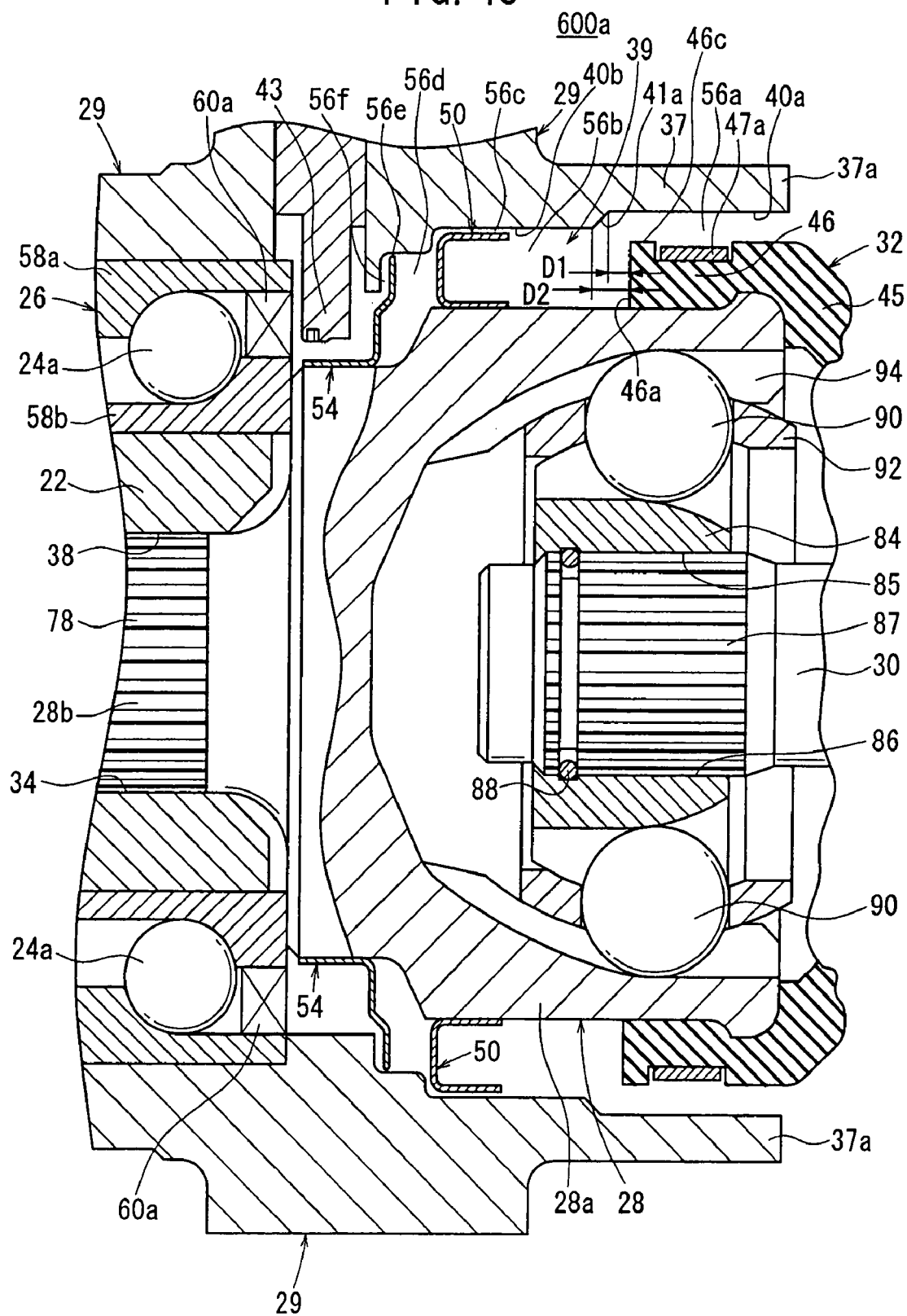
FIG. 48 is a fragmentary vertical cross-sectional view of a drive wheel bearing device according to a ninth embodiment of the present invention.

In the drive wheel bearing device 600a according to the ninth embodiment, as shown in FIG. 48, the boundary between the radial inner surface 40a and the first annular step 41a and the end face 46a of the larger-diameter end 46 are disposed in respective positions, which are offset horizontally by a predetermined distance D1. Further, the boundary between the first annular step 41a and the second radial inner surface 40b and the end face 46a of the larger-diameter end 46 are disposed in respective positions, which are offset horizontally by a predetermined distance D2.

Figure 49:
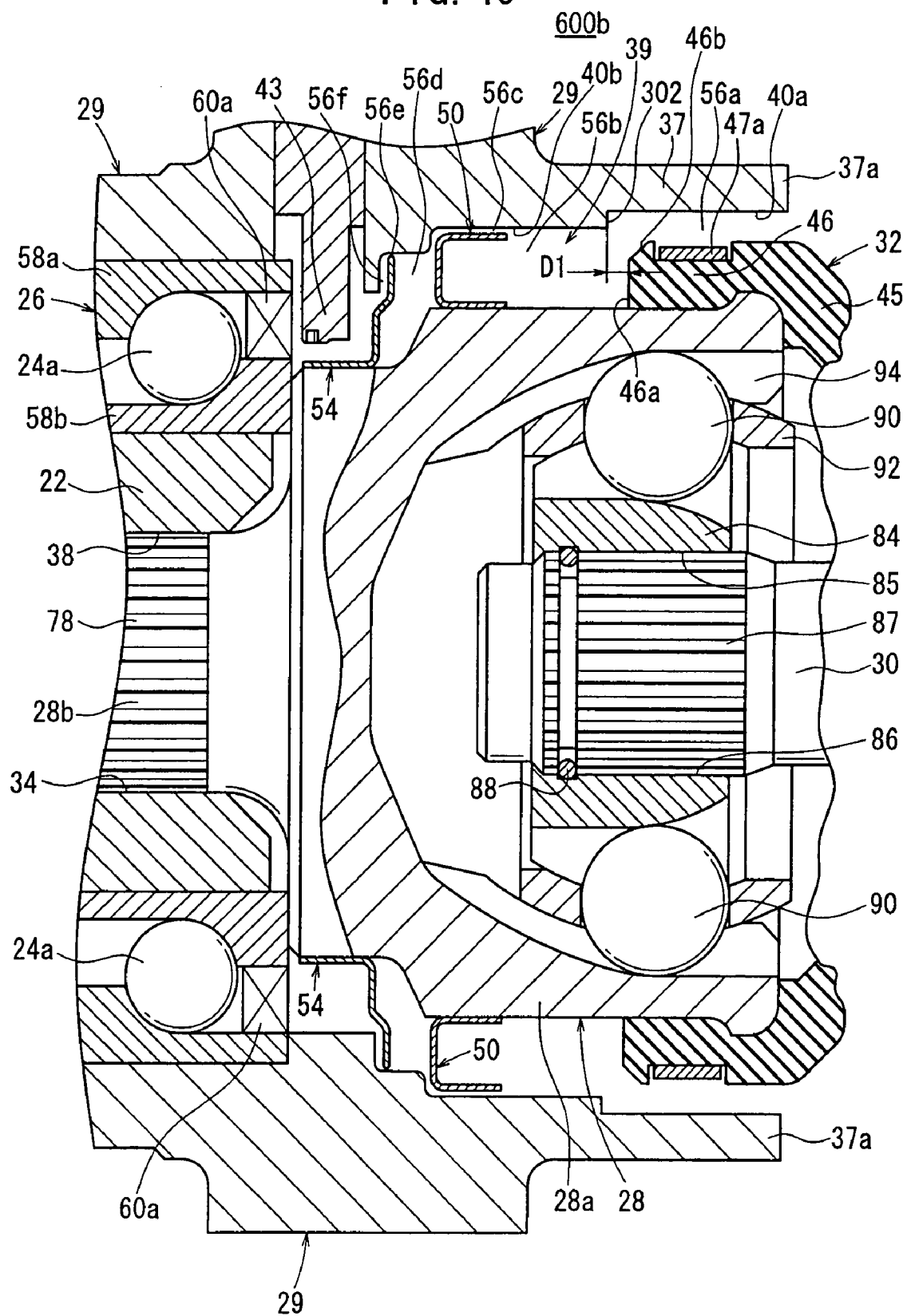
FIG. 49 is a fragmentary vertical cross-sectional view of a drive wheel bearing device according to a modification of the embodiment of FIG. 48.

In the drive wheel bearing device 600b according to the ninth embodiment, as shown in FIG. 49, the vertical surface of the angularly shaped annular step 302 and the end face 46a of the larger-diameter end 46 are disposed in respective positions, which are offset horizontally by a predetermined distance D1.

The drive wheel bearing device 600a shown in FIG. 48 differs in that the larger-diameter end 46 thereof includes an angularly shaped outer circumferential edge portion 46c. In addition, the drive wheel bearing device 600b shown in FIG. 49 differs in that the larger-diameter end 46 includes a slanted surface 46b.

Figure 50:
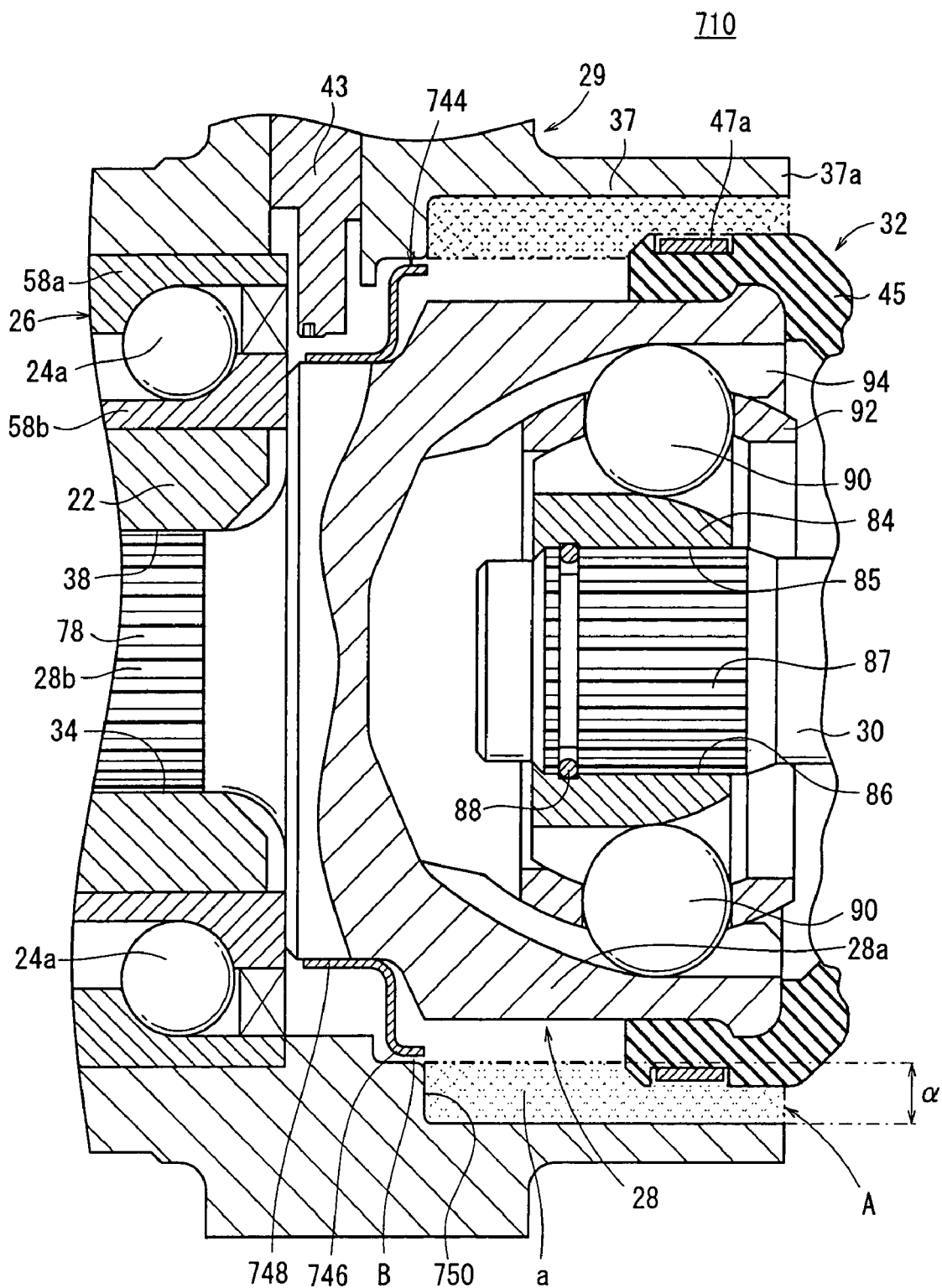
FIG. 50 is a fragmentary vertical cross-sectional view of a drive wheel bearing device according to a tenth embodiment of the present invention.
Figure 51:
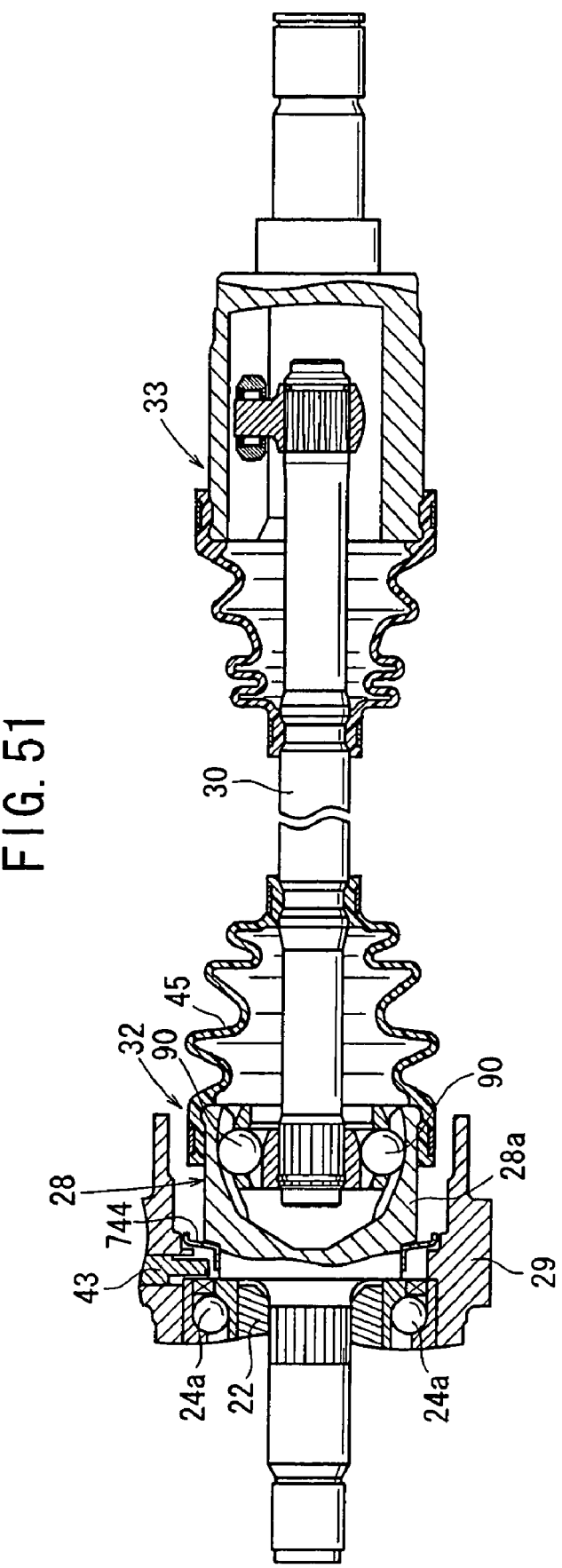
FIG. 51 is a vertical cross-sectional view showing a first constant velocity universal joint of the drive wheel bearing device shown in FIG. 50, which is connected to a second constant velocity universal joint.

A drive wheel bearing device 710 according to a tenth embodiment is shown in FIG. 50. FIG. 51 is a vertical cross-sectional view showing the first constant velocity universal joint 32 of the drive wheel bearing device 710, which is connected through the drive shaft 30 to the second constant velocity universal joint 33.

The knuckle member 29 includes an annular flange 37 that projects a predetermined length substantially in parallel with the outer circumferential surface of the outer race member 28. The annular flange 37 has an open side near the opening of the cup 28a, with a gap A defined between the inner circumferential surface of the annular flange 37 and the outer circumferential surface of the cup 28a (see FIG. 50).

Between the inner circumferential surface of the knuckle member 2 and the outer circumferential surface of the outer race member 28, an annular metal seal member 744 is mounted near the hub bearing 26, for preventing rainwater, etc., from entering into the hub bearing 26. As shown in FIG. 50, the seal member 744 has a bent cross-sectional shape made up of a larger-diameter member 746 and a smaller-diameter member 748.

The smaller-diameter member 748 of the seal member 744 is fixed to the outer circumferential surface of a smaller-diameter portion of the outer race member 28, which is closer to the hub 22. The larger-diameter member 746 of the seal member 744 extends toward the drive shaft 30 and has a free end, which is spaced a suitable gap B from a stepped inner circumferential wall surface of the knuckle member 29. The seal member 744 is thus prevented from sliding against the inner circumferential wall surface of the knuckle member 29 upon rotation thereof.

The gap A formed between the annular flange 37 and the outer race member 28 includes an annular reservoir region a therein for temporarily storing rainwater, etc. The annular reservoir region a is positioned closer to the open end of the annular flange 37 than the seal member 744.

Specifically, the inner circumferential surface of the annular flange 37 includes an annular step 750, which is larger in diameter than the seal member 744, and the reservoir region a is provided within the annular step 750. Therefore, the reservoir region a is positioned outwardly of the gap B, such that the reservoir region a is disposed in at least a lower portion of the annular flange 37. The reservoir region a can be produced at a low cost by a simple machining process when forming the annular step 750 in the annular flange 37.

Figure 52:
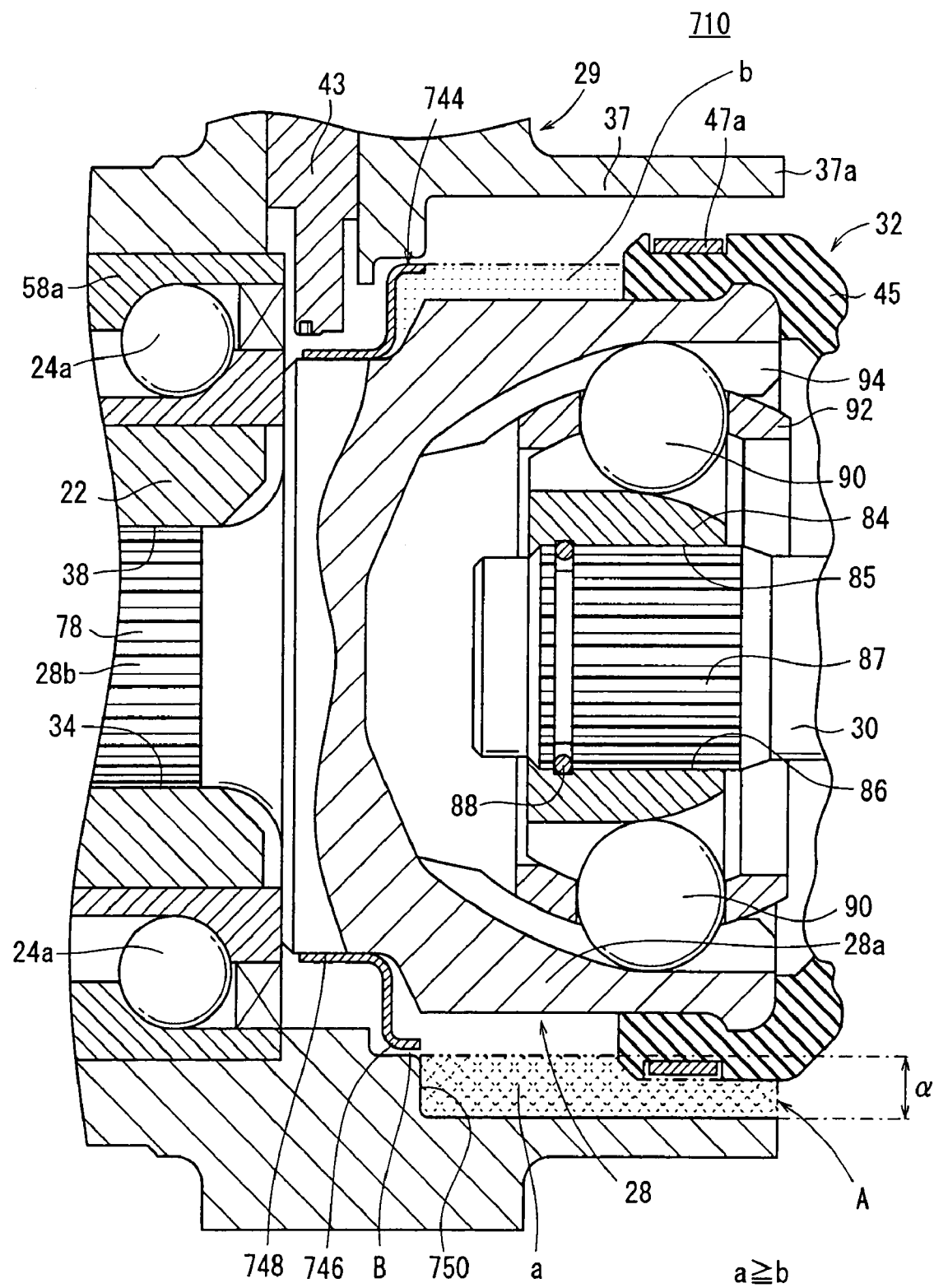
FIG. 52 is a vertical cross-sectional view showing, for purposes of comparison, the volume of a reservoir region a defined by an annular step of an annular flange, and the volume of a space region b surrounded by a seal member and the end face of a larger-diameter end of a joint boot.

As shown in FIG. 52, the reservoir region a may be equal to or greater in volume than the volume of the vacant region b that is surrounded and defined by the seal member 744, a portion of the outer circumferential surface of the outer race member 28, and the end face of the larger-diameter end of the joint boot 45 (a≧b).

According to the tenth embodiment, rainwater, etc., tending to enter into the drive wheel bearing device 710 through the gap A between the annular flange 37 and the outer race member 28 is expelled outwardly by centrifugal forces of the rotating outer race member 28. Such rainwater, etc., is temporarily stored in the reservoir region a within the annular step 750. Thereafter, the rainwater, etc., flows along the inner wall surface of the annular flange 37 and drops into a lower portion of the reservoir region a. After the rainwater, etc., has been stored in the lower portion of the reservoir region a, the rainwater, etc., is discharged outwardly through the gap A.

As described above, since rainwater, etc., tending to enter through the gap A is temporarily stored in the reservoir region a, which has a relatively large volume, such water is prevented from entering into the hub bearing 26. The seal member 744 thus effectively performs a sealing function, to more effectively prevent rainwater, etc., from entering inside the hub bearing 26, and thereby increasing the water resistance of the hub bearing 26. The water resistance of the rotational speed sensor 43 that is positioned between the hub bearing 26 and the seal member 744 also is increased for the same reasons as described above.

If the outer circumferential lower portion of the annular step 750 is larger in diameter than other portions thereof, so as to increase the radial dimension a of the reservoir region a, then the reservoir region a is cable of storing a greater amount of rainwater, etc., thereby increasing the ability of the seal member 744 to withstand water. Since rainwater, etc., is ultimately stored in the lower portion of the annular flange 37, and thereafter discharged, the reservoir region a can be formed effectively only in the lower portion of the annular flange 37.

In the tenth embodiment, the reservoir region a is provided within the annular step 750. However, the reservoir region a is not limited to having an annular shape, insofar as the reservoir region a can store rainwater, etc., in at least a lower portion of the annular flange 37.

Figure 53:
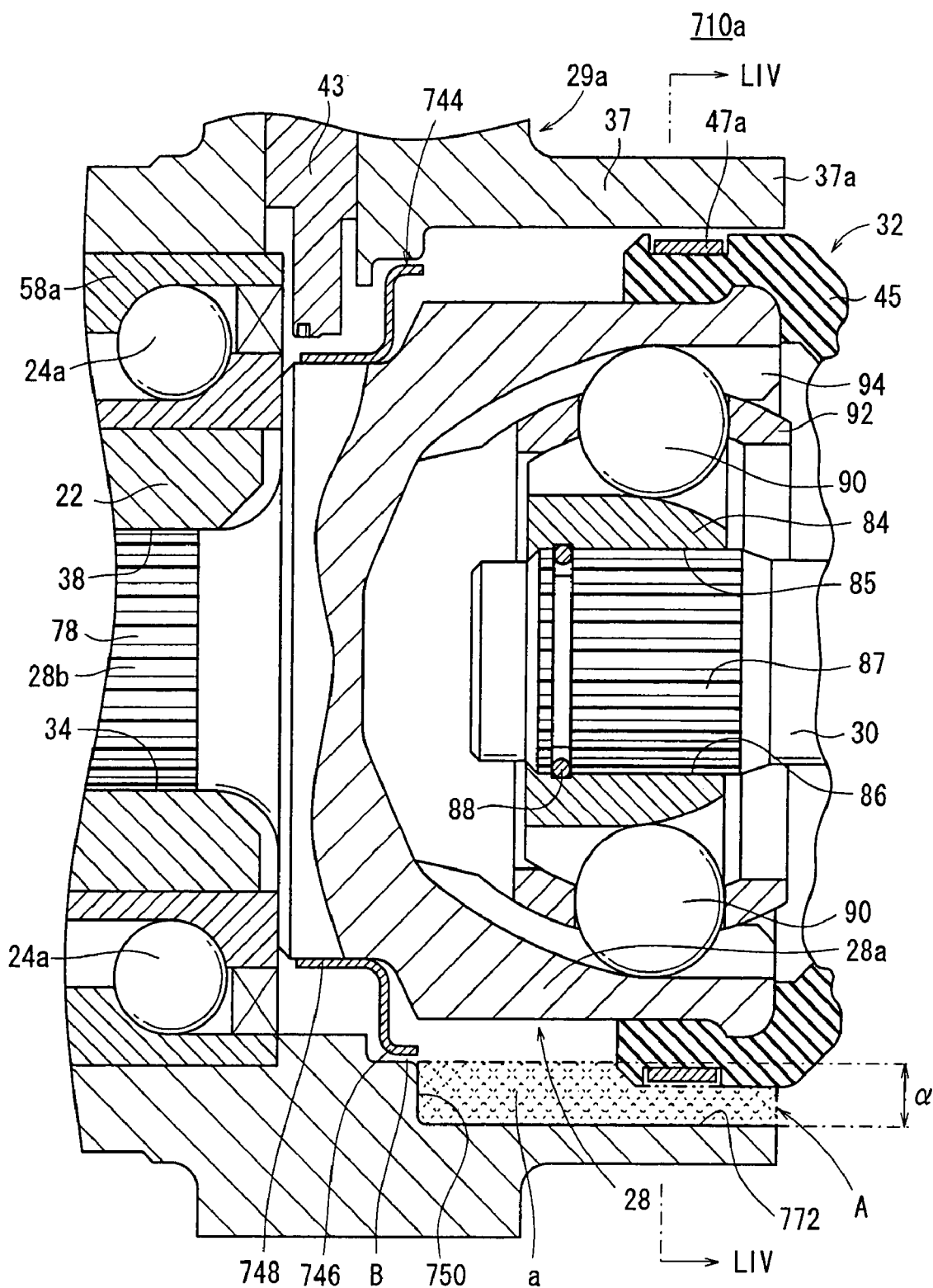
FIG. 53 is a fragmentary vertical cross-sectional view of a drive wheel bearing device according to an eleventh embodiment of the present invention.
Figure 54:
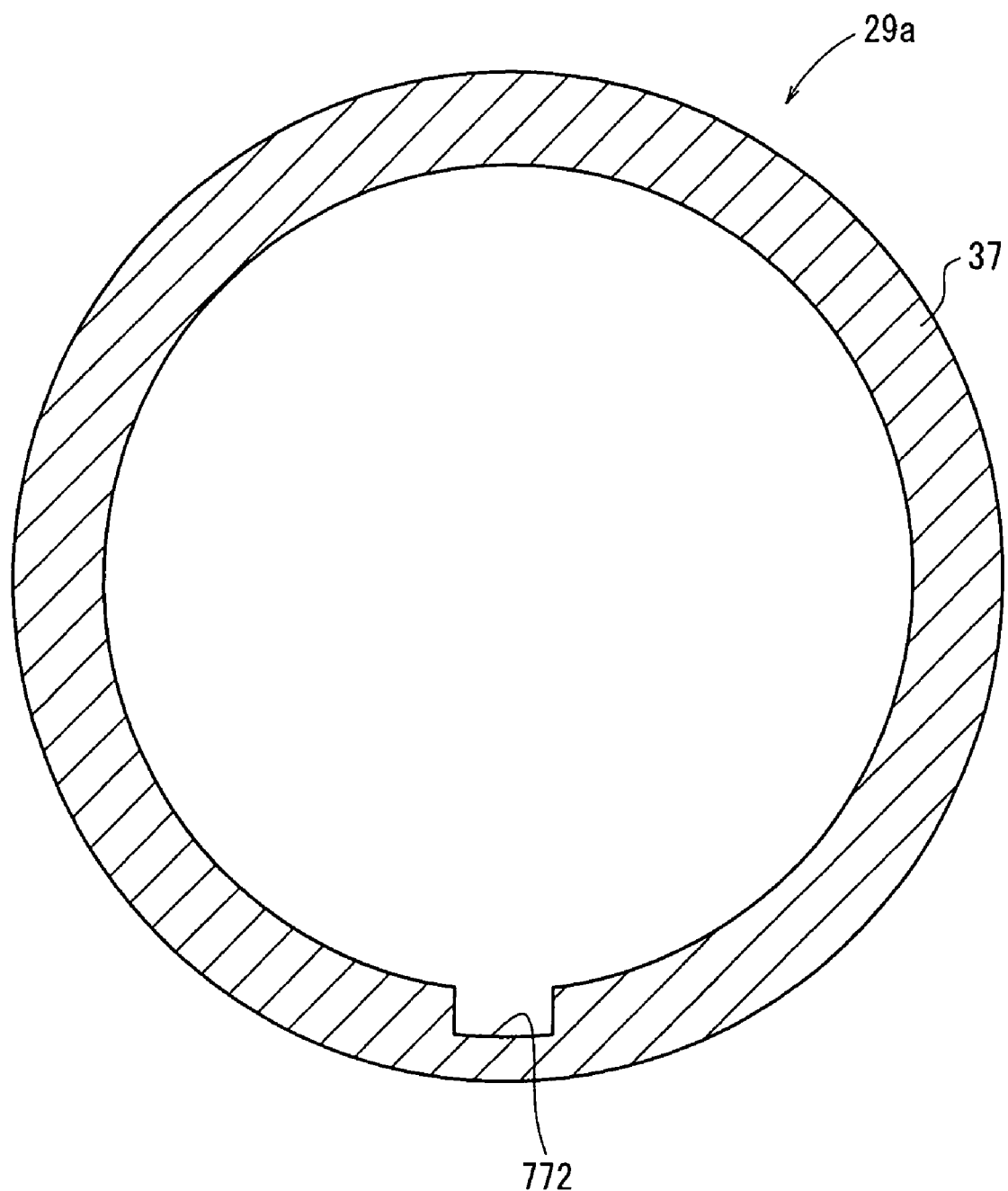
FIG. 54 is a fragmentary vertical cross-sectional view taken along line LIV-LIV of FIG. 53, showing a radial inner surface shape of an annular flange of a knuckle member.

For example, as shown in FIGS. 53 and 54, a drive wheel bearing device 710a according to an eleventh embodiment includes a groove 772 having a rectangular cross section formed by axially removing only a lower portion of the constant inside diameter inner circumferential surface of the annular flange 37 of the knuckle member 29a, wherein the groove 772 provides the reservoir region a.

Figure 55:
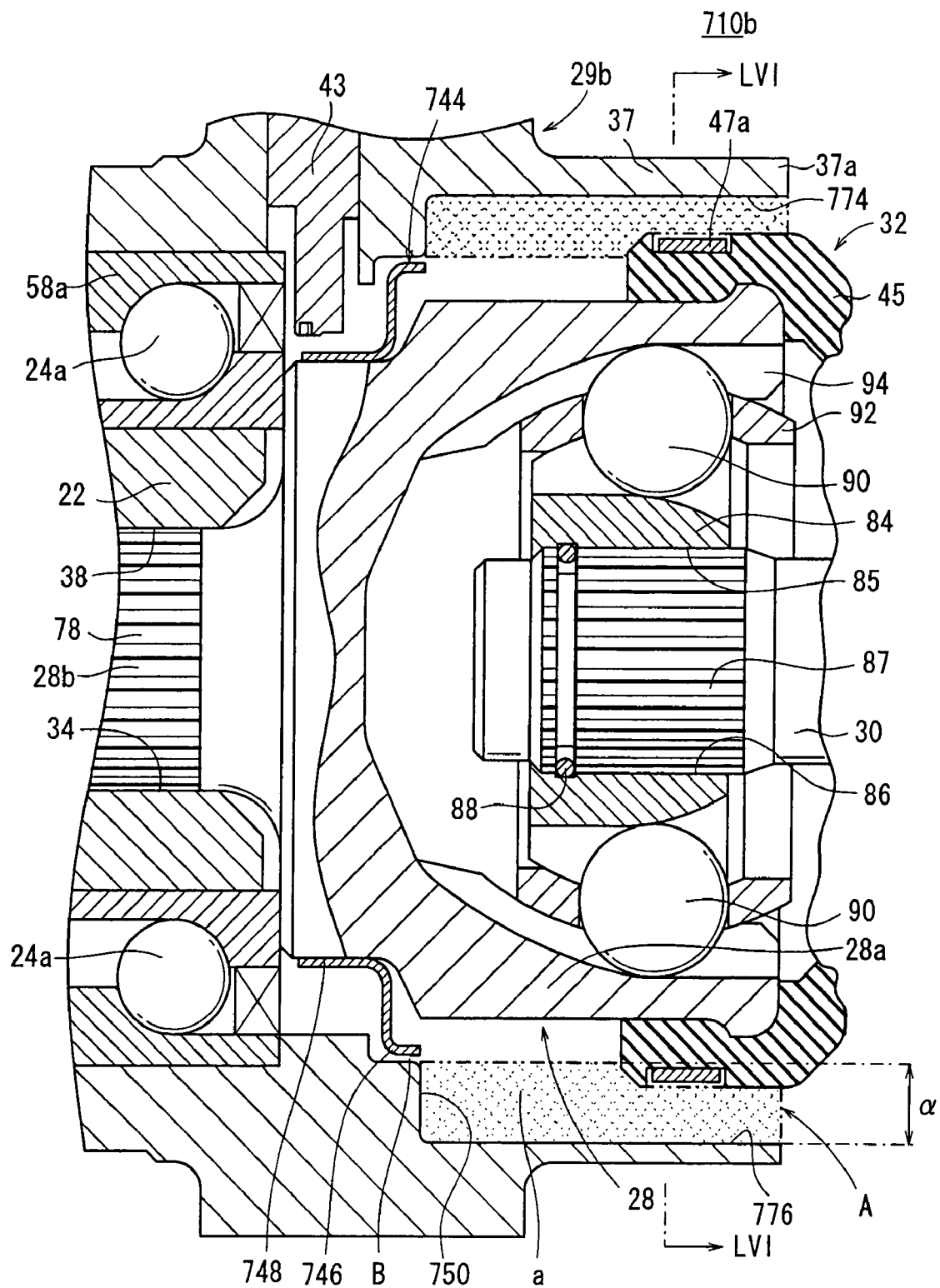
FIG. 55 is a fragmentary vertical cross-sectional view of a drive wheel bearing device according to a twelfth embodiment of the present invention.
Figure 56:
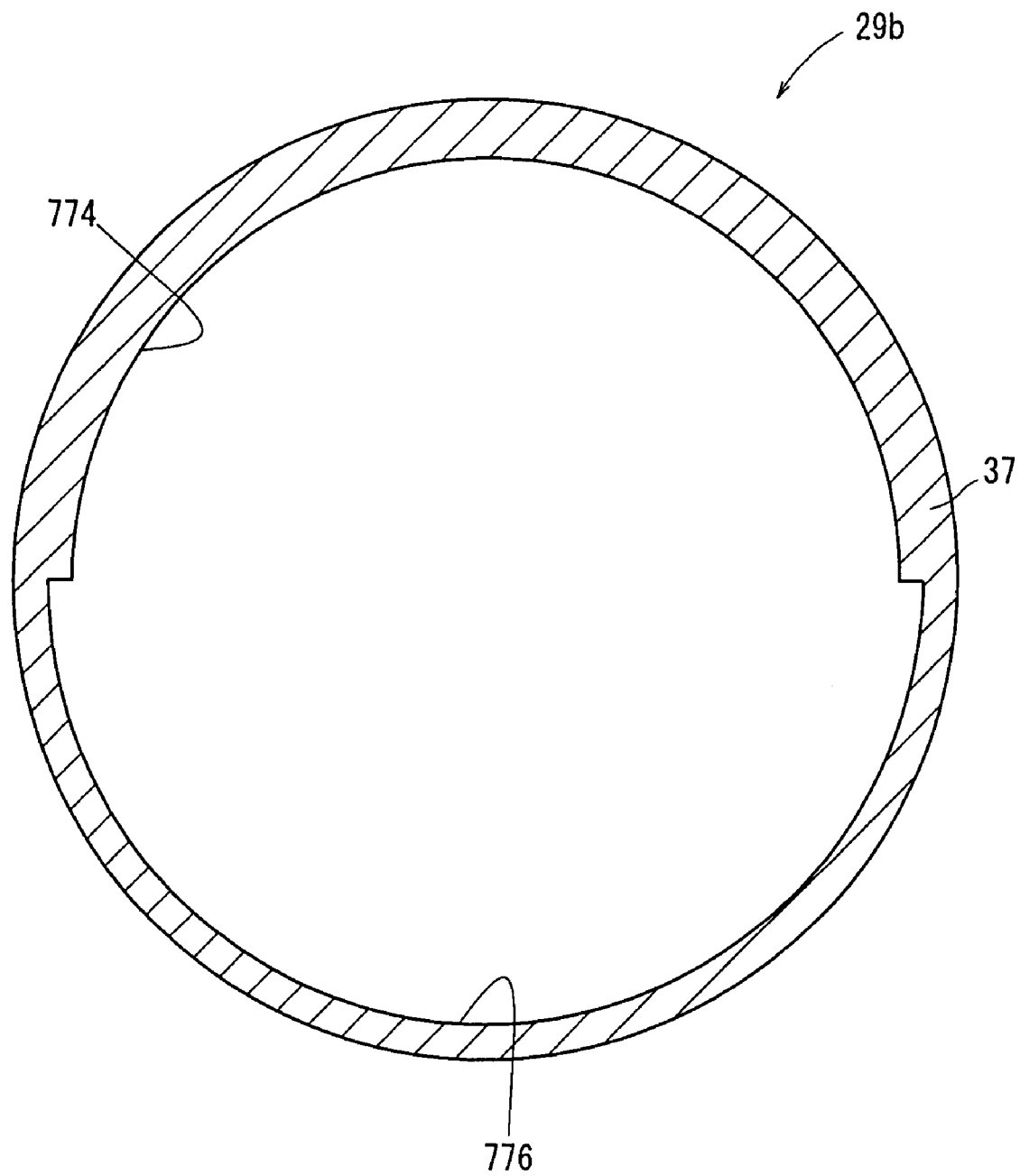
FIG. 56 is a fragmentary vertical cross-sectional view taken along line LVI-LVI of FIG. 55, showing a radial inner surface shape of an annular flange of a knuckle member.

Alternatively, a drive wheel bearing device 710b according to a twelfth embodiment, as shown in FIGS. 55 and 56, includes an upper smaller-diameter first radial inner surface 774 and a lower larger-diameter second radial inner surface 776, which are formed by dividing the inner circumferential surface of the annular flange 37 of the knuckle member 29b at a horizontal intermediate portion thereof, such that the larger-diameter second radial inner surface 776 provides the reservoir region a.

The invention claimed is:

1. A drive wheel bearing device comprising:
   a hub to which a wheel may be fixed;
   a hub bearing disposed on an outer circumferential surface of said hub and supporting said hub rotatably on a vehicle body; and
   an outer race member of a constant velocity universal joint, said outer race member being fitted into said hub and comprising a cup and a shaft,
   wherein a surrounding member is disposed in surrounding relation to the cup of said outer race member with a gap interposed therebetween, such that either one of a first seal member and a second seal member, which are annular in shape, are disposed between a radial inner surface of said surrounding member and a radial outer surface of said outer race member, and
   wherein a radial outer end of said first seal member or said second seal member is spaced from the radial inner surface of said surrounding member by a radial spacing, said radial spacing being smaller than another area of said gap which is free of said first seal member or said second seal member.

2. A drive wheel bearing device according to claim 1, wherein said first seal member comprises an outer first annular side wall and an inner second annular side wall, which are spaced from each other by a predetermined distance and face each other substantially in parallel to each other, said inner second annular side wall being fastened to an outer circumferential surface of said outer race member, and a third annular side wall extending perpendicularly to said first annular side wall and said second annular side wall, said third annular side wall interconnecting said first annular side wall and said second annular side wall.

3. A drive wheel bearing device according to claim 2, wherein said first seal member includes an opening defined by said first annular side wall and said second annular side wall, said opening being open toward a direction in which water enters along said gap, which is defined between the radial inner surface of said surrounding member and the radial outer surface of said outer race member.

4. A drive wheel bearing device according to claim 1, wherein said surrounding member includes an annular flange projecting substantially in parallel to the outer circumferential surface of said outer race member, said annular flange including a peripheral portion that lies horizontally and extends to a position where the peripheral portion covers a portion of a joint boot, said peripheral portion being out of contact with said joint boot and performing a sealing function to prevent water and muddy water from being introduced from the peripheral portion to an outer surface of said joint boot.

5. A drive wheel bearing device according to claim 1, wherein said surrounding member includes an annular flange projecting substantially in parallel to the outer circumferential surface of said outer race member, said annular flange including an annular recess defined in an inner circumferential surface thereof facing the outer circumferential surface of said outer race member, said annular recess extending to a peripheral portion that communicates with an exterior and becoming progressively greater in diameter in a direction away from the outer circumferential surface of said outer race member.

6. A drive wheel bearing device according to claim 5, wherein said annular recess has a tapered cross-sectional shape or a rounded cross-sectional shape, which is progressively greater in diameter toward an opening of said outer race member.

7. A drive wheel bearing device according to claim 1, wherein said second seal member comprises an inner hollow cylindrical member fastened to the radial outer surface of said outer race member, a bent member bent into an L-shaped cross section substantially perpendicularly to said hollow cylindrical member, a slanted member contiguous to said bent member, and an outer circumferential member that extends in a radial direction contiguous to said slanted member.

8. A drive wheel bearing device according to claim 1, wherein both said first seal member and said second seal member are disposed so as to be spaced from each other in the axial direction of said outer race member.

9. A drive wheel bearing device according to claim 8, wherein said first seal member is disposed forwardly in the direction in which water enters along said gap defined between the radial inner surface of said surrounding member and the radial outer surface of said outer race member, and said second seal member is disposed along said direction rearwardly of said first seal member.

* * * * *